(12) United States Patent
Ko et al.

(10) Patent No.: US 11,540,191 B2
(45) Date of Patent: Dec. 27, 2022

(54) METHOD FOR TRANSMITTING AND RECEIVING REFERENCE SIGNAL AND DEVICE THEREFOR

(71) Applicant: LG ELECTRONICS INC., Seoul (KR)

(72) Inventors: Hyunsoo Ko, Seoul (KR); Kijun Kim, Seoul (KR); Sukhyon Yoon, Seoul (KR); Eunsun Kim, Seoul (KR); Byounghoon Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 67 days.

(21) Appl. No.: 16/762,907

(22) PCT Filed: Nov. 16, 2018

(86) PCT No.: PCT/KR2018/014133
§ 371 (c)(1),
(2) Date: May 8, 2020

(87) PCT Pub. No.: WO2019/098769
PCT Pub. Date: May 23, 2019

(65) Prior Publication Data
US 2021/0176687 A1 Jun. 10, 2021

Related U.S. Application Data

(60) Provisional application No. 62/739,007, filed on Sep. 28, 2018, provisional application No. 62/587,495, filed on Nov. 17, 2017.

(51) Int. Cl.
*H04W 36/24* (2009.01)
*H04L 5/00* (2006.01)
(Continued)

(52) U.S. Cl.
CPC ............ *H04W 36/24* (2013.01); *H04L 5/0048* (2013.01); *H04W 24/08* (2013.01); *H04W 36/04* (2013.01); *H04W 56/001* (2013.01)

(58) Field of Classification Search
CPC ...... H04W 36/24; H04W 24/08; H04W 36/04; H04W 56/001; H04W 36/0094; H04L 5/0048; H04L 5/0007; H04L 5/005
See application file for complete search history.

(56) References Cited

U.S. PATENT DOCUMENTS

2015/0029884 A1 1/2015 Seo et al.
2015/0036524 A1 2/2015 Kim et al.
(Continued)

FOREIGN PATENT DOCUMENTS

CN 104247495 12/2014
CN 105308888 2/2016
(Continued)

OTHER PUBLICATIONS

PCT International Application No. PCT/KR2018/014133, International Search Report and Written Opinion dated Mar. 12, 2019, 19 pages.
(Continued)

*Primary Examiner* — Peter P Chau
(74) *Attorney, Agent, or Firm* — Lee Hong Degerman Kang Waimey

(57) ABSTRACT

Disclosed is a method for a terminal to receive a reference signal in a wireless communication system. In particular, the method comprises: receiving first information related to a reference signal configuration from a serving cell; receiving the reference signal from a neighbor cell on the basis of the first information; and obtaining second information on the timing of the reference signal on the basis of the sequence
(Continued)

of the reference signal, wherein the reference signal is of a different type from a SS/PBCH block.

5 Claims, 40 Drawing Sheets

(51) Int. Cl.
  *H04W 24/08* (2009.01)
  *H04W 36/04* (2009.01)
  *H04W 56/00* (2009.01)

(56) References Cited

U.S. PATENT DOCUMENTS

| | | | |
|---|---|---|---|
| 2015/0043369 | A1 | 2/2015 | Kim et al. |
| 2015/0351063 | A1* | 12/2015 | Charbit ............ H04W 56/0015 370/329 |
| 2016/0088500 | A1* | 3/2016 | Chen ................ H04L 5/0092 370/280 |
| 2016/0242083 | A1* | 8/2016 | Guan ................ H04W 36/0085 |
| 2017/0289831 | A1 | 10/2017 | Park et al. |
| 2018/0279145 | A1* | 9/2018 | Jung ................ H04L 5/0051 |
| 2018/0368054 | A1* | 12/2018 | Sheng ................ H04L 5/0051 |
| 2018/0368088 | A1* | 12/2018 | Nagaraja ............ H04W 72/0406 |
| 2019/0123874 | A1* | 4/2019 | Liu ................ H04L 5/005 |
| 2020/0067673 | A1* | 2/2020 | Luo ................ H04B 7/0626 |

FOREIGN PATENT DOCUMENTS

| | | |
|---|---|---|
| JP | 2017513295 | 5/2017 |
| WO | 2020235457 | 11/2020 |

OTHER PUBLICATIONS

Fujitsu, "On remaining details of synchronization signal," 3GPP TSG RAN WG1, Meeting 90bis, R1-1717713, Prague, Czech Republic, Oct. 9-13, 2017, 9 pages.

LG Electronics, "Remaining Details on PBCH design and contents," 3GPP TSG RAN WG1, Meeting 90bis, R1-1717926, Prague, Czech Republic, Oct. 9-13, 2017, 19 pages.

Catt, "Mobility Management based on SS block and CSI-RS measurements," 3GPP TSG RAN WG1, Meeting 90bis, R1-1717804, Prague, Czech Republic, Oct. 9-13, 2017, 10 pages.

Samsung, "Remaining Issues on the NR Mobility," 3GPP TSG RAN WG1 #90b, R1-1717583, Prague, Czech Republic, Oct. 9-13, 2017, 17 pages.

European Patent Office Application Serial No. 18878660.2, Search Report dated Aug. 31, 2021, 14 pages.

LG Electronics, "Remaining Details on Synchronization signal," R1-1719892, 3GPP TSG RAN WG1 Meeting #91, Dec. 2017, 11 pages.

LG Electronics, "Remaining Details on PBCH design and contents," R1-1719893, 3GPP TSG RAN WG1 Meeting #91, Dec. 2017, 9 pages.

LG Electronics, "RMSI delivery and CORESET configuration," R1-1719894, 3GPP TSG RAN WG1 Meeting #91, Dec. 2017, 15 pages.

Japan Patent Office Application No. 2020-526904, Final Office Action dated Apr. 12, 2022, 3 pages.

LG Electronics, "Maintenance for Downlink signals and channels", R1-1810248, 3GPP TSG RAN WG1 Meeting #94bis, Oct. 2018, 8 pages.

The State Intellectual Property Office of the People's Republic of China Application Serial No. 201880085632.9, Office Action dated Sep. 9, 2022, 7 pages.

Japan Patent Office Application No. 2011-551994, Notice of Allowance dated Oct. 18, 2022, 2 pages.

Samsung, "On Beam Management, Measurement and Reporting", R1-1720290, 3GPP TSG RAN WG1 Meeting 91, Dec. 2017, 15 pages.

Intel Corporation, "Radio Link Monitoring for NR", R1-1716283, 3GPP TSG RAN WG1 Meeting NR Ad-hoc #3, Sep. 2017, 5 pages.

Intel Corporation, "Summary of discussion for NR measurements for mobility", R1-1809732, 3GPP TSG RAN WG1 Meeting #94, Aug. 2018, 20 pages.

\* cited by examiner (A) CONTROL-PLANE PROTOCOL STACK (B) USER-PLANE PROTOCOL STACK (a)

(b)

(c)

(a)

(b)

METHOD FOR TRANSMITTING AND RECEIVING REFERENCE SIGNAL AND DEVICE THEREFOR

CROSS-REFERENCE TO RELATED APPLICATIONS

This application is the National Stage filing under 35 U.S.C. 371 of International Application No. PCT/KR2018/014133, filed on Nov. 16, 2018, which claims the benefit of U.S. Provisional Application Nos. 62/587,495, filed on Nov. 17, 2017, and 62/739,007, filed on Sep. 28, 2018, the contents of which are all hereby incorporated by reference herein in their entirety.

TECHNICAL FIELD

The present disclosure relates to a method of transmitting and receiving a reference signal and an apparatus therefor and, more particularly, to a method and apparatus for obtaining time information of a neighbor cell based on a sequence of a reference signal upon receiving a synchronization signal block and the reference signal from a serving cell and the neighbor cell, respectively.

BACKGROUND ART

As more and more communication devices demand larger communication traffic along with the current trends, a future-generation $5^{th}$ generation (5G) system is required to provide an enhanced wireless broadband communication, compared to the legacy LTE system. In the future-generation 5G system, communication scenarios are divided into enhanced mobile broadband (eMBB), ultra-reliability and low-latency communication (URLLC), massive machine-type communication (mMTC), and so on.

Herein, eMBB is a future-generation mobile communication scenario characterized by high spectral efficiency, high user experienced data rate, and high peak data rate, URLLC is a future-generation mobile communication scenario characterized by ultra-high reliability, ultra-low latency, and ultra-high availability (e.g., vehicle to everything (V2X), emergency service, and remote control), and mMTC is a future-generation mobile communication scenario characterized by low cost, low energy, short packet, and massive connectivity (e.g., Internet of things (IoT)).

DETAILED DESCRIPTION OF THE DISCLOSURE

Technical Problems

The present disclosure provides a method of transmitting and receiving a reference signal and an apparatus therefor.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solutions

According to an aspect of the present disclosure, provided herein is a method of receiving a reference signal by a user equipment (UE) in a wireless communication system, including receiving first information related to a reference signal configuration from a serving cell, receiving the reference signal from a neighbor cell based on the first information, and obtaining second information about a timing of the reference signal based on a sequence of the reference signal, wherein the reference signal differs in type from a synchronization signal/physical broadcast channel (SS/PBCH) block.

The second information may be information about a half-frame in which the reference signal is transmitted.

The second information may be information about at least one of a slot or an orthogonal frequency division multiplexing (OFDM) symbol in which the reference signal is transmitted.

The second information may be information related to an index of an SS/PBCH block received from the neighbor cell.

The second information may include 3 most significant bits for the index of the SS/PBCH block received from the neighbor cell.

The reference signal may be mapped to resources positioned within a predetermined range from resources to which an SS/PBCH block received from the neighbor cell is mapped.

The reference signal may correspond to a channel state information-reference signal (CSI-RS).

The reference signal may correspond to a demodulation reference signal (DMRS) and the DMRS may be mapped to a region for which mapping of the SS/PBCH block is skipped.

The method may further include performing handover from the serving cell to the neighbor cell based on the second information.

The method may further include performing measurement for the neighbor cell based on the second information.

In another aspect of the present disclosure, provided herein is a communication apparatus for receiving a reference signal in a wireless communication system, including a memory; and a processor connected to the memory, wherein the processor performs control to receive first information related to a reference signal configuration from a serving cell, receive the reference signal from a neighbor cell based on the first information, and obtain second information about a timing of the reference signal based on a sequence of the reference signal, and wherein the reference signal differs in type from a synchronization signal/physical broadcast channel (SS/PBCH) block.

In another aspect of the present disclosure, provided herein is a method of transmitting a reference signal by a neighbor cell in a wireless communication system, including generating a sequence of the reference signal based on first information about a timing of the reference signal, mapping the sequence of the reference signal to resource elements based on first information related to a reference signal configuration transmitted to a user equipment (UE) by a serving cell, and transmitting the reference signal to the UE, wherein the reference signal differs in type from a synchronization signal/physical broadcast channel (SS/PBCH) block.

Advantageous Effects

According to the present disclosure, since an index of a synchronization signal block received from a neighbor cell may be obtained although the synchronization signal block received from the neighbor cell is not decoded, decoding complexity may be reduced.

The effects that can be achieved with the present disclosure are not limited to what has been particularly described hereinabove and other advantages not described herein will be more clearly understood by persons skilled in the art from the following detailed description of the present disclosure.

BEST MODE FOR CARRYING OUT THE DISCLOSURE

Figure 1:
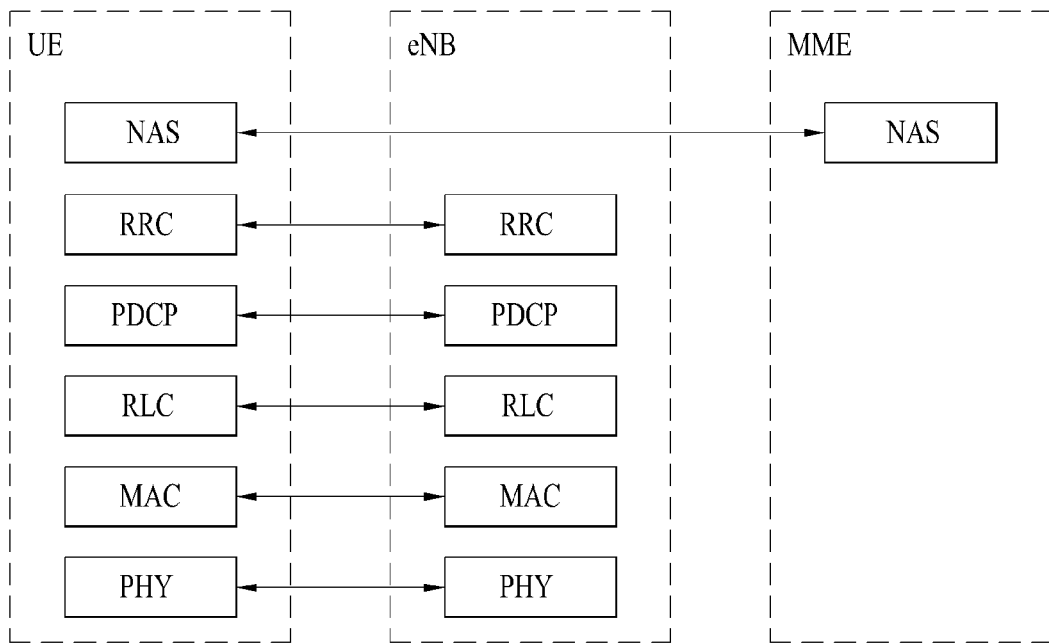
FIG. 1 is a view illustrating the control-plane and user-plane architecture of radio interface protocols between a user equipment (UE) and an evolved UMTS terrestrial radio access network (E-UTRAN) in conformance to a 3rd generation partnership project (3GPP) radio access network standard.
Figure 1:
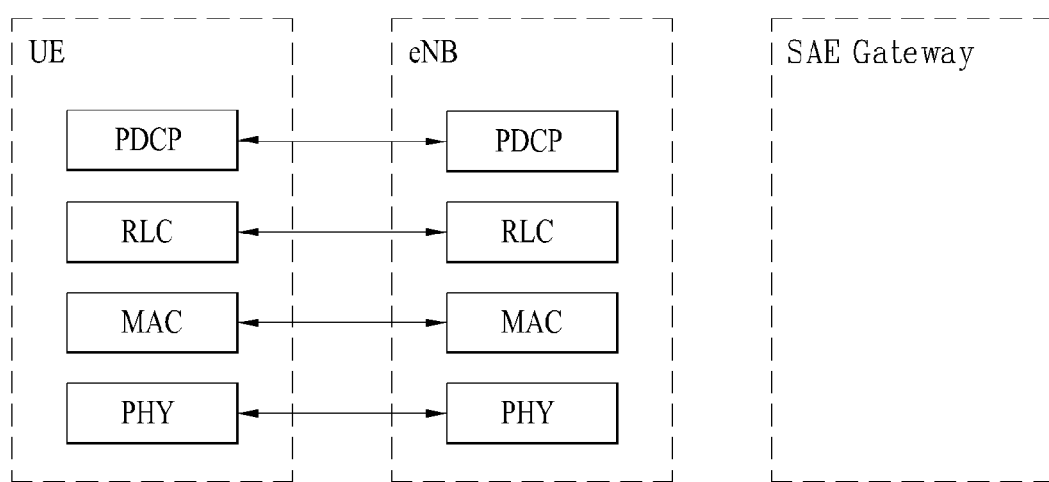

The configuration, operation, and other features of the present disclosure will readily be understood with embodiments of the present disclosure described with reference to the attached drawings. Embodiments of the present disclosure as set forth herein are examples in which the technical features of the present disclosure are applied to a 3rd generation partnership project (3GPP) system.

While embodiments of the present disclosure are described in the context of long term evolution (LTE) and LTE-advanced (LTE-A) systems, they are purely exemplary. Therefore, the embodiments of the present disclosure are applicable to any other communication system as long as the above definitions are valid for the communication system.

The term, base station (BS) may be used to cover the meanings of terms including remote radio head (RRH), evolved Node B (eNB or eNode B), transmission point (TP), reception point (RP), relay, and so on.

The 3GPP communication standards define downlink (DL) physical channels corresponding to resource elements (REs) carrying information originated from a higher layer, and DL physical signals which are used in the physical layer and correspond to REs which do not carry information originated from a higher layer. For example, physical downlink shared channel (PDSCH), physical broadcast channel (PBCH), physical multicast channel (PMCH), physical control format indicator channel (PCFICH), physical downlink control channel (PDCCH), and physical hybrid ARQ indicator channel (PHICH) are defined as DL physical channels, and reference signals (RSs) and synchronization signals (SSs) are defined as DL physical signals. An RS, also called a pilot signal, is a signal with a predefined special waveform known to both a gNode B (gNB) and a user equipment (UE). For example, cell specific RS, UE-specific RS (UE-RS), positioning RS (PRS), and channel state information RS (CSI-RS) are defined as DL RSs. The 3GPP LTE/LTE-A standards define uplink (UL) physical channels corresponding to REs carrying information originated from a higher layer, and UL physical signals which are used in the physical layer and correspond to REs which do not carry information originated from a higher layer. For example, physical uplink shared channel (PUSCH), physical uplink control channel (PUCCH), and physical random access channel (PRACH) are defined as UL physical channels, and a demodulation reference signal (DMRS) for a UL control/data signal, and a sounding reference signal (SRS) used for UL channel measurement are defined as UL physical signals.

In the present disclosure, the PDCCH/PCFICH/PHICH/PDSCH refers to a set of time-frequency resources or a set of REs, which carry downlink control information (DCI)/a control format indicator (CFI)/a DL acknowledgement/negative acknowledgement (ACK/NACK)/DL data. Further, the PUCCH/PUSCH/PRACH refers to a set of time-frequency resources or a set of REs, which carry UL control information (UCI)/UL data/a random access signal. In the present disclosure, particularly a time-frequency resource or an RE which is allocated to or belongs to the PDCCH/PCFICH/PHICH/PDSCH/PUCCH/PUSCH/PRACH is referred to as a PDCCH RE/PCFICH RE/PHICH RE/PDSCH RE/PUCCH RE/PUSCH RE/PRACH RE or a PDCCH resource/PCFICH resource/PHICH resource/PDSCH resource/PUCCH resource/PUSCH resource/PRACH resource. Hereinbelow, if it is said that a UE transmits a PUCCH/PUSCH/PRACH, this means that UCI/UL data/a random access signal is transmitted on or through the PUCCH/PUSCH/PRACH. Further, if it is said that a gNB transmits a PDCCH/PCFICH/PHICH/PDSCH, this means that DCI/control information is transmitted on or through the PDCCH/PCFICH/PHICH/PDSCH.

Hereinbelow, an orthogonal frequency division multiplexing (OFDM) symbol/carrier/subcarrier/RE to which a CRS/DMRS/CSI-RS/SRS/UE-RS is allocated to or for which the CRS/DMRS/CSI-RS/SRS/UE-RS is configured is referred to as a CRS/DMRS/CSI-RS/SRS/UE-RS symbol/carrier/subcarrier/RE. For example, an OFDM symbol to which a tracking RS (TRS) is allocated or for which the TRS is configured is referred to as a TRS symbol, a subcarrier to which a TRS is allocated or for which the TRS is configured is referred to as a TRS subcarrier, and an RE to which a TRS is allocated or for which the TRS is configured is referred to as a TRS RE. Further, a subframe configured to transmit a TRS is referred to as a TRS subframe. Further, a subframe carrying a broadcast signal is referred to as a broadcast subframe or a PBCH subframe, and a subframe carrying a synchronization signal (SS) (e.g., a primary synchronization signal (PSS) and/or a secondary synchronization signal (SSS)) is referred to as an SS subframe or a PSS/SSS subframe. An OFDM symbol/subcarrier/RE to which a PSS/SSS is allocated or for which the PSS/SSS is configured is referred to as a PSS/SSS symbol/subcarrier/RE.

In the present disclosure, a CRS port, a UE-RS port, a CSI-RS port, and a TRS port refer to an antenna port configured to transmit a CRS, an antenna port configured to transmit a UE-RS, an antenna port configured to transmit a CSI-RS, and an antenna port configured to transmit a TRS, respectively. Antenna port configured to transmit CRSs may be distinguished from each other by the positions of REs occupied by the CRSs according to CRS ports, antenna ports configured to transmit UE-RSs may be distinguished from each other by the positions of REs occupied by the UE-RSs according to UE-RS ports, and antenna ports configured to transmit CSI-RSs may be distinguished from each other by the positions of REs occupied by the CSI-RSs according to CSI-RS ports. Therefore, the term CRS/UE-RS/CSI-RS/TRS port is also used to refer to a pattern of REs occupied by a CRS/UE-RS/CSI-RS/TRS in a predetermined resource area.

FIG. 1 illustrates control-plane and user-plane protocol stacks in a radio interface protocol architecture conforming to a 3GPP wireless access network standard between a UE and an evolved UMTS terrestrial radio access network (E-UTRAN). The control plane is a path in which the UE and the E-UTRAN transmit control messages to manage calls, and the user plane is a path in which data generated from an application layer, for example, voice data or Internet packet data is transmitted.

A physical (PHY) layer at layer 1 (L1) provides information transfer service to its higher layer, a medium access control (MAC) layer. The PHY layer is connected to the MAC layer via transport channels. The transport channels deliver data between the MAC layer and the PHY layer. Data is transmitted on physical channels between the PHY layers of a transmitter and a receiver. The physical channels use time and frequency as radio resources. Specifically, the physical channels are modulated in orthogonal frequency division multiple access (OFDMA) for downlink (DL) and in single carrier frequency division multiple access (SC-FDMA) for uplink (UL).

The MAC layer at layer 2 (L2) provides service to its higher layer, a radio link control (RLC) layer via logical channels. The RLC layer at L2 supports reliable data transmission. RLC functionality may be implemented in a function block of the MAC layer. A packet data convergence protocol (PDCP) layer at L2 performs header compression to reduce the amount of unnecessary control information and thus efficiently transmit Internet protocol (IP) packets such as IP version 4 (IPv4) or IP version 6 (IPv6) packets via an air interface having a narrow bandwidth.

A radio resource control (RRC) layer at the lowest part of layer 3 (or L3) is defined only on the control plane. The RRC layer controls logical channels, transport channels, and physical channels in relation to configuration, reconfiguration, and release of radio bearers. A radio bearer refers to a service provided at L2, for data transmission between the UE and the E-UTRAN. For this purpose, the RRC layers of the UE and the E-UTRAN exchange RRC messages with each other. If an RRC connection is established between the UE and the E-UTRAN, the UE is in RRC Connected mode and otherwise, the UE is in RRC Idle mode. A Non-Access Stratum (NAS) layer above the RRC layer performs functions including session management and mobility management.

DL transport channels used to deliver data from the E-UTRAN to UEs include a broadcast channel (BCH) carrying system information, a paging channel (PCH) carrying a paging message, and a shared channel (SCH) carrying user traffic or a control message. DL multicast traffic or control messages or DL broadcast traffic or control messages may be transmitted on a DL SCH or a separately defined DL multicast channel (MCH). UL transport channels used to deliver data from a UE to the E-UTRAN include a random access channel (RACH) carrying an initial control message and a UL SCH carrying user traffic or a control message. Logical channels that are defined above transport channels and mapped to the transport channels include a broadcast control channel (BCCH), a paging control channel (PCCH), a Common Control Channel (CCCH), a multicast control channel (MCCH), a multicast traffic channel (MTCH), etc.

Figure 2:
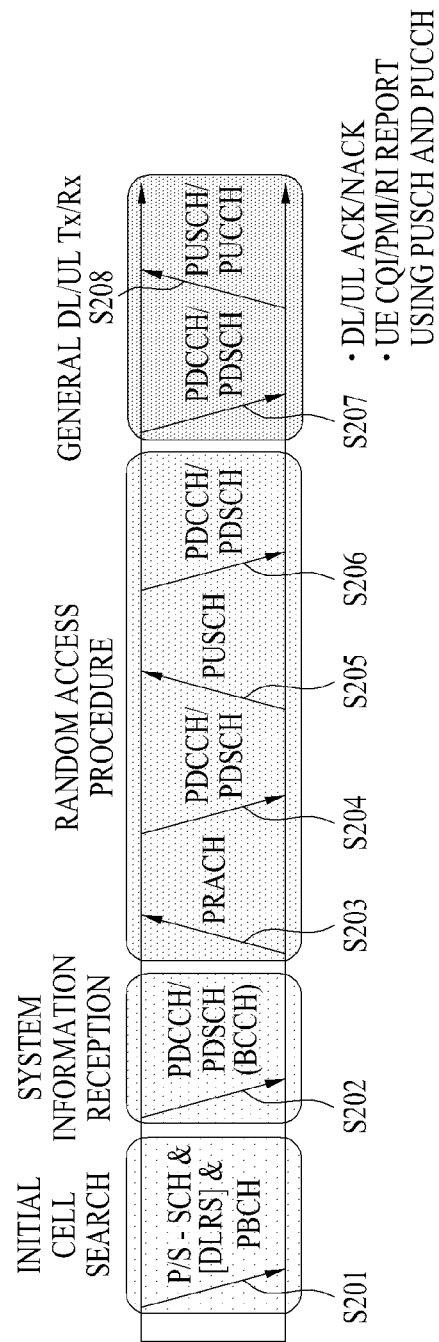
FIG. 2 is a view illustrating physical channels and a general signal transmission method using the physical channels in a 3GPP system.

FIG. 2 illustrates physical channels and a general method for transmitting signals on the physical channels in the 3GPP system.

Referring to FIG. 2, when a UE is powered on or enters a new cell, the UE performs initial cell search (S201). The initial cell search involves acquisition of synchronization to an eNB. Specifically, the UE synchronizes its timing to the eNB and acquires a cell identifier (ID) and other information by receiving a primary synchronization channel (P-SCH) and a secondary synchronization channel (S-SCH) from the eNB. Then the UE may acquire information broadcast in the cell by receiving a physical broadcast channel (PBCH) from the eNB. During the initial cell search, the UE may monitor a DL channel state by receiving a downlink reference signal (DL RS).

After the initial cell search, the UE may acquire detailed system information by receiving a physical downlink control channel (PDCCH) and receiving a physical downlink shared channel (PDSCH) based on information included in the PDCCH (S202).

If the UE initially accesses the eNB or has no radio resources for signal transmission to the eNB, the UE may perform a random access procedure with the eNB (S203 to S206). In the random access procedure, the UE may transmit a predetermined sequence as a preamble on a physical random access channel (PRACH) (S203 and S205) and may receive a response message to the preamble on a PDCCH and a PDSCH associated with the PDCCH (S204 and S206). In the case of a contention-based RACH, the UE may additionally perform a contention resolution procedure.

After the above procedure, the UE may receive a PDCCH and/or a PDSCH from the eNB (S207) and transmit a physical uplink shared channel (PUSCH) and/or a physical uplink control channel (PUCCH) to the eNB (S208), which is a general DL and UL signal transmission procedure. Particularly, the UE receives downlink control information (DCI) on a PDCCH. Herein, the DCI includes control information such as resource allocation information for the UE. Different DCI formats are defined according to different usages of DCI.

Control information that the UE transmits to the eNB on the UL or receives from the eNB on the DL includes a DL/UL acknowledgment/negative acknowledgment (ACK/NACK) signal, a channel quality indicator (CQI), a precoding matrix index (PMI), a rank indicator (RI), etc. In the 3GPP LTE system, the UE may transmit control information such as a CQI, a PMI, an RI, etc. on a PUSCH and/or a PUCCH.

<Radio Resource Management (RRM) Measurement in LTE>

The LTE system supports an RRM operation including power control, scheduling, cell search, cell re-selection, handover, radio link or connection monitoring, connection establishment/re-establishment, and the like. In this case, a serving cell may request that the UE transmit RRM measurement information, which is a measurement value for performing the RRM operation. Particularly, in the LTE system, the UE may measure and report cell search information, reference signal received power (RSRP), and reference signal received quality (RSRQ) of each cell. Specifically, in the LTE system, the UE receives 'measConfig' as a higher-layer signal for RRM measurement from the serving cell. Then, the UE measures RSRP or RSRQ according to information of 'measConfig'. Here, RSRP, RSRQ, and a received signal strength indicator (RSSI) according to TS 36.214 of the LTE system are defined as follows.

RSRP: RSRP is defined as a linear average over power contributions (in [W]) of REs of cell-specific reference signals (CRSs) transmitted within a measurement frequency bandwidth. For RSRP determination CRS R0 according to TS 36.211 is used. In some cases, in order to raise reliability, CRS R1 may be additionally used. A reference point for RSRP should be an antenna connector of the UE. If reception diversity is used, the reported RSRP value should not be lower than a corresponding RSRP of any one of individual diversity branches.

RSRQ: RSRQ is defined as N*RSRP/(E-UTRA carrier RSSI), where N is the number of resource blocks (RBs) of E-UTRA carrier RSSI measurement bandwidth. Measurements in 'N*RSRP' and 'E-UTRA carrier RSSI' should be made over the same set of RBs.

E-UTRA carrier RSSI, is obtained from the linear average of the total received power observed only in OFDM symbols containing reference symbols for antenna port 0, over N RBs from all sources, including co-channel serving and non-serving cells, adjacent channel interference, thermal noise, etc.

If higher-layer signaling indicates specific subframes for performing RSRQ measurement, then RSSI is measured over all OFDM symbols in the indicated subframes. Even in this case, a reference point for RSRQ should be the antenna connector of the UE. If reception diversity is used, the reported RSRQ value should not be lower than a corresponding RSRQ of any one of individual diversity branches.

RSSI: RSSI indicates received wide band power, including thermal noise and noise generated within bandwidth defined by a receiver pulse shaping filter. Even in this case, a reference point for RSSI should be the antenna connector of the UE. If reception diversity is used, the reported RSSI value should not be lower than a corresponding RSSI of any one of individual diversity branches.

According to the above definition, in the case of intra-frequency measurement, the UE operating in the LTE system is allowed to measure RSRP in a bandwidth corresponding to one of 6, 15, 25, 50, 75, and 100 RBs, indicated by an allowed measurement bandwidth related information element (IE) transmitted in system information block type 3 (SIB3). Alternatively, in the case of inter-frequency measurement, the UE is allowed to measure RSRP in a bandwidth corresponding to one of 6, 15, 25, 50, 75, and 100 RBs, indicated by an allowed measurement bandwidth transmitted in system information block type 5 (SIB5). In the absence of the IE, the UE may measure RSRP in all frequency bands of a DL system by default. In this case, upon receiving information about an allowed measurement bandwidth, the UE may regard a corresponding value as a maximum measurement bandwidth and freely measure the value of RSRP within the corresponding value.

However, if the serving cell transmits an IE defined as a wide band RSRQ (WB-RSRQ) and sets the allowed measurement bandwidth to 50 RBs or more, the UE needs to calculate the value of RSRP for a total allowed measurement bandwidth. Meanwhile, for RSSI, the UE measures RSSI in a frequency bandwidth of a receiver of the UE according to definition of an RSSI bandwidth.

A new RAT (NR) communication system is required to support significantly better performance than a legacy fourth-generation (4G) system in terms of data rate, capacity, latency, energy consumption, and cost. Therefore, the NR system needs to make a considerable advance in the areas of bandwidth, spectral, energy, and signaling efficiencies and cost per bit.

<Reference Signal (RS)>

Generally, for channel measurement, an RS known to both a transmitting side and a receiving side is transmitted to the receiving side by the transmitting side along with data. The RS serves to perform demodulation by indicating a modulation scheme as well as channel measurement. The RS is classified into a dedicated RS (DRS) for an eNB and a specific UE, i.e., a UE-specific RS, and a common RS (or cell-specific RS (CRS)) for all UEs within a cell. The CRS includes an RS used by a UE to measure a CQI/PMI/RI to be reported to the eNB and this RS is referred to as a channel state information-RS (CSI-RS).

Figure 3:
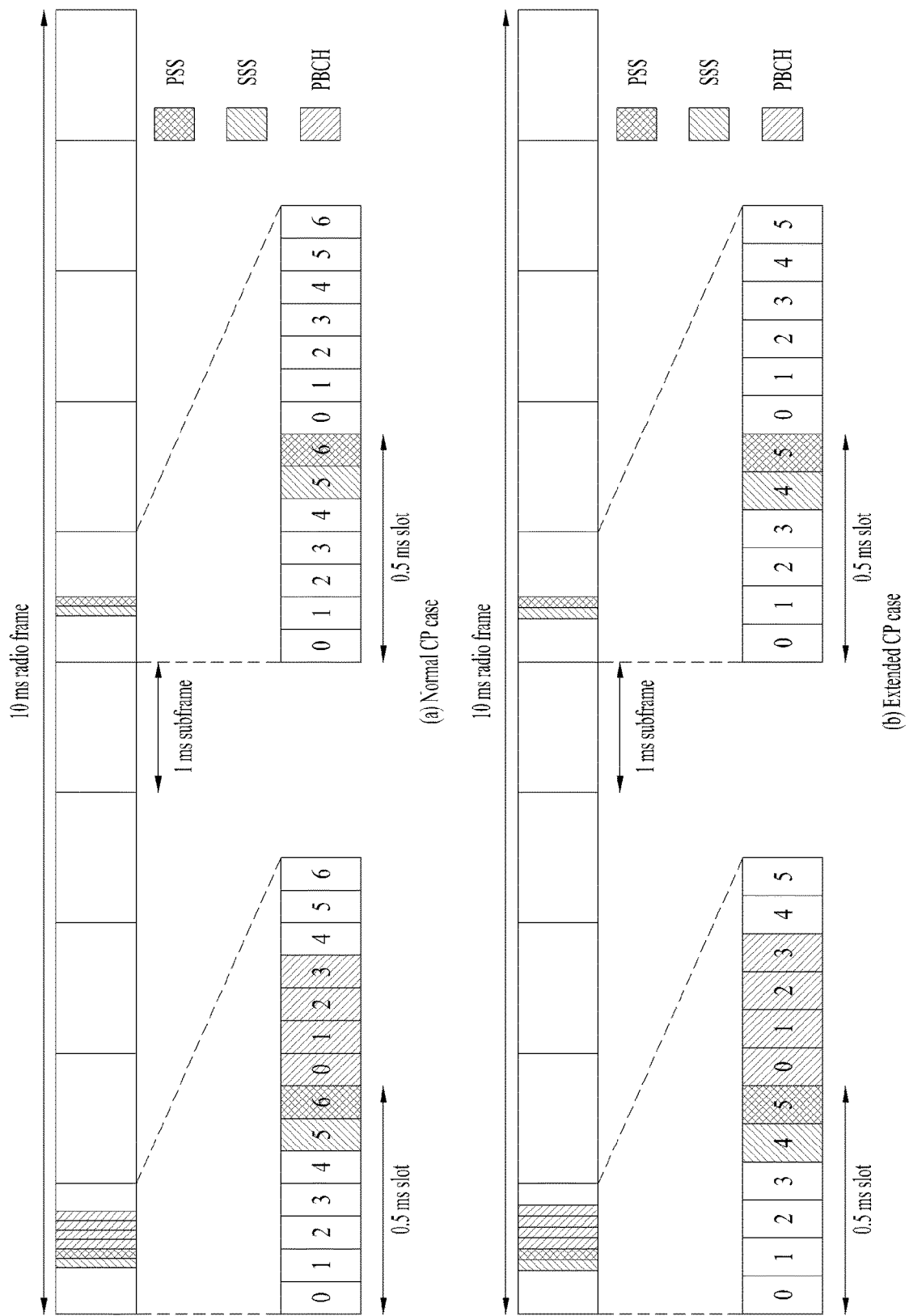
FIG. 3 is a view illustrating a radio frame structure for transmitting a synchronization signal (SS) in a long term evolution (LTE) system.

FIG. 3 is a diagram illustrating a radio frame structure for transmitting a synchronization signal (SS) in LTE system. In particular, FIG. 3 illustrates a radio frame structure for transmitting a synchronization signal and PBCH in frequency division duplex (FDD). FIG. 3(a) shows positions at which the SS and the PBCH are transmitted in a radio frame configured by a normal cyclic prefix (CP) and FIG. 3(b) shows positions at which the SS and the PBCH are transmitted in a radio frame configured by an extended CP.

An SS will be described in more detail with reference to FIG. 3. An SS is categorized into a primary synchronization signal (PSS) and a secondary synchronization signal (SSS). The PSS is used to acquire time-domain synchronization such as OFDM symbol synchronization, slot synchronization, etc. and/or frequency-domain synchronization. And, the SSS is used to acquire frame synchronization, a cell group ID, and/or a CP configuration of a cell (i.e. information indicating whether to a normal CP or an extended is used). Referring to FIG. 3, a PSS and an SSS are transmitted through two OFDM symbols in each radio frame. Particularly, the SS is transmitted in first slot in each of subframe 0 and subframe 5 in consideration of a GSM (Global System for Mobile communication) frame length of 4.6 ms for facilitation of inter-radio access technology (inter-RAT) measurement. Especially, the PSS is transmitted in a last OFDM symbol in each of the first slot of subframe 0 and the first slot of subframe 5. And, the SSS is transmitted in a second to last OFDM symbol in each of the first slot of subframe 0 and the first slot of subframe 5. Boundaries of a corresponding radio frame may be detected through the SSS. The PSS is transmitted in the last OFDM symbol of the corresponding slot and the SSS is transmitted in the OFDM symbol immediately before the OFDM symbol in which the PSS is transmitted. According to a transmission diversity scheme for the SS, only a single antenna port is used. However, the transmission diversity scheme for the SS standards is not separately defined in the current standard.

Referring to FIG. 3, by detecting the PSS, a UE may know that a corresponding subframe is one of subframe 0 and subframe 5 since the PSS is transmitted every 5 ms but the UE cannot know whether the subframe is subframe 0 or subframe 5. That is, frame synchronization cannot be obtained only from the PSS. The UE detects the boundaries of the radio frame in a manner of detecting an SSS which is transmitted twice in one radio frame with different sequences.

Having demodulated a DL signal by performing a cell search procedure using the PSS/SSS and determined time and frequency parameters necessary to perform UL signal transmission at an accurate time, a UE can communicate with an eNB only after obtaining system information necessary for a system configuration of the UE from the eNB.

The system information is configured with a master information block (MIB) and system information blocks (SIBs). Each SIB includes a set of functionally related parameters and is categorized into an MIB, SIB Type 1 (SIB1), SIB Type 2 (SIB2), and SIB3 to SIB8 according to the included parameters.

The MIB includes most frequently transmitted parameters which are essential for a UE to initially access a network served by an eNB. The UE may receive the MIB through a broadcast channel (e.g. a PBCH). The MIB includes a downlink system bandwidth (DL BW), a PHICH configuration, and a system frame number (SFN). Thus, the UE can explicitly know information on the DL BW, SFN, and PHICH configuration by receiving the PBCH. On the other hand, the UE may implicitly know information on the number of transmission antenna ports of the eNB. The information on the number of the transmission antennas of the eNB is implicitly signaled by masking (e.g. XOR operation) a sequence corresponding to the number of the transmission antennas to 16-bit cyclic redundancy check (CRC) used in detecting an error of the PBCH.

The SIB1 includes not only information on time-domain scheduling for other SIBs but also parameters necessary to determine whether a specific cell is suitable in cell selection. The UE receives the SIB1 via broadcast signaling or dedicated signaling.

A DL carrier frequency and a corresponding system bandwidth can be obtained by MIB carried by PBCH. A UL carrier frequency and a corresponding system bandwidth can be obtained through system information corresponding to a DL signal. Having received the MIB, if there is no valid system information stored in a corresponding cell, a UE applies a value of a DL BW included in the MIB to a UL bandwidth until system information block type 2 (SystemInformationBlockType2, SIB2) is received. For example, if the UE obtains the SIB2, the UE is able to identify the entire UL system bandwidth capable of being used for UL transmission through UL-carrier frequency and UL-bandwidth information included in the SIB2.

In the frequency domain, PSS/SSS and PBCH are transmitted irrespective of an actual system bandwidth in total 6 RBs, i.e., 3 RBs in the left side and 3 RBs in the right side with reference to a DC subcarrier within a corresponding OFDM symbol. In other words, the PSS/SSS and the PBCH are transmitted only in 72 subcarriers. Therefore, a UE is configured to detect or decode the SS and the PBCH irrespective of a downlink transmission bandwidth configured for the UE.

Having completed the initial cell search, the UE can perform a random access procedure to complete the accessing the eNB. To this end, the UE transmits a preamble via PRACH (physical random access channel) and can receive a response message via PDCCH and PDSCH in response to the preamble. In case of contention based random access, it may transmit additional PRACH and perform a contention resolution procedure such as PDCCH and PDSCH corresponding to the PDCCH.

Having performed the abovementioned procedure, the UE can perform PDCCH/PDSCH reception and PUSCH/PUCCH transmission as a general UL/DL signal transmission procedure.

The random access procedure is also referred to as a random access channel (RACH) procedure. The random access procedure is used for various usages including initial access, UL synchronization adjustment, resource allocation, handover, and the like. The random access procedure is categorized into a contention-based procedure and a dedicated (i.e., non-contention-based) procedure. In general, the contention-based random access procedure is used for performing initial access. On the other hand, the dedicated random access procedure is restrictively used for performing handover, and the like. When the contention-based random access procedure is performed, a UE randomly selects a RACH preamble sequence. Hence, a plurality of UEs can transmit the same RACH preamble sequence at the same time. As a result, a contention resolution procedure is required thereafter. On the contrary, when the dedicated random access procedure is performed, the UE uses an RACH preamble sequence dedicatedly allocated to the UE by an eNB. Hence, the UE can perform the random access procedure without a collision with a different UE.

The contention-based random access procedure includes 4 steps described in the following. Messages transmitted via the 4 steps can be respectively referred to as message (Msg) 1 to 4 in the present disclosure.

Step 1: RACH preamble (via PRACH) (UE to eNB)
Step 2: Random access response (RAR) (via PDCCH and PDSCH (eNB to)
Step 3: Layer 2/Layer 3 message (via PUSCH) (UE to eNB)
Step 4: Contention resolution message (eNB to UE)

On the other hand, the dedicated random access procedure includes 3 steps described in the following. Messages transmitted via the 3 steps can be respectively referred to as message (Msg) 0 to 2 in the present disclosure. It may also perform uplink transmission (i.e., step 3) corresponding to PAR as a part of the ransom access procedure. The dedicated random access procedure can be triggered using PDCCH (hereinafter, PDCCH order) which is used for an eNB to indicate transmission of an RACH preamble.

Step 0: RACH preamble assignment via dedicated signaling (eNB to UE)
Step 1: RACH preamble (via PRACH) (UE to eNB)
Step 2: Random access response(RAR) (via PDCCH and PDSCH) (eNB to UE)

After the RACH preamble is transmitted, the UE attempts to receive a random access response (RAR) in a preconfigured time window. Specifically, the UE attempts to detect PDCCH (hereinafter, RA-RNTI PDCCH) (e.g., a CRC masked with RA-RNTI in PDCCH) having RA-RNTI (random access RNTI) in a time window. If the RA-RNTI PDCCH is detected, the UE checks whether or not there is a RAR for the UE in PDSCH corresponding to the RA-RNTI PDCCH. The RAR includes timing advance (TA) information indicating timing offset information for UL synchronization, UL resource allocation information (UL grant information), a temporary UE identifier (e.g., temporary cell-RNTI, TC-RNTI), and the like. The UE can perform UL transmission (e.g., message 3) according to the resource allocation information and the TA value included in the RAR. HARQ is applied to UL transmission corresponding to the RAR. In particular, the UE can receive reception response information (e.g., PHICH) corresponding to the message 3 after the message 3 is transmitted.

A random access preamble (i.e. RACH preamble) consists of a cyclic prefix of a length of TCP and a sequence part of a length of TSEQ. The TCP and the TSEQ depend on a frame structure and a random access configuration. A preamble format is controlled by higher layer. The RACH preamble is transmitted in a UL subframe. Transmission of the random access preamble is restricted to a specific time resource and a frequency resource. The resources are referred to as PRACH resources. In order to match an index 0 with a PRB and a subframe of a lower number in a radio frame, the PRACH resources are numbered in an ascending order of PRBs in subframe numbers in the radio frame and frequency domain. Random access resources are defined according to a PRACH configuration index (refer to 3GPP TS 36.211 standard document). The RACH configuration index is provided by a higher layer signal (transmitted by an eNB).

In the LTE/LTE-A system, a subcarrier spacing for a random access preamble (i.e., RACH preamble) is regulated by 1.25 kHz and 7.5 kHz for preamble formats 0 to 3 and a preamble format 4, respectively (refer to 3GPP TS 36.211).

Figure 4:
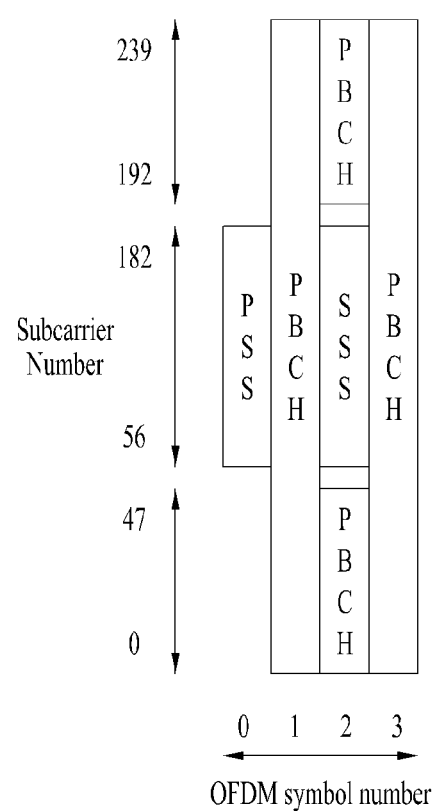
FIG. 4 is a view illustrating a structure of a synchronization signal/physical broadcast channel (SS/PBCH) block.

FIG. 4 illustrates a synchronization signal block (SSB) structure. The UE may perform cell search, system information acquisition, beam alignment for initial access, DL measurement, etc. based on an SSB. The SSB is used interchangeably with a synchronization signal/physical broadcast channel (SS/PBCH) block.

Referring to FIG. 4, the SSB is composed of a PSS, an SSS, and a PBCH. The SSB is composed of four consecutive OFDM symbols. The PSS, the PBCH, the SSS/PBCH, and the PBCH are transmitted on each OFDM symbol, respectively. The PSS and the SSS are each composed of one OFDM symbol and 127 subcarriers, and the PBCH is composed of 3 OFDM symbols and 576 subcarriers. Polar coding and quadrature phase shift keying (QPSK) are applied to the PBCH. The PBCH is composed of a data RE and a demodulation reference signal (DMRS) RE for each OFDM symbol. There are three DMRS REs per RB, and there are three data REs between the DMRS REs.

The NR system uses an OFDM transmission scheme or a similar transmission system. The NT system may conform to OFDM parameters different from OFDM parameters of LTE. Alternatively, the NR system may conform to the numerology of legacy LTE/LTE-A, but have a larger system bandwidth (e.g., 100 MHz). Alternatively, one cell may support a plurality of numerologies. That is, UEs operating with different numerologies may coexist within one cell.

Figure 5:
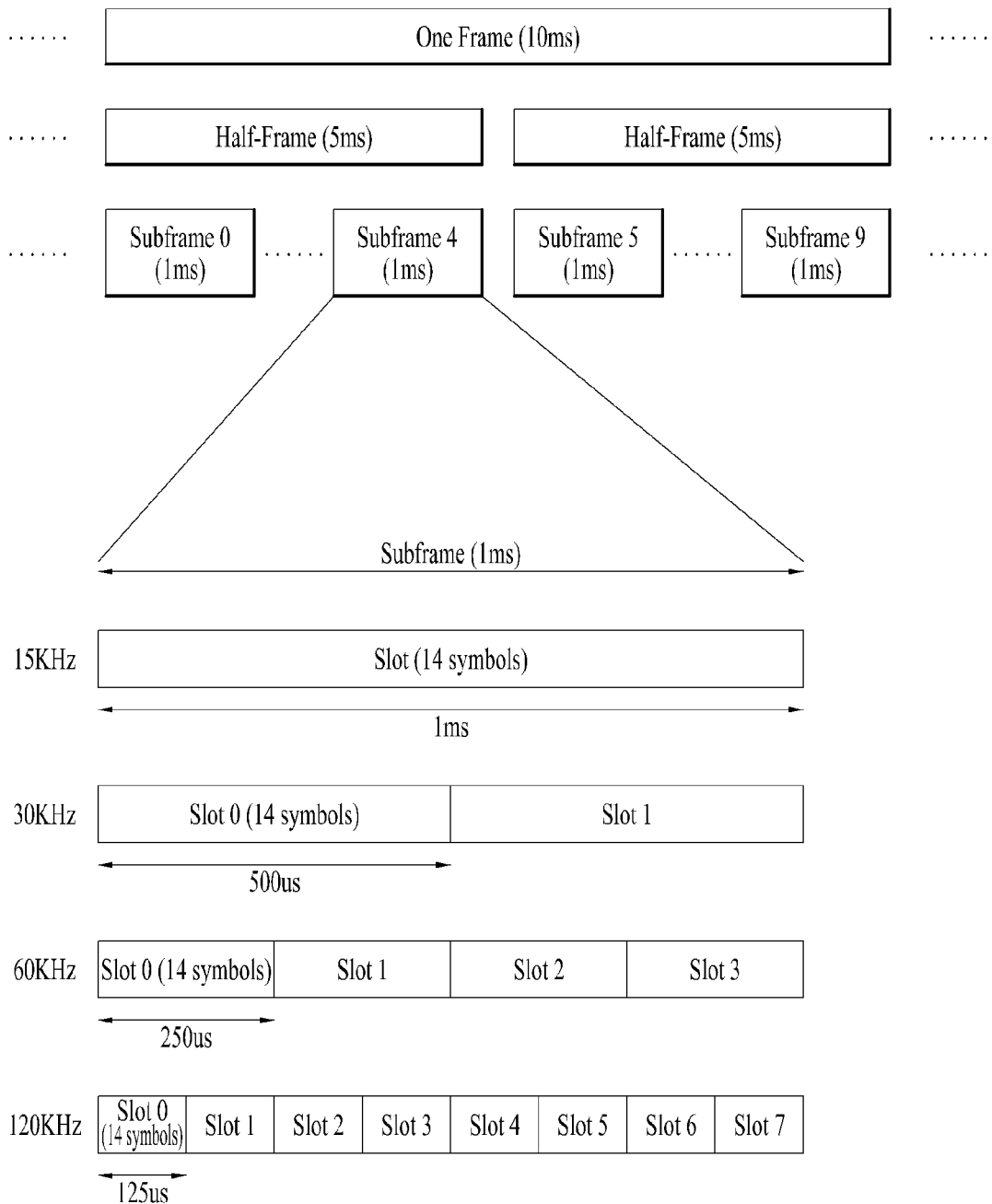
FIGS. 5 to 7 are views illustrating structures of a radio frame and slots used in a new RAT (NR) system.

FIG. 5 illustrates a structure of a radio frame used in NR.

In NR, UL and DL transmissions are configured in frames. The radio frame has a length of 10 ms and is defined as two 5 ms half-frames (HF). The half-frame is defined as five 1 ms subframes (SF). A subframe is divided into one or more slots, and the number of slots in a subframe depends on subcarrier spacing (SCS). Each slot includes 12 or 14 OFDM(A) symbols according to a cyclic prefix (CP). When a normal CP is used, each slot includes 14 symbols. When an extended CP is used, each slot includes 12 symbols. Here, the symbols may include OFDM symbols (or CP-OFDM symbols) and SC-FDMA symbols (or DFT-s-OFDM symbols).

[Table 1] illustrates that the number of symbols per slot, the number of slots per frame, and the number of slots per subframe vary according to the SCS when the normal CP is used.

TABLE 1

| SCS (15*2^u) | $N^{slot}_{symb}$ | $N^{frame, u}_{slot}$ | $N^{subframe, u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

*$N^{subframe, u}_{slot}$: Number of slots in a subframe
*$N^{slot}_{symb}$: Number of symbols in a
*$N^{frame, u}_{slot}$: Number of slots in a frame

[Table 2] illustrates that the number of symbols per slot, the number of slots per frame, and the number of slots per subframe vary according to the SCS when the extended CP is used.

TABLE 2

| SCS (15*2^u) | $N^{slot}_{symb}$ | $N^{frame, u}_{slot}$ | $N^{subframe, u}_{slot}$ |
|---|---|---|---|
| 60 KHz (u = 2) | 12 | 40 | 4 |

Figure 6:
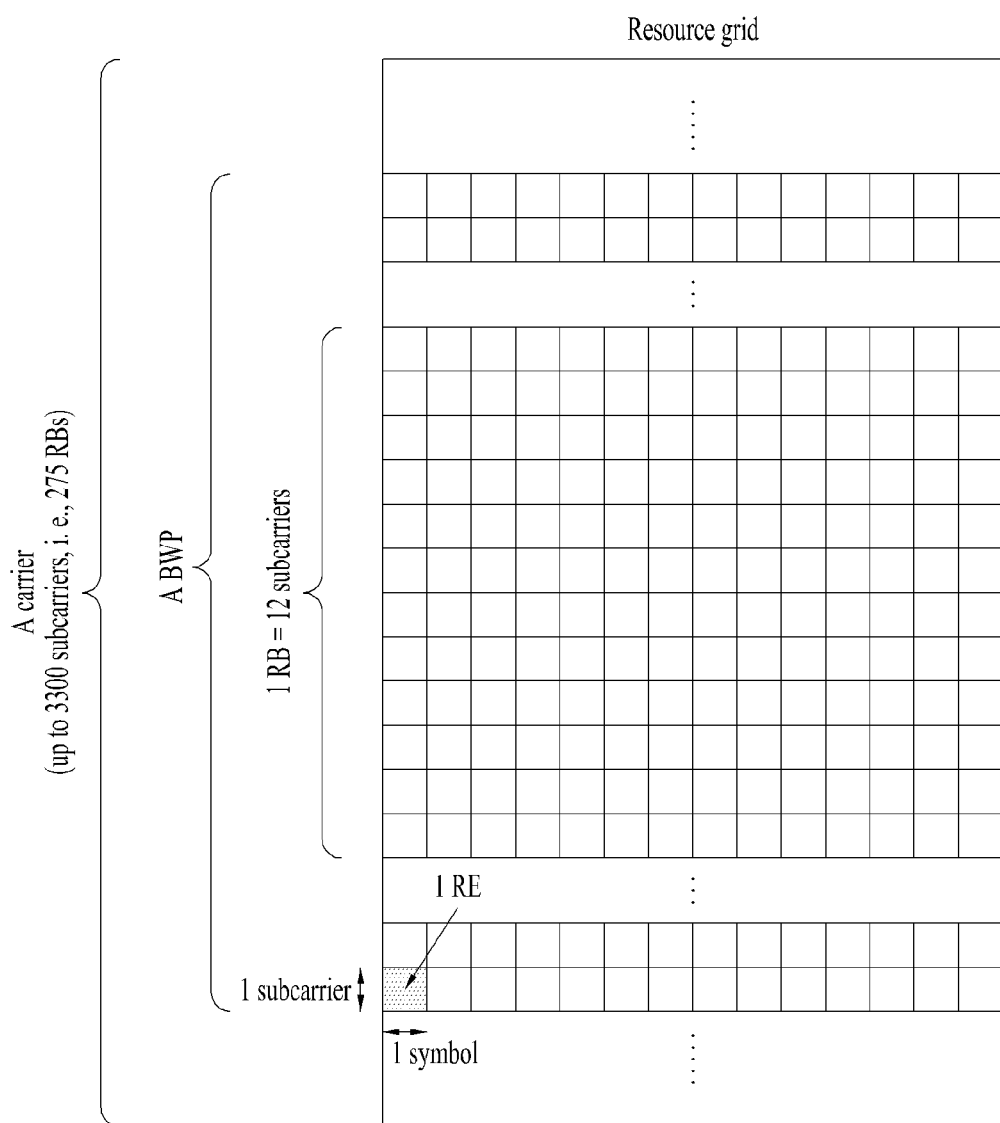

In the NR system, the OFDM(A) numerology (e.g., SCS, CP length, etc.) may be configured differently among a plurality of cells merged for one UE. Thus, the (absolute time) duration of a time resource (e.g., SF, slot or TTI) (referred to as a time unit (TU) for simplicity) composed of the same number of symbols may be set differently among the merged cells. FIG. 6 illustrates a slot structure of an NR frame. A slot includes a plurality of symbols in the time domain. For example, in the case of the normal CP, one slot includes seven symbols. On the other hand, in the case of the extended CP, one slot includes six symbols. A carrier includes a plurality of subcarriers in the frequency domain. A resource block (RB) is defined as a plurality of consecutive subcarriers (e.g., 12 consecutive subcarriers) in the frequency domain. A bandwidth part (BWP) is defined as a plurality of consecutive (P)RBs in the frequency domain and may correspond to one numerology (e.g., SCS, CP length, etc.). A carrier may include up to N (e.g., five) BWPs. Data communication is performed through an activated BWP, and only one BWP may be activated for one UE. In the resource grid, each element is referred to as a resource element (RE), and one complex symbol may be mapped thereto.

Figure 7:
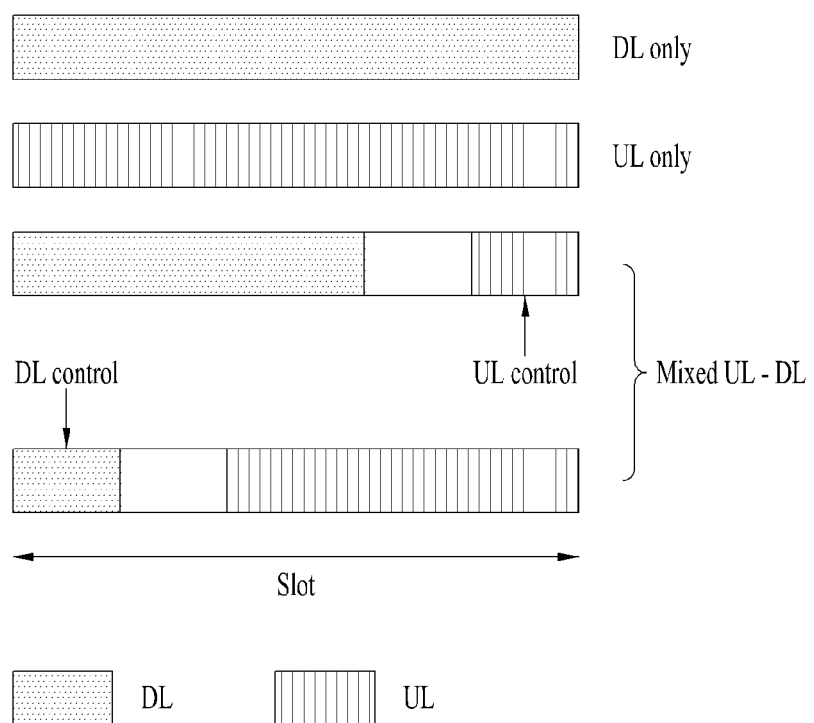

FIG. 7 illustrates a structure of a self-contained slot. In the NR system, a frame has a self-contained structure in which a DL control channel, DL or UL data, a UL control channel, and the like may all be contained in one slot. For example, the first N symbols (hereinafter, DL control region) in the slot may be used to transmit a DL control channel, and the last M symbols (hereinafter, UL control region) in the slot may be used to transmit a UL control channel. N and M are integers greater than or equal to 0. A resource region (hereinafter, a data region) that is between the DL control region and the UL control region may be used for DL data transmission or UL data transmission. For example, the following configuration may be considered. Respective sections are listed in a temporal order.

1. DL only configuration
2. UL only configuration
3. Mixed UL-DL configuration
   DL region+Guard period (GP)+UL control region
   DL control region+GP+UL region
   DL region: (i) DL data region, (ii) DL control region+DL data region
   UL region: (i) UL data region, (ii) UL data region+UL control region The PDCCH may be transmitted in the DL control region, and the PDSCH may be transmitted in the DL data region. The PUCCH may be transmitted in the UL control region, and the PUSCH may be transmitted in the UL data region. Downlink control information (DCI), for example, DL data scheduling information, UL data scheduling information, and the like, may be transmitted on the PDCCH. Uplink control information (UCI), for example, ACK/NACK information about DL data, channel state information (CSI), and a scheduling request (SR), may be transmitted on the PUCCH. The GP provides a time gap in the process of the UE switching from the transmission mode to the reception mode or from the reception mode to the transmission mode. Some symbols at the time of switching from DL to UL within a subframe may be configured as the GP.

For a 5G mobile communication system under discussion, a technique of using an ultra-high frequency band, that is, a millimeter frequency band at or above 6 GHz is considered in order to transmit data to a plurality of users at a high transmission rate in a wide frequency band. The 3GPP calls this technique NR, and thus a 5G mobile communication system will be referred to as an NR system in the present disclosure. However, the millimeter frequency band has the frequency property that a signal is attenuated too rapidly according to a distance due to the use of too high a frequency band. Accordingly, the NR system using a frequency band at or above at least 6 GHz employs a narrow beam transmission scheme in which a signal is transmitted with concentrated energy in a specific direction, not omni-directionally, to thereby compensate for the rapid propagation attenuation and thus overcome the decrease of coverage caused by the rapid propagation attenuation. However, if a service is provided by using only one narrow beam, the service coverage of one gNB becomes narrow, and thus the gNB provides a service in a wideband by collecting a plurality of narrow beams.

As a wavelength becomes short in the millimeter frequency band, that is, millimeter wave (mmW) band, it is possible to install a plurality of antenna elements in the same area. For example, a total of 100 antenna elements may be installed at (wavelength) intervals of 0.5 lamda in a 30-GHz band with a wavelength of about 1 cm in a two-dimensional (2D) array on a 5 by 5 cm panel. Therefore, it is considered to increase coverage or throughput by increasing a beamforming gain through use of a plurality of antenna elements in mmW.

To form a narrow beam in the millimeter frequency band, a beamforming scheme is mainly considered, in which a gNB or a UE transmits the same signals with appropriate phase differences through multiple antennas, to thereby increase energy only in a specific direction. Such beamforming schemes include digital beamforming for generating a phase difference between digital baseband signals, analog beamforming for generating a phase difference between modulated analog signals by using a time delay (i.e., a cyclic shift), and hybrid beamforming using both digital beamforming and analog beamforming. If a TXRU is provided per antenna element to enable control of transmission power and a phase per antenna, independent beamforming per frequency resource is possible. However, installation of TXRUs for all of about 100 antenna elements is not effective in terms of cost. That is, to compensate for rapid propagation attenuation in the millimeter frequency band, multiple antennas should be used, and digital beamforming requires as many RF components (e.g., digital to analog converters (DACs), mixers, power amplifiers, and linear amplifiers) as the number of antennas. Accordingly, implementation of digital beamforming in the millimeter frequency band faces the problem of increased cost of communication devices. Therefore, in the case where a large number of antennas are required as in the millimeter frequency band, analog beamforming or hybrid beamforming is considered. In analog beamforming, a plurality of antenna elements are mapped to one TXRU, and the direction of a beam is controlled by an analog phase shifter. A shortcoming with this analog beamforming scheme is that frequency selective beamforming (BF) cannot be provided because only one beam direction can be produced in a total band. Hybrid BF stands between digital BF and analog BF, in which B TXRUs fewer than Q antenna elements are used. In hybrid BF, the directions of beams transmittable at the same time is limited to or below B although the number of beam directions is different according to connections between B TXRUs and Q antenna elements.

Digital BF performs signal processing on a digital baseband signal that is to be transmitted or is received as mentioned above, and therefore it may transmit or receive signals in multiple directions at the same time using multiple beams. In contrast, analog BF performs beamforming with an received analog signal or an analog signal to be transmitted in a modulated state, and therefore it cannot simultaneously transmit or receive signals in multiple directions beyond the range covered by one beam. In general, a gNB communicates with multiple users at the same time using broadband transmission or multi-antenna characteristics. When the gNB uses analog or hybrid BF and forms an analog beam in one beam direction, the gNB is allowed to communicate only with users included in the same analog beam direction due to the characteristics of analog BF. A RACH resource allocation scheme and a scheme of resource utilization in the gNB according to the present disclosure to be described later are proposed in consideration of constraints resulting from the characteristics of analog BF or hybrid BF.

Figure 8:
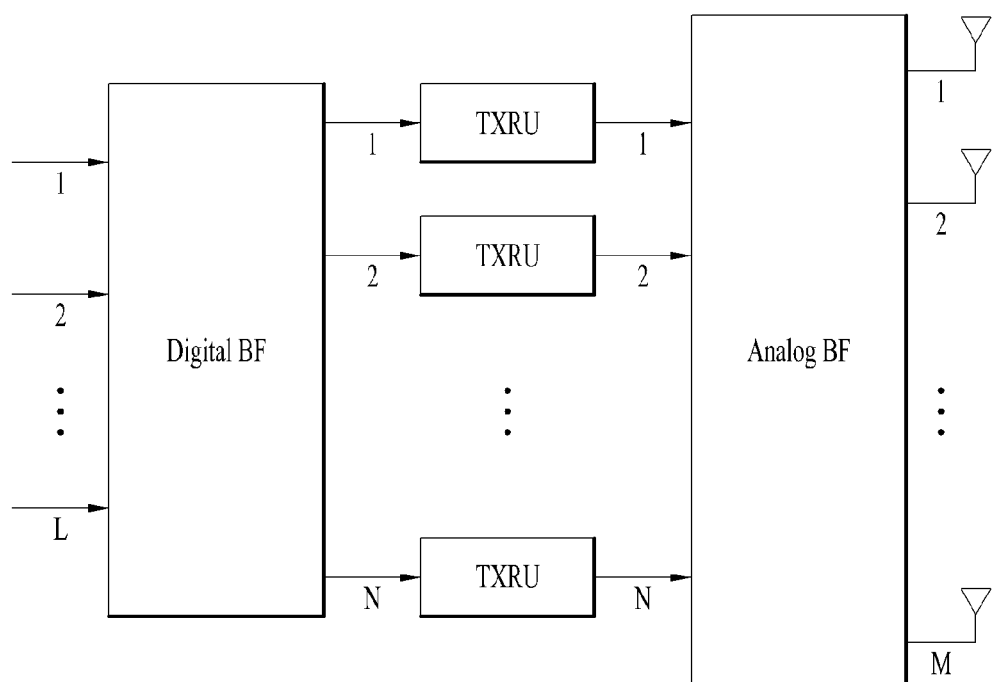
FIG. 8 is a view illustrating exemplary connection schemes between transceiver units (TXRUs) and antenna elements.

FIG. 8 abstractly illustrates a hybrid beamforming structure in terms of TXRUs and physical antennas.

For the case where multiple antennas are used, hybrid BF with digital BF and analog BF in combination has emerged. Analog BF (or RF BF) is an operation of performing precoding (or combining) in an RF unit. Due to precoding (combining) in each of a baseband unit and an RF unit, hybrid BF offers the benefit of performance close to the performance of digital BF, while reducing the number of RF chains and the number of DACs (or analog to digital converters (ADCs). For the convenience' sake, a hybrid BF structure may be represented by N TXRUs and M physical antennas. Digital BF for L data layers to be transmitted by a transmission end may be represented as an N-by-N matrix, and then N converted digital signals are converted to analog signals through TXRUs and subjected to analog BF represented as an M-by-N matrix. In FIG. 6, the number of digital beams is L, and the number of analog beams is N. Further, it is considered in the NR system that a gNB is configured to change analog BF on a symbol basis so as to more efficiently support BF for a UE located in a specific area. Further, when one antenna panel is defined by N TXRUs and M RF antennas, introduction of a plurality of antenna panels to which independent hybrid BF is applicable is also considered. As such, in the case where a gNB uses a plurality of analog beams, a different analog beam may be preferred for signal reception at each UE. Therefore, a beam sweeping operation is under consideration, in which for at least an SS, system information, and paging, a gNB changes a plurality of analog beams on a symbol basis in a specific slot or SF to allow all UEs to have reception opportunities.

Figure 9:
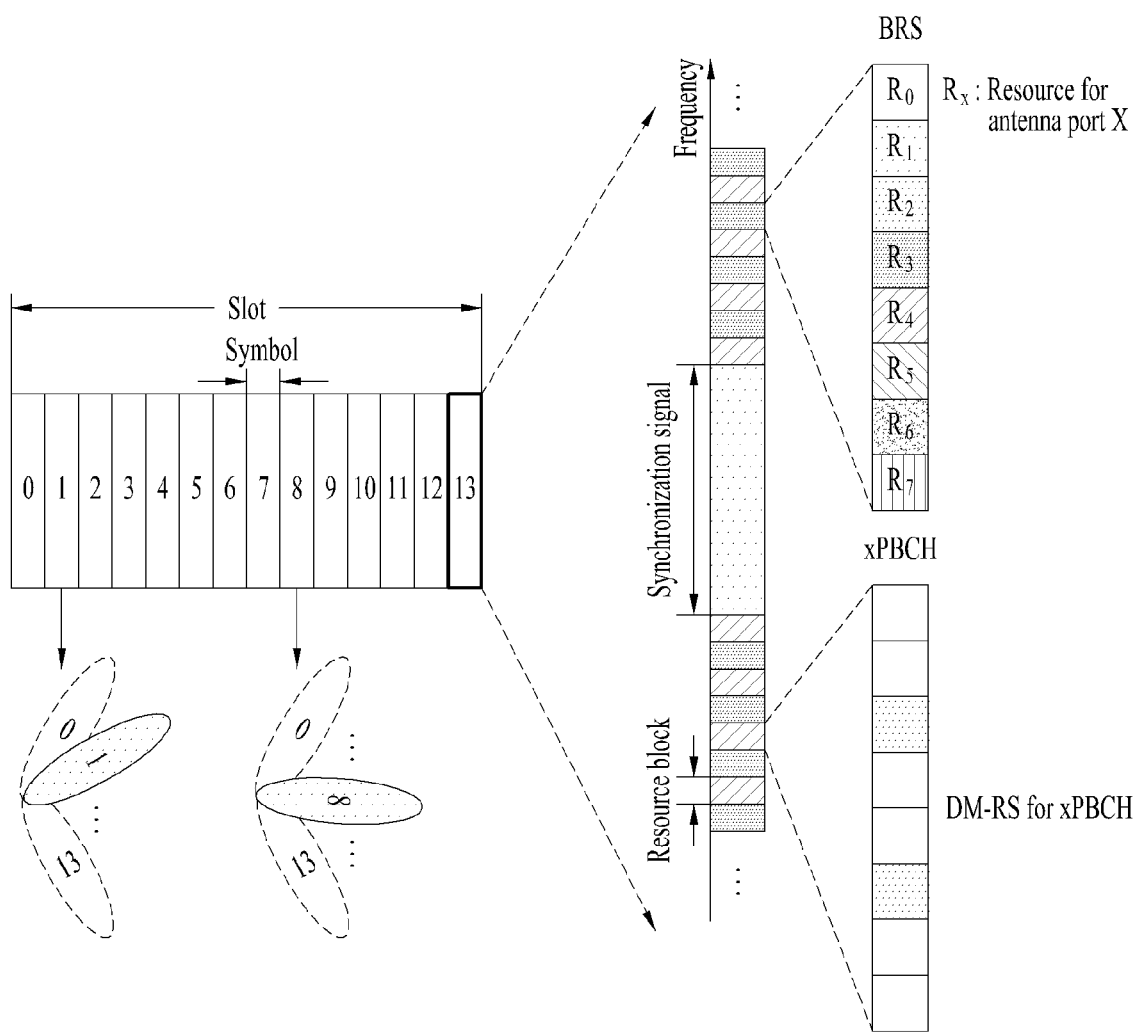
FIG. 9 is a view illustrating beam sweeping for a synchronization signal and system information during downlink (DL) transmission.

FIG. 9 is a view illustrating beam sweeping for an SS and system information during DL transmission. In FIG. 9, physical resources or a physical channel which broadcasts system information of the New RAT system is referred to as an xPBCH. Analog beams from different antenna panels may be transmitted simultaneously in one symbol, and introduction of a beam reference signal (BRS) transmitted for a single analog beam corresponding to a specific antenna panel as illustrated in FIG. 9 is under discussion in order to measure a channel per analog beam. BRSs may be defined for a plurality of antenna ports, and each antenna port of the BRSs may correspond to a single analog beam. Unlike the BRSs, the SS or the xPBCH may be transmitted for all analog beams included in an analog beam group so that any UE may receive the SS or the xPBCH successfully.

Figure 10:
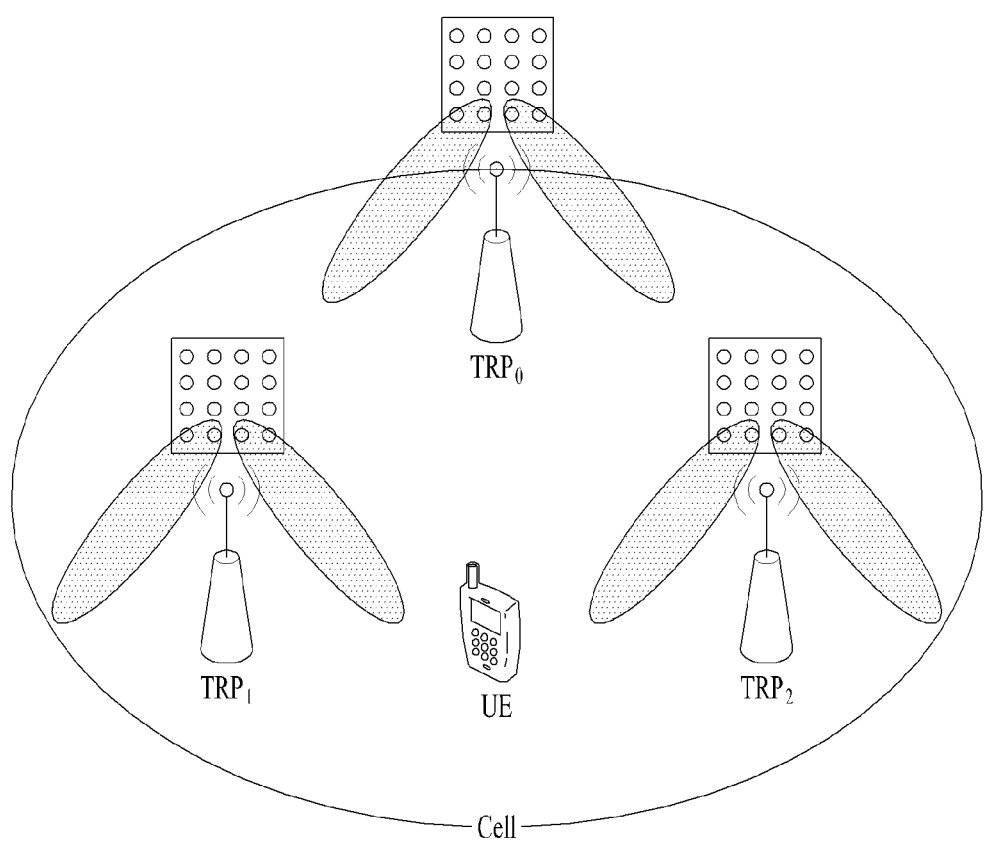
FIG. 10 is a view illustrating an exemplary cell in an NR system.

FIG. 10 is a view illustrating an exemplary cell in the NR system.

Referring to FIG. 10, compared to a wireless communication system such as legacy LTE in which one eNB forms one cell, configuration of one cell by a plurality of TRPs is under discussion in the NR system. If a plurality of TRPs form one cell, even though a TRP serving a UE is changed, seamless communication is advantageously possible, thereby facilitating mobility management for UEs.

Compared to the LTE/LTE-A system in which a PSS/SSS is transmitted omni-directionally, a method for transmitting a signal such as a PSS/SSS/PBCH through BF performed by sequentially switching a beam direction to all directions at a gNB applying mmWave is considered. The signal transmission/reception performed by switching a beam direction is referred to as beam sweeping or beam scanning. In the present disclosure, "beam sweeping" is a behavior of a transmission side, and "beam scanning" is a behavior of a reception side. For example, if up to N beam directions are available to the gNB, the gNB transmits a signal such as a PSS/SSS/PBCH in the N beam directions. That is, the gNB transmits an SS such as the PSS/SSS/PBCH in each direction by sweeping a beam in directions available to or supported by the gNB. Or if the gNB is capable of forming N beams, the beams may be grouped, and the PSS/SSS/PBCH may be transmitted/received on a group basis. One beam group includes one or more beams. Signals such as the PSS/SSS/PBCH transmitted in the same direction may be defined as one SS block (SSB), and a plurality of SSBs may exist in one cell. If a plurality of SSBs exist, an SSB index may be used to identify each SSB. For example, if the PSS/SSS/PBCH is transmitted in 10 beam directions in one system, the PSS/SSS/PBCH transmitted in the same direction may form an SSB, and it may be understood that 10 SSBs exist in the system. In the present disclosure, a beam index may be interpreted as an SSB index.

Prior to a description of the present disclosure, a "high-order bit" or a "most significant bit (MSB)" represented in the present disclosure may imply a left bit in the arrangement of information bits in which a highest-digit number is placed at a rightmost position. That is, in the arrangement of information bits in which a highest-digit number is placed at a leftmost position, the "high-order bit" or the "MSB" may be interpreted as having the same meaning as a least significant bit (LSB), which is a bit giving a unit value for determining whether a value indicated by the information bits is an even or odd number of an integer.

Similarly, a "low-order bit" or an "LSB" may imply a right bit in the arrangement of information bits in which a highest-digit number is placed at a rightmost position. In other words, in the arrangement of information bits in which a highest-digit number is placed at a leftmost position, the "low-order bit" or the "LSB" may be interpreted as having the same meaning as the MSB.

For example, in the description of the disclosure which will be given later, there is an expression of "the UE acquires high-order N bits (e.g., S0, S1, and S2) of SFN information and acquires the other (10-N) bits (e.g., S3 to S9) of the SFN information from PBCH content, thereby configuring a total of 10 bits of the SFN information".

In this case, in an arrangement in which a highest-digit number is placed at a rightmost position in an order of an information bit stream, i.e., in an information bit stream configured as (S0 S1 S2 S3 . . . S9), "high-order N bits" means left N bits (e.g., S0 S1 S2) and "the other (10-N) bits" means right (10-N) bits (e.g., S3 to S9). This may be expressed as follows using an LSB and an MSB. In an information bit stream represented in order of (S9 S8 S7 . . . S1 S0), a bit steam using N LSBs may be expressed in order of N bits (e.g., S2 S1 S0) and a bit stream corresponding to the other "(10-N) bits (e.g., S3 to S9)" using (10-N) MSBs may be expressed in order of (S9 S8 S7 . . . S3).

1. SSB Configuration

If a PSS is positioned at a front part of an SSB when subcarrier spacings of 120 kHz and 240 kHz are used, a problem may arise in an automatic gain control (AGC) operation of a UE. That is, in the subcarrier spacings of 120 kHz and 240 kHz, an NR-PSS may not be correctly detected due to the AGC operation. Therefore, modification of an SSB configuration may be considered as in the following two embodiments.

(Method 1) PBCH-PSS-PBCH-SSS
(Method 2) PBCH-PSS-PBCH-SSS-PBCH

Namely, a PBCH symbol may be positioned at a start part of the SSB and may be used as a dummy symbol for the AGC operation so that the AGC operation of the UE may be smoothly performed.

2. SS Burst Set Configuration

Figure 11:
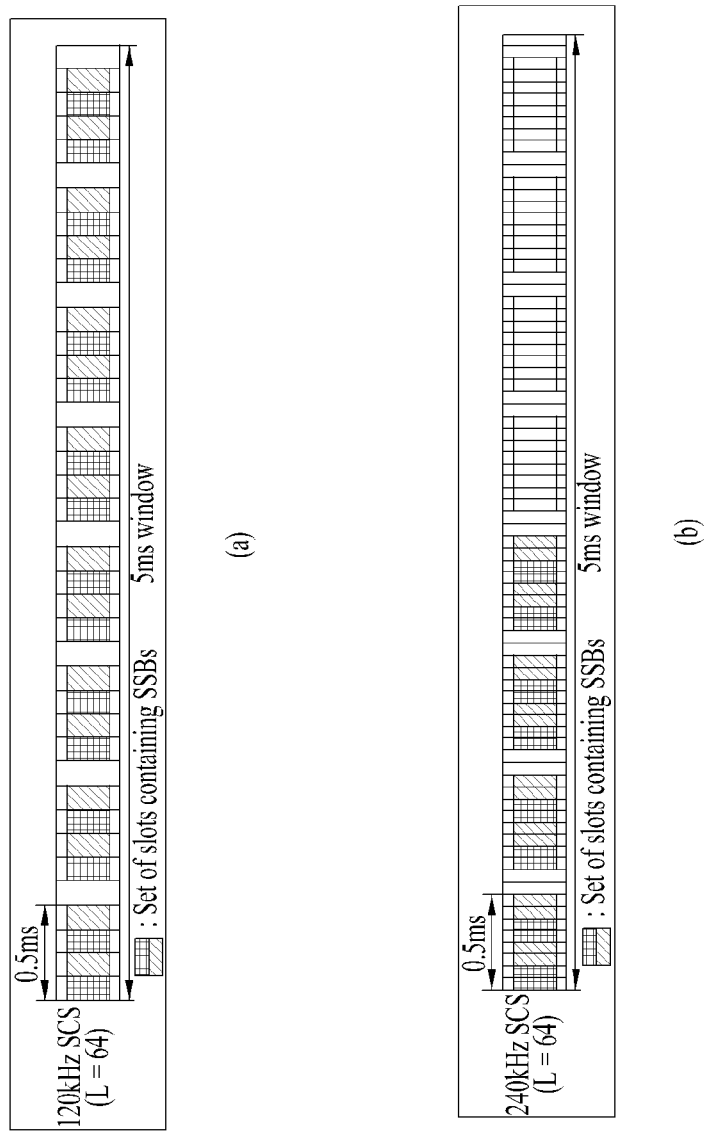
FIGS. 11 to 14 are views for explaining a configuration method of a synchronization signal burst and a synchronization signal burst set.

FIG. 11 illustrates an SS burst set configuration when subcarrier spacings for arranging an SSB are 120 kHz and 240 kHz. Referring to FIG. 11, the SS burst set is configured with a predetermined duration being emptied in units of 4 SS bursts when the subcarrier spacings are 120 kHz and 240 kHz. That is, the SSB is arranged in units of 0.5 ms with a symbol duration for UL transmission of 0.125 ms being emptied.

However, in the frequency range above 60 GHz, a subcarrier spacing of 60 kHz may be used for data transmission. That is, as illustrated in FIG. 12, in NR, a subcarrier spacing of 60 kHz for data transmission and a subcarrier spacing of 120 kHz or 240 kHz for SSB transmission may be multiplexed.

Figure 12:
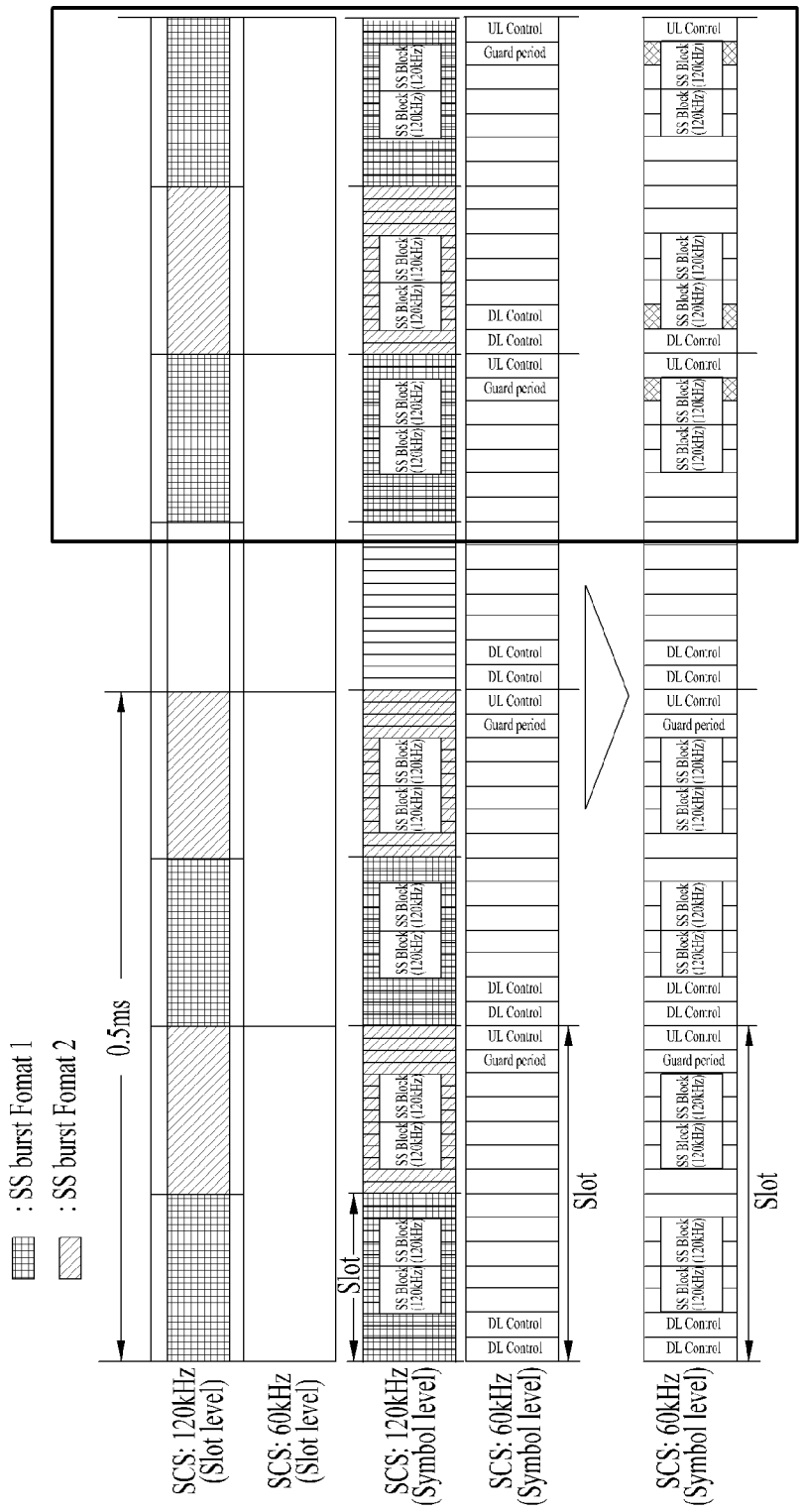

Meanwhile, referring to a part indicated by a box in FIG. 12, while the SSB of the 120-kHz subcarrier spacing and data of the 60-kHz subcarrier spacing are multiplexed, it may be appreciated that collision or overlap occurs between an SSB of the 120-kHz subcarrier spacing and a GP and a DL control region of the 60-kHz subcarrier spacing. Since it is desirable that collision between the SSB and the DL/UL control region be avoided if possible, configurations of the SS burst and the SS burst set need to be modified.

The present disclosure proposes two embodiments as a modification of the SS burst configuration to solve the above problem.

Figure 13:
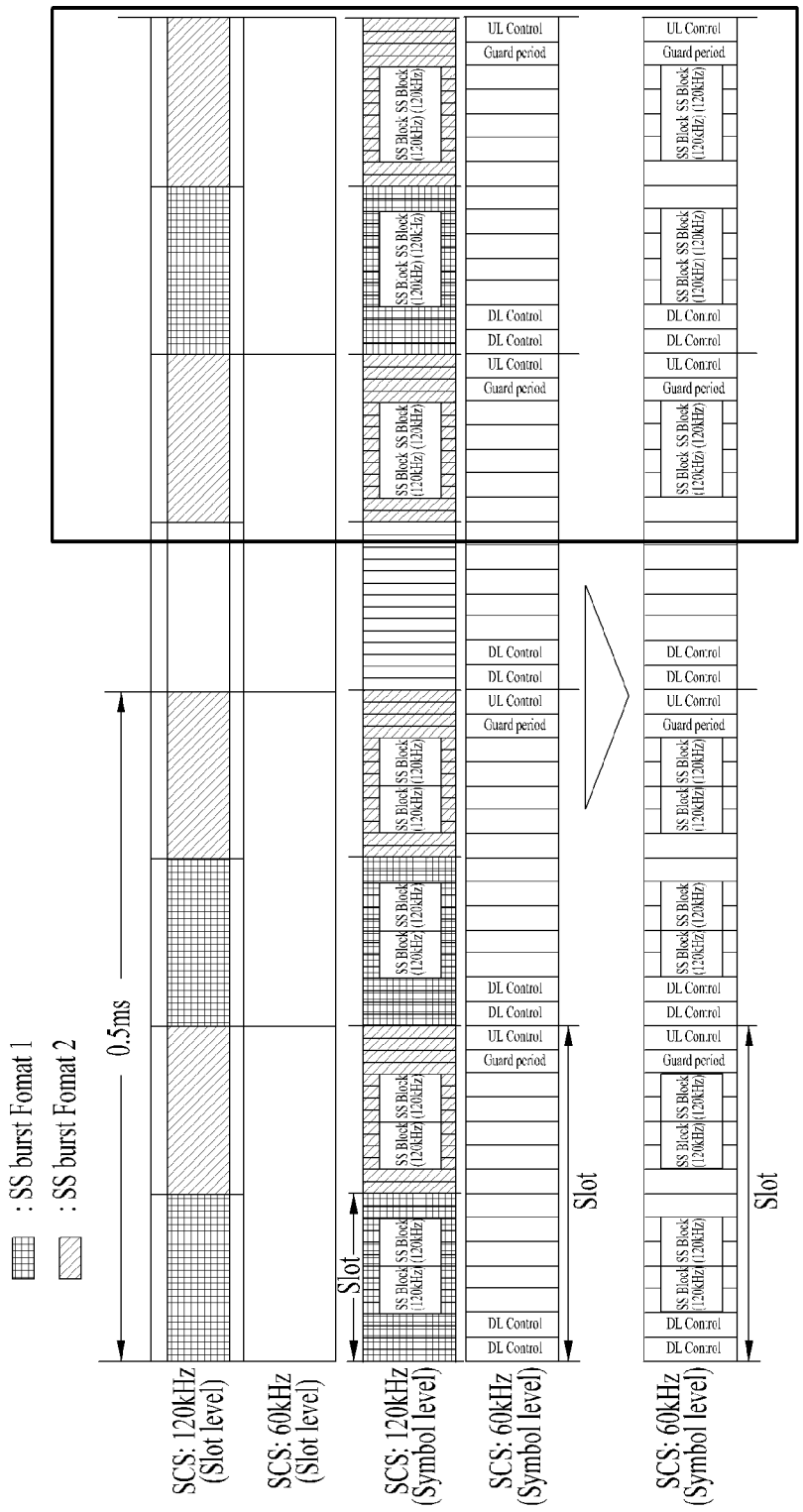

In the first embodiment, positions of SS burst format 1 and SS burst format 2 are changed as illustrated in FIG. 13. That is, SS burst format 1 and SS burst format 2 in the box of FIG. 12 interchange so as not to generate collision between the SSB and the DL/UL control region. In other words, SS burst format 1 is located at a front part of a slot of the 60-kHz subcarrier spacing and SS burst format 2 is located at a rear part of the slot of the 60-kHz subcarrier spacing.

The above-described embodiment may be summarized as follows.

1) 120-KHz Subcarrier Spacing

The first OFDM symbols of candidate SS/PBCH blocks have indexes {4, 8, 16, 20, 32, 36, 44, 48}+70*n. For carrier frequencies higher than 6 GHz, n=0, 2, 4, 6.

The first OFDM symbols of the candidate SS/PBCH blocks have indexes {2, 6, 18, 22, 30, 34, 46, 50}+70*n. For carrier frequencies higher than 6 GHz, n=1, 3, 5, 7.

2) 240-KHz Subcarrier Spacing

The first OFDM symbols of the candidate SS/PBCH blocks have indexes {8, 12, 16, 20, 32, 36, 40, 44, 64, 68, 72, 76, 88, 92, 96, 100}+140*n. For carrier frequencies higher than 6 GHz, n=0, 2.

The first OFDM symbols of the candidate SS/PBCH blocks have indexes {4, 8, 12, 16, 36, 40, 44, 48, 60, 64, 68, 72, 92, 96, 100, 104}+140*n. For carrier frequencies higher than 6 GHz, n=1, 3.

Figure 14:
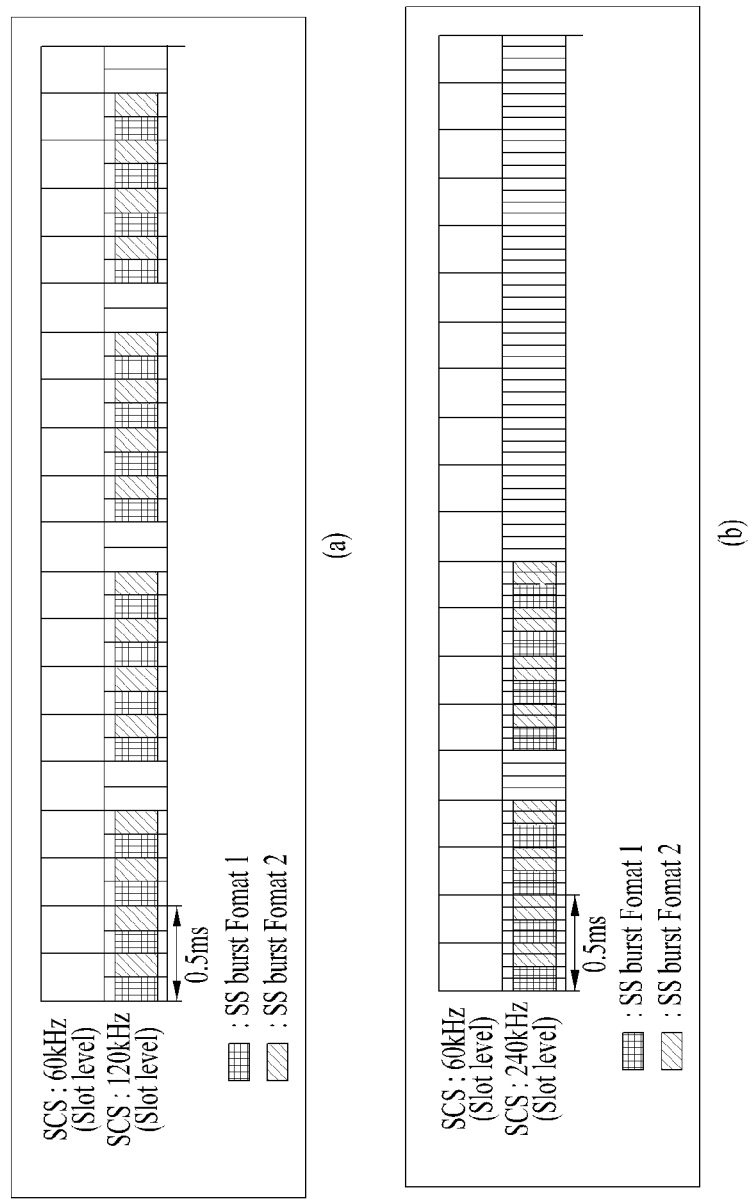

In the second embodiment, the SS burst set configuration is changed as illustrated in FIG. 14. That is, an SS burst set may be configured to align, i.e., match, a start boundary of the SS burst set and a start boundary of a slot of a 60-kHz subcarrier spacing.

Specifically, an SS burst is configured by SSBs which are locally arranged during 1 ms. Therefore, during 1 ms, an SS burst of a 120-kHz subcarrier spacing includes 16 SSBs and an SS burst of a 240-kHz subcarrier spacing includes 32 SSBs. If the SS burst is configured in this way, one slot is allocated, as a gap, between SS bursts based on the 60-kHz subcarrier spacing.

The above-described second embodiment is summarized as follows.

1) 120-KHz Subcarrier Spacing

The first OFDM symbols of the candidate SS/PBCH blocks have indexes {4, 8, 16, 20}+28*n. For carrier frequencies higher than 6 GHz, n=0, 1, 2, 3, 5, 6, 7, 8, 10, 11, 12, 13, 15, 16, 17, 18.

2) 240 KHz Subcarrier Spacing

The first OFDM symbols of the candidate SS/PBCH blocks have indexes {8, 12, 16, 20, 32, 36, 40, 44}+56*n. For carrier frequencies higher than 6 GHz, n=0, 1, 2, 3, 5, 6, 7, 8.

3. Indication of Actually Transmitted SS/PBCH Block within 5-ms Duration

Meanwhile, the number of candidates for SSB transmission may be limited according to a network environment. For example, the number of candidates may differ according to a subcarrier spacing with which an SSB is disposed. In this case, the position of an actually transmitted SSB may be indicated to a connected/idle mode UE. An actually transmitted SS/PBCH block indication indicating the position of an actually transmitted SSB may be used for a serving cell for the purpose of resource utilization, e.g., rate matching, and may be used for a neighbor cell for the purpose of measurement associated with a corresponding resource.

In association with the serving cell, if the UE is capable of accurately recognizing an SSB which is not transmitted, the UE may identify that the UE can receive other information such as paging or data through a candidate resource of the SSB which is not transmitted. For flexibility of such a resource, it is necessary to accurately indicate an SSB which is actually transmitted in a serving cell.

That is, since other information such as paging or data cannot be received in a resource in which the SSB is transmitted, the UE needs to recognize an SSB candidate corresponding to the SSB which is not actually transmitted in order to raise resource use efficiency by receiving other data or other signals through the SSB which is not actually transmitted.

Therefore, in order to accurately indicate the SSB which is actually transmitted in the serving cell, full bitmap information of 4, 8, or 64 bits is needed. In this case, the size of bits included in a bitmap may be determined according to the maximum number of SSBs which can be maximally transmitted in each frequency range. For example, to indicate the SSB which is actually transmitted in a duration of 5 ms, 8 bits are needed in the frequency range from 3 GHz to 6 GHz and 64 bits are needed in the frequency range above 6 GHz.

Bits for the SSB which is actually transmitted in the serving cell may be defined in remaining system information (RMSI) or other system information (OSI). The RMSI/OSI includes configuration information for data or paging. Since the actually transmitted SS/PBCH block indication is associated with a configuration for a DL resource, it may be concluded that the RMSI/OSI includes SSB information.

Meanwhile, the actually transmitted SS/PBCH block indication of the neighbor cell may be required for the purpose of measurement of the neighbor cell. That is, time synchronization information of the neighbor cell needs to be acquired for measurement of the neighbor cell. When an NR system is designed to allow asynchronous transmission between TRPs, even if the time synchronization information of the neighbor cell is indicated, accuracy of the information may differ according to a situation. Therefore, when the time information of the neighbor cell is indicated, it is necessary to determine the unit of the time information as valid information for the UE even under the assumption that asynchronous transmission is performed between TRPs.

Herein, if there are many listed cells, a full bitmap type of indication may excessively increase signaling overhead. Hence, in order to reduce signaling overhead, a variably compressed type of indication may be considered. Meanwhile, even an indication for an SSB that a serving cell transmits may consider a compressed type for the purpose of reducing signaling overhead as well as for the purpose of neighbor cell measurement. In other words, an SSB indication described below may be used to indicate an actually transmitted SSB in the neighbor cell and the serving cell. In addition, according to the above description, although an SS burst may imply a bundle of SSBs included in one slot according to each subcarrier, the SS burst may imply, only in embodiments described below, an SSB group obtained by grouping a predetermined number of SSBs regardless of the slot.

Figure 15:
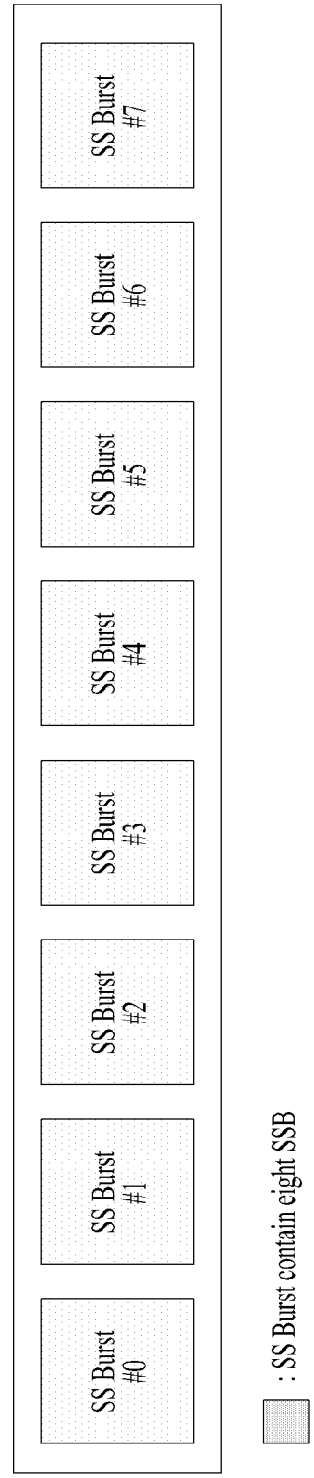
FIG. 15 is a view illustrating methods of indexing a synchronization signal

One of the embodiments will now be described with reference to FIG. 15. Assuming that the SS burst includes 8 SSBs, a total of 8 SS bursts may be present in a band above 64 GHz in which 64 SSBs may be positioned.

In this case, SSBs are grouped into SS bursts to compress a total bitmap of 64 bits. Instead of 64-bit bitmap information, 8-bit information indicating SS bursts including actually transmitted SSBs may be used. If the 8-bit bitmap information indicates SS burst #0, then SS burst #0 may include one or more actually transmitted SSBs.

Herein, additional information for additionally indicating the number of SSBs transmitted per SS burst to the UE may be considered. As many SSBs as the number of SSBs indicated by the additional information may be locally present in each SS burst.

Therefore, the UE may estimate actually transmitted SSBs by combining the number of actually transmitted SSBs per SS burst, indicated by the additional information, and the bitmap for indicating an SS burst including actually transmitted SSBs.

For example, an indication example of Table 3 below may be assumed.

TABLE 3

| 8 bit bitmap (SS/PBCH burst unit) | The number of actually transmitted SS/PBCH blocks per SS/PBCH burst unit | Full bitmap |
| --- | --- | --- |
| 11000001 | 4 | (11110000) (11110000) (00000000) (00000000) (00000000) (00000000) (00000000) (11110000) |

That is, according to [Table 3], an 8-bit bitmap indicates that SSBs are included in SS bursts #0, #1, and #7 and additional information indicates that 4 SSBs are included in each SS burst. As a result, it may be estimated that SSBs are transmitted at 4 candidate positions of a front part of each of SS bursts #0, #1, and #7.

Unlike the above-described example, the additional information may also be transmitted in a bitmap format so that flexibility of positions at which SSBs are transmitted may be obtained.

For example, a method of indicating information related to SS burst transmission by a bitmap and indicating SSBs transmitted within an SS burst by other bits may be provided.

That is, a total of 64 SSBs are divided into 8 SS bursts (i.e., SSB groups) and which SS burst is used is indicated to the UE by transmitting an 8-bit bitmap. If SS bursts are defined as illustrated in FIG. 15, there is an advantage of arranging an SS burst and a boundary of a slot having a subcarrier spacing of 60 kHz when the SS burst is multiplexed with the slot having a subcarrier spacing of 60 kHz. Therefore, if the bitmap indicates whether an SS burst is used, the UE may recognize whether SSBs are transmitted in units of slots for all subcarrier spacings in the frequency band above 6 GHz.

This example is different from the previously described example in that the additional information is indicated in a bitmap format. Then, since bit map information about 8 SSBs included in each SS burst should be transmitted, 8 bits are needed and the additional information is commonly applied to all SS bursts. For example, if the bitmap information about SS bursts indicates that SS burst #0 and SS burst #1 are used and the additional bitmap information about SSBs indicates that first and fifth SSBs are transmitted in the corresponding SS bursts, then the first and fifth SSBs in both SS burst #0 and SS burst #1 are transmitted so that the total number of actually transmitted SSBs is 4.

Meanwhile, a few neighbor cells may not be included in a cell list. The neighbor cells not included in the cell list use a default format for an actually transmitted SSB. By using the default format, the UE may measure the neighbor cells not included in the list. In this case, the default format may be predefined or may be configured by a network.

Meanwhile, when information about SSBs which are actually transmitted in the serving cell collides with information about SSBs which are actually transmitted in the neighbor cell, the UE may prioritize the information about the SSBs which are actually transmitted in the serving cell, thereby acquiring the information about the actually transmitted SSBs.

That is, upon receiving the information about actually transmitted SSBs in a full bitmap format and a grouping format, the UE may prioritize the information of the full bitmap format to use the information for SSB reception because there is a high possibility that the information of the full bitmap format has high accuracy.

4. System Frame Number (SFN) and Half-Frame Boundary

Low-order N bits of SFN information are transmitted in a PBCH payload and high-order M bits of the SFN information are transmitted in a PBCH scrambling sequence. Meanwhile one MSB among the high-order M bits of the SFN information may be transmitted through variation in a time/frequency position of a PBCH DMRS, an NR-SSS, or an SSB. In addition, information about a radio half-frame (5 ms) boundary may be transmitted through variation in the time/frequency position of the PBCH DMRS, the NR-SSS, or the SSB.

Herein, a "high-order bit" or an "MSB" implies a left bit in an information bit stream in which a highest-digit number is placed at a rightmost position. That is, in the arrangement of the information bit stream in which a highest-digit number is placed at a leftmost position, the "high-order bit" or the "MSB" may be interpreted as having the same meaning as an LSB, which is a bit giving a units value for determining whether a value is even or odd of an integer.

In addition, a "low-order bit" or an "LSB" implies a right bit in an information bit stream in which a highest-digit number is placed at a rightmost position. That is, in the arrangement of the information bit stream in which a highest-digit number is placed at a leftmost position, the "low-order bit" or the "LSB" may be interpreted as having the same meaning as the MSB.

5. NR-PBCH Content

The UE may detect a cell ID and symbol timing information and then acquire information, for network access from a PBCH, which includes an SFN, an SSB index, a part of timing information such as a half-frame timing, common control channel related information such as a time/frequency position, bandwidth, bandwidth part information such as an SSB position, and SS burst set information such as SS burst set periodicity and an actually transmitted SSB index.

Since only a limited time/frequency resource of 576 REs is occupied for the PBCH, essential information should be included in the PBCH. If possible, an auxiliary signal such as a PBCH DMRS may be used to further include the essential information or additional information in the PBCH.

(1) SFN

In NR, an SFN is defined to distinguish between intervals of 10 ms. Similarly to an LTE system, the NR system may introduce indexes between 0 and 1023 for the SFN and these indexes may be explicitly indicated using bits or may be implicitly indicated.

In NR, a PBCH TTI is 80 ms and a minimum periodicity of an SS burst is 5 ms. Therefore, a PBCH may be transmitted a maximum of 16 times in units of 80 ms and a different scrambling sequence for each transmission may be applied to a PBCH encoded bit. The UE may detect an interval of 10 ms similarly to an LTE PBCH decoding operation. In this case, 8 states of the SFN may be implicitly indicated by a PBCH scrambling sequence and 7 bits for indicating the SFN may be defined by PBCH content.

(2) Timing Information in Radio Frame

An SSB index may be explicitly indicated by bits included in a PBCH DMRS sequence and/or PBCH content according to carrier frequency. For example, in the frequency band below 6 GHz, 3 bits of an SSB index are transmitted only in the PBCH DMRS sequence. In the frequency band above 6 GHz, 3 LSBs of the SSB index are expressed as the PBCH DMRS sequence and 3 MSBs of the SSB index are transmitted by the PBCH content. That is, only in the frequency band of 6 GHz to 52.6 GHz, a maximum of 3 bits for the SSG index may be defined in the PBCH content.

A half-frame boundary may be transmitted by the PBCH DMRS sequence. Particularly, if a half-frame indication is included in the PBCH DMRS sequence in the frequency band below 3 GHz, this may raise an effect relative to the case in which the half-frame indication is included in the PBCH content. That is, since an FDD scheme is mainly used in the frequency band below 3 GHz, a mismatch degree of time synchronization between a subframe and a slot may be big. Accordingly, in order to achieve more accurate time synchronization, it is favorable to transmit the half-frame indication through the PBCH DMRS which has better decoding performance than the PBCH content.

However, since a TDD scheme is mainly used in a band above 3 GHz, a mismatch degree of time synchronization between a subframe and a slot will not be big. Therefore, there may be few disadvantages even if the half-frame indication is transmitted through the PBCH content.

Meanwhile, the half-frame indication may also be transmitted through both the PBCH DMRS and the PBCH content.

(4) Information for Identifying Absence of RMSI Corresponding to PBCH

In NR, an SSB may be used for operation measurement as well as provision of information for network access. Particularly, for a broadband CC operation, multiple SSBs may be transmitted for measurement.

However, it may be unnecessary to transmit RMSI through all frequency positions in which the SSBs are transmitted. That is, the RMSI may be transmitted through a specific frequency position for the purpose of efficiency of resource use. In this case, UEs performing an initial access procedure cannot recognize whether the RMSI is provided at a detected frequency position. To solve this problem, a bit field for identifying that the RMSI corresponding to a PBCH of a detected frequency region is absent needs to be defined. Meanwhile, a method of identifying that the RMSI corresponding to the PBCH is absent without providing the bit field also needs to be considered.

To this end, an SSB having no RMSI may be transmitted at a frequency position which is not defined as frequency raster. In this case, since the UEs performing the initial access procedure cannot detect the SSB, the above-described problem can be solved.

(5) SS Burst Set Periodicity and Actually Transmitted SSB

For the purpose of measurement, information about SS burst set periodicity and an actually transmitted SSB may be indicated. Therefore, this information is desirably included in system information for cell measurement and inter/intra-cell measurement. In other words, it is not necessary to define the above information in the PBCH content.

(8) Payload Size

In consideration of the decoding performance of a PBCH, it may be assumed that a payload size of a maximum of 56 bits is provided as illustrated in [Table 4].

TABLE 4

| Details | Bit size | |
|---|---|---|
| | Below 6 GHz | Above 6 GHz |
| System Frame Number | 10 | 10 |
| Half frame indication | 1 | 1 |
| SS/PBCH block time index (MSB) | 0 | 3 |
| SSB-subcarrier offset $k_{SSB}$ | 5 | 4 |
| Reference numerology | 1 | 1 |
| PDCCH configuration for SIB1 | 8 | 8 |
| DMRS Type A position | 1 | 1 |
| Cell barred | 1 | 1 |
| Intra Frequency Reselection | 1 | 1 |
| Reserved Bit | 4 | 2 |
| CRS | 24 | 24 |
| Total | 56 | 56 |

6. NR-PBCH Scrambling

The type of an NR-PBCH scrambling sequence and the initialization of the sequence will now be described. Although use of a PN sequence may be considered in NR, it is desirable to reuse a Gold sequence as the NR-PBCH scrambling sequence unless a serious problem arises due to use of a length-31 Gold sequence defined in an LTE system as the NR-PBCH sequence.

In addition, the scrambling sequence may be initialized by at least a cell ID and 3 bits of an SSB index indicated by a PBCH-DMRS may be used for initialization of the scrambling sequence. If a half-frame indication is indicated by the PBCH-DMRS or other signals, the half-frame indication may also be used as a seed value for initializing the scrambling sequence.

7. NR-PBCH DMRS Design

An NR-PBCH DMRS should be scrambled by 1008 cell IDs and a 3-bit SSB index. This is because detection performance of 3 bits exhibits the most appropriate result for the number of hypotheses of a DMRS sequence when detection performance is compared according to the number of hypotheses for the DMRS sequence. However, since detection performance of 4 or 5 bits also exhibits almost no detection performance loss, the number of hypotheses of 4 or 5 bits may also be used.

Meanwhile, since an SSB time index and a 5-ms boundary should be indicated through the DMRS sequence, the DMRS sequence should be designed to have a total of 16 hypotheses.

In other words, the DMRS sequence should be capable of representing at least a cell ID, an SSB index in an SS burst set, and a half-frame indication and may be initialized by the cell ID, the SSB index in the SS burst set, and the half-frame indication. A detailed initialization equation is indicated by [Equation 1].

$$c_{init}=(N_{ID}^{SS/PBCH\ block}+1+8 \cdot HF) \cdot (2 \cdot N_{ID}^{cell}+1) \cdot 2^{10}+N_{ID}^{cell}$$ [Equation 1]

where $N_{ID}^{SS/PBCH\ block}$ is an SSB index within an SSB group, $N_{ID}^{Cell}$ is a cell ID, and HF is a half-frame indication index having a value of {0, 1}.

An NR-PBCH DMRS sequence may be generated based on a length-31 Gold sequence similarly to an LTE DMRS sequence or based on a length-7 or 8 Gold sequence.

Since detection performance when the length-31 Gold sequence is similar to detection performance when the length-7 or 8 Gold sequence is used, the present disclosure proposes using the length-31 Gold sequence as in the LTE DMRS. In the frequency range above 6 GHz, a Gold sequence having a longer length than the length-31 Gold sequence may be considered.

A DMRS sequence $r_{N_{ID}^{SS/PBCH\ block}}(m)$ which is modulated using QPSK may be defined by [Equation 2].

$$r_{N_{ID}^{SS/PBCHblock}}(m) = \frac{1}{\sqrt{2}}(1 - 2 \cdot c(2m)) + j\frac{1}{\sqrt{2}}(1 - 2 \cdot c(2m+1)),$$
$$m = 0, 1, \ldots, 143$$

[Equation 2]

As a modulation type for generating the DMRS sequence, BPSK and QPSK may be considered. Although detection performance of BPSK is similar to that of QPSK, since correlation performance of QPSK is better than that of BPSK, QPSK is more proper as the modulation type for generating the DMRS sequence.

Now, a method of configuring the PBCH DMRS sequence will be described in more detail. The PBCH DMRS sequence uses a Gold sequence. Two m-sequences are configured by polynomials having the same length. When the length of a sequence is short, one m-sequence may be replaced with a polynomial of a short length.

8. Time Index Indication Method

Figure 16:
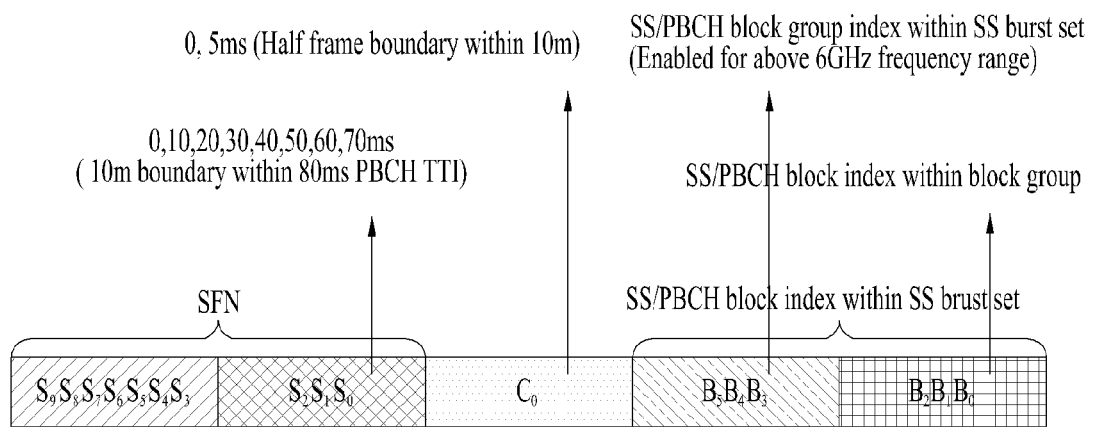
FIG. 16 is a view illustrating methods of indicating a synchronization signal index, a system frame number (SFN), and a half-frame.

Referring to FIG. 16, time information includes an SFN, a half-frame boundary, and an SSB time index. The time information may be represented by 10 bits for the SFN, 1 bit for the half-frame boundary, and 6 bits for the SSB time index. In this case, 10 bits for the SFN may be included in PBCH content. In addition, 1 bit for the half-frame may be included in the PBCH content and may be included the NR-PBCH DMRS in a frequency band of L=4. The NR-PBCH DMRS may include 3 LSBs among 6 bits for the SSB index. The 3 remaining MSBs of the SSB index may be included in the PBCH content.

A method of acquiring an SSB time index of a neighbor cell may be considered. Since decoding through the DMRS sequence exhibits better performance than decoding through the PBCH content, 3 bits of the SSB index may be transmitted by changing the DMRS sequence within each duration of 5 ms.

In the frequency range below 6 GHz, the SSB time index may be transmitted using only an NR-PBCH DMRS of a neighbor cell, whereas, in the frequency range above 6 GHz, 64 SSB indexes are separately indicated through the PBCH-DMRS and the PBCH content. Therefore, the UE needs to decode a PBCH of the neighbor cell.

However, decoding of both the PBCH-DMRS and the PBCH content may cause additional complexity of NR-PBCH decoding and reduce decoding performance of the PBCH relative to decoding of the PBCH-DMRS alone. Hence, it may be difficult to decode the PBCH in order to receive an SSB of the neighbor cell.

Accordingly, instead of decoding the PBCH of the neighbor cell, providing a configuration related to the SSB index of the neighbor cell to the UE by the serving cell may be considered. For example, the serving cell provides a configuration regarding 3 MSBs of the SSB index of a target neighbor cell to the UE and the UE detects 3 LSBs through the PBCH-DMRS of the target neighbor cell. Then, the UE may acquire the SSB index of the target neighbor cell by combining the 3 MSBs and the 3 LSBs described above.

The above description will now be given supplementarily. The UE acquires 3 MSBs of an SSB index of an SSB transmitted by a serving cell through PBCH content of the SSB received from the serving cell and detects 3 LSBs of the SSB index of the SSB transmitted by the serving cell through the PBCH-DMRS. Then, the UE receives another SSB from a neighbor cell and detects 3 LSBs of an SSB index of the other SSB through a PBCH-DMRS included in another SSB. The UE may acquire the SSB index of the neighbor cell by commonly applying the 3 MSBs of the SSB index obtained from the PBCH content of the SSB transmitted by the serving cell.

9. Evaluation of Measurement Result

Now, a performance measurement result according to a payload size, a transmission scheme, and a DMRS will be described. It is assumed that 2 OFDM symbols having 24 RBs are used to transmit an NR-PBCH. It is also assumed that an SS burst set (i.e., 10, 20, 40, or 80 ms) may have a plurality of periodicities and an encoded bit is transmitted within 80 ms.

(1) Number of Hypotheses for DMRS Sequence

Figure 17:
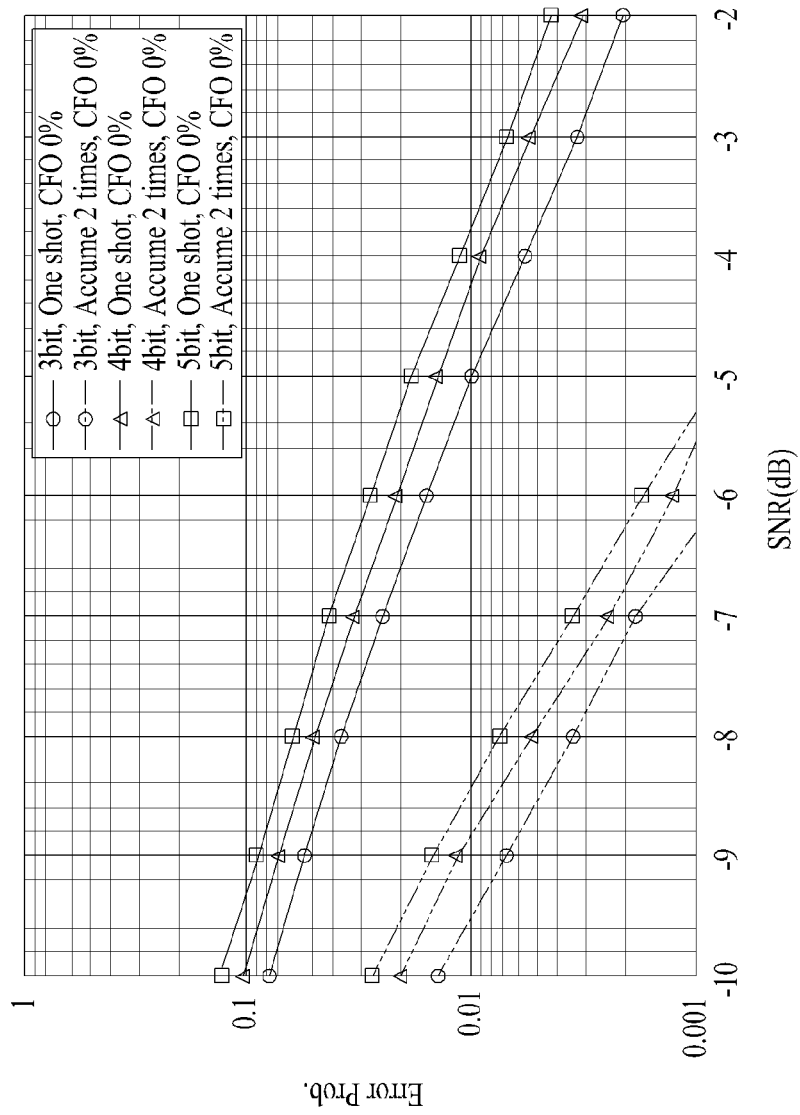
FIGS. 17 to 29 are views illustrating performance measurement results according to an embodiment of the present disclosure.

FIG. 17 illustrates a measurement result according to an SSB index. Here, 144 REs are used for a DMRS and 432 REs are used for information, in 24 RBs and 2 OFDM symbols. It is assumed that a long sequence (e.g., a length-31 Gold sequence) is used as a DMRS sequence and QPSK is used.

Referring to FIG. 17, when detection performance of 3 to 5 bits is accumulatively measured twice, an error rate of 1% is shown in −6 dB. Accordingly, in terms of detection performance, information of 3 to 5 bits may be used as the number of hypotheses for the DMRS sequence.

(2) Modulation Type

Figure 18:
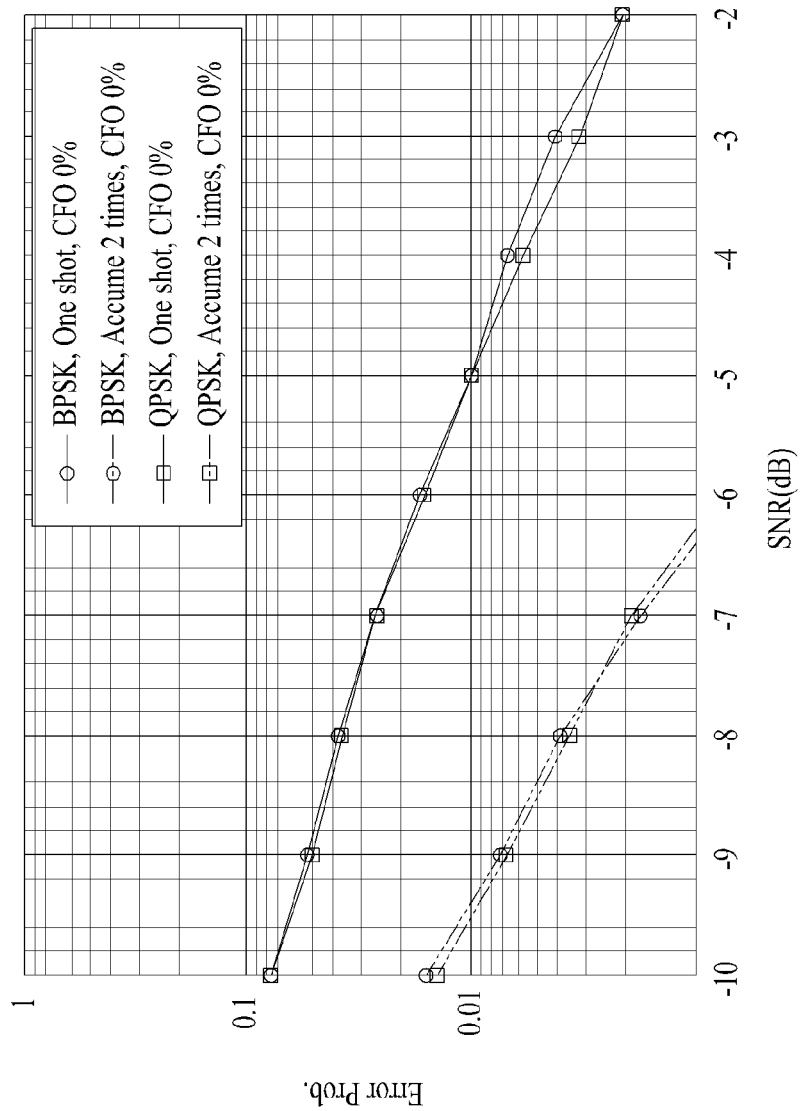
Figure 19:
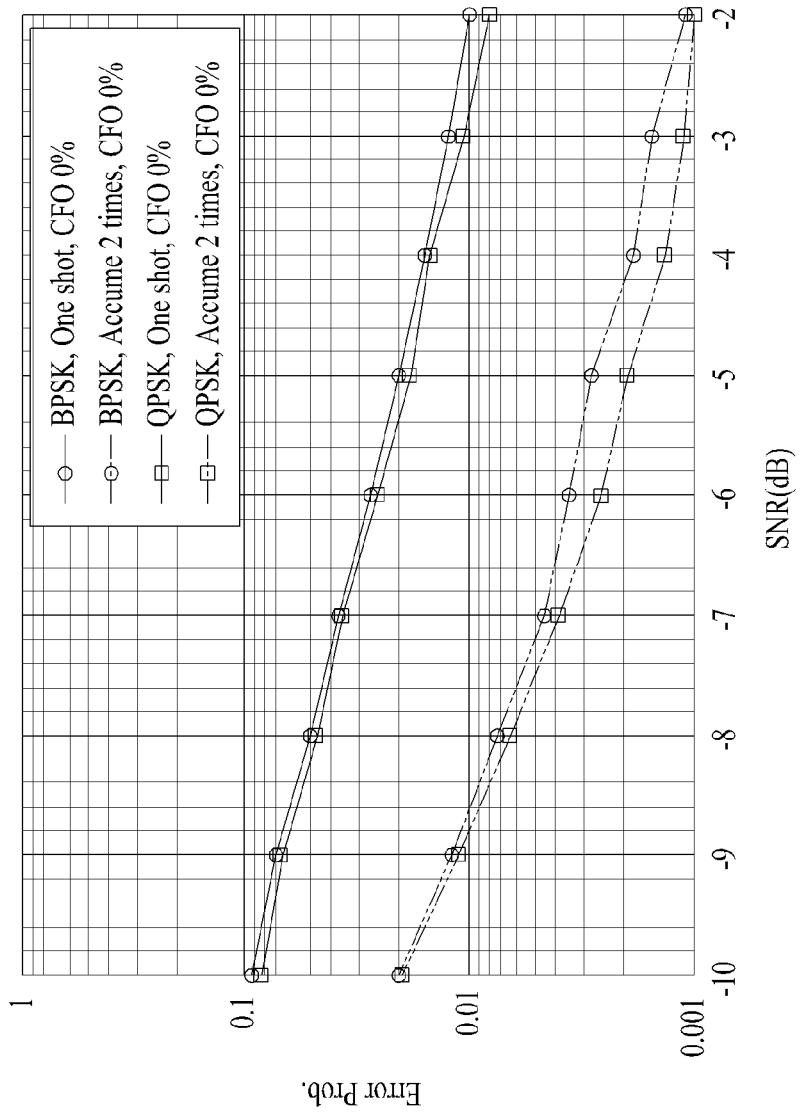

FIGS. 18 and 19 illustrate performance measurement results of comparing BPSK and QPSK. In this experiment, DMRS hypotheses are represented in 3 bits, the DMRS sequence is based on a long sequence, and a power level of an interference transmission/reception point (TRP) is equal to a power level of a serving TRP.

Referring to FIGS. 18 and 19, it may be noted that BPSK is similar in performance to QPSK. Accordingly, even when any modulation type is used for the DMRS sequence, there is little difference in terms of performance measurement. However, referring to FIGS. 20 and 21, it can be appreciated that correlation characteristics differ in BPSK and QPSK.

Figure 20:
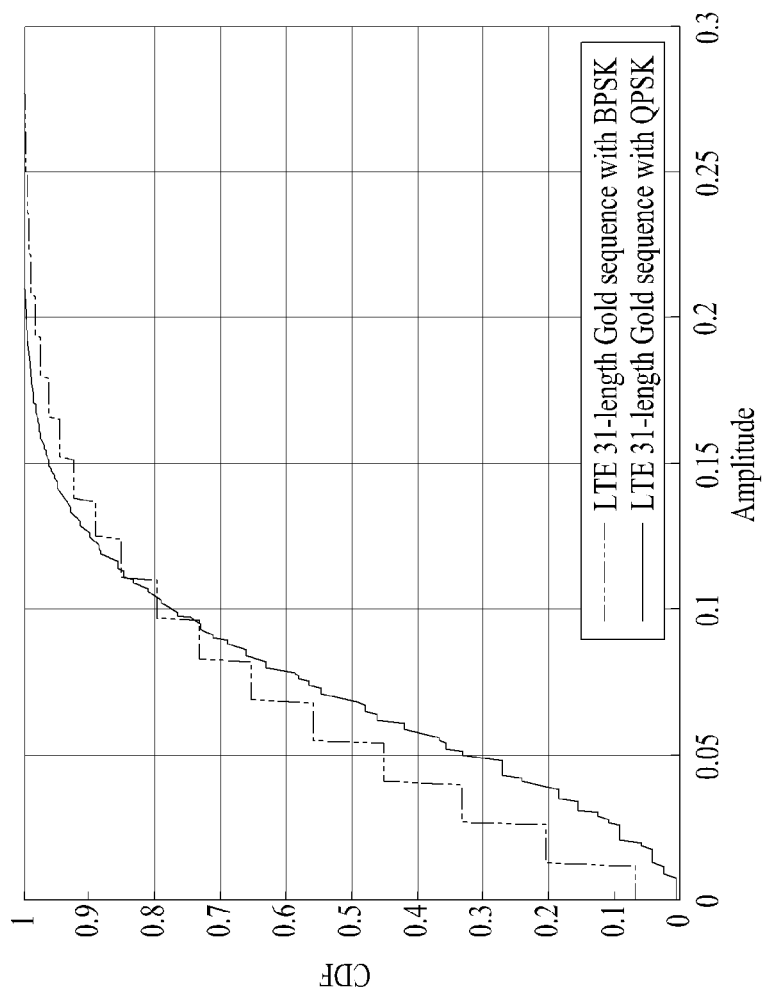
Figure 21:
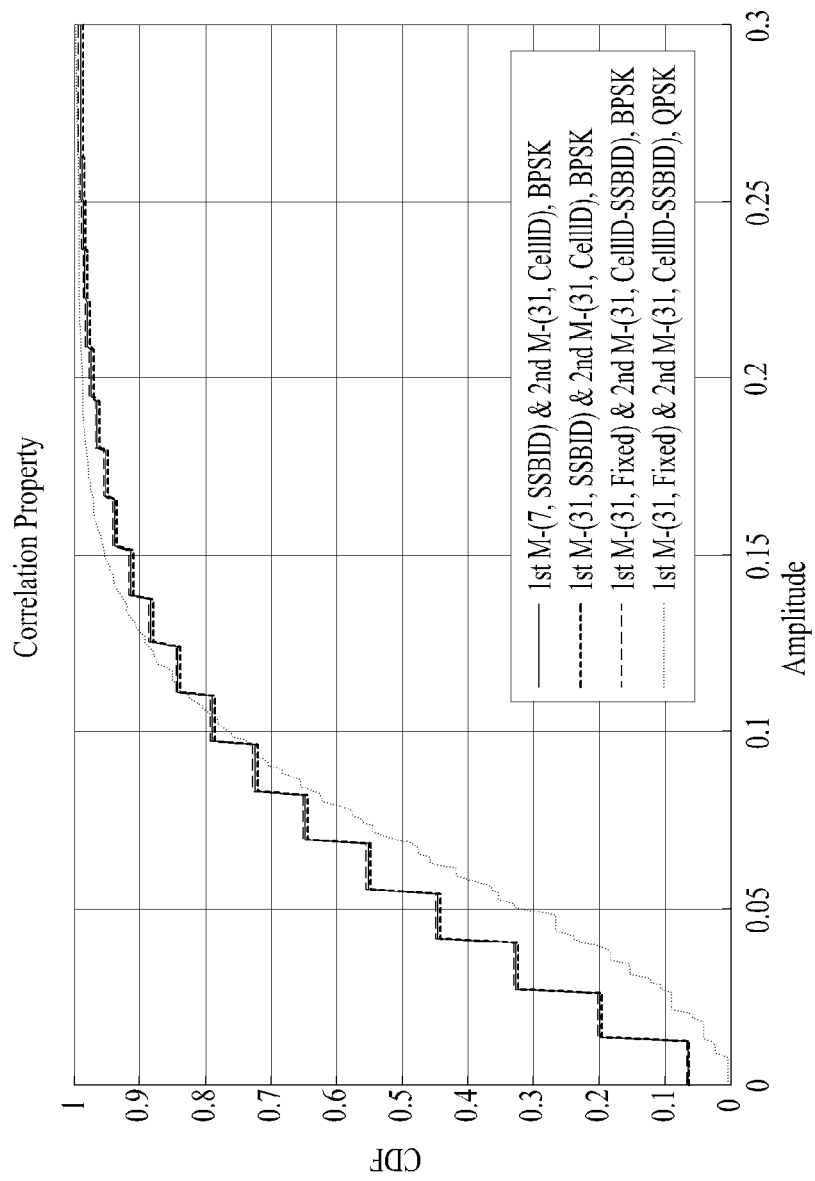

Referring to FIGS. 20 and 21, more sequences using BPSK are distributed than those using QPSK in a region in which a correlation amplitude is 0.1 or more. Therefore, when a multi-cell environment is considered, it is desirable to use QPSK as a modulation type of the DMRS. That is, in terms of a correlation characteristic, QPSK is a more suitable modulation type for a DMRS sequence.

(3) Generation of PBCH DMRS Sequence

Figure 22:
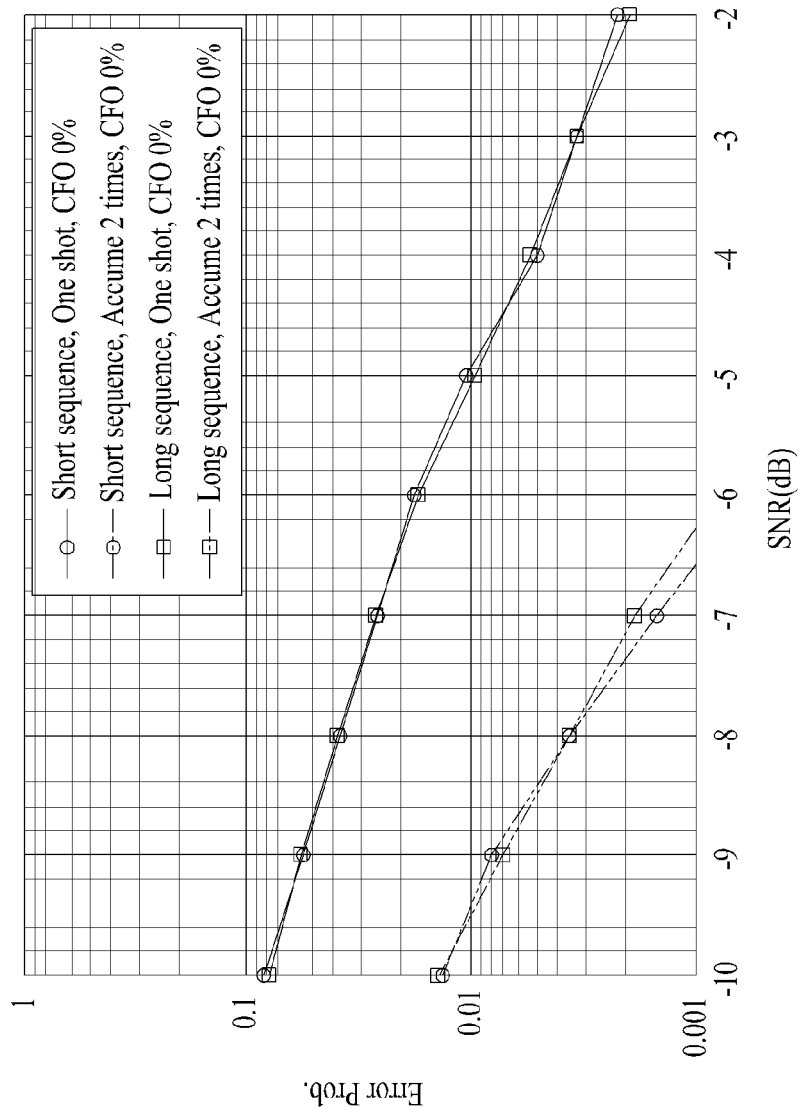
Figure 23:
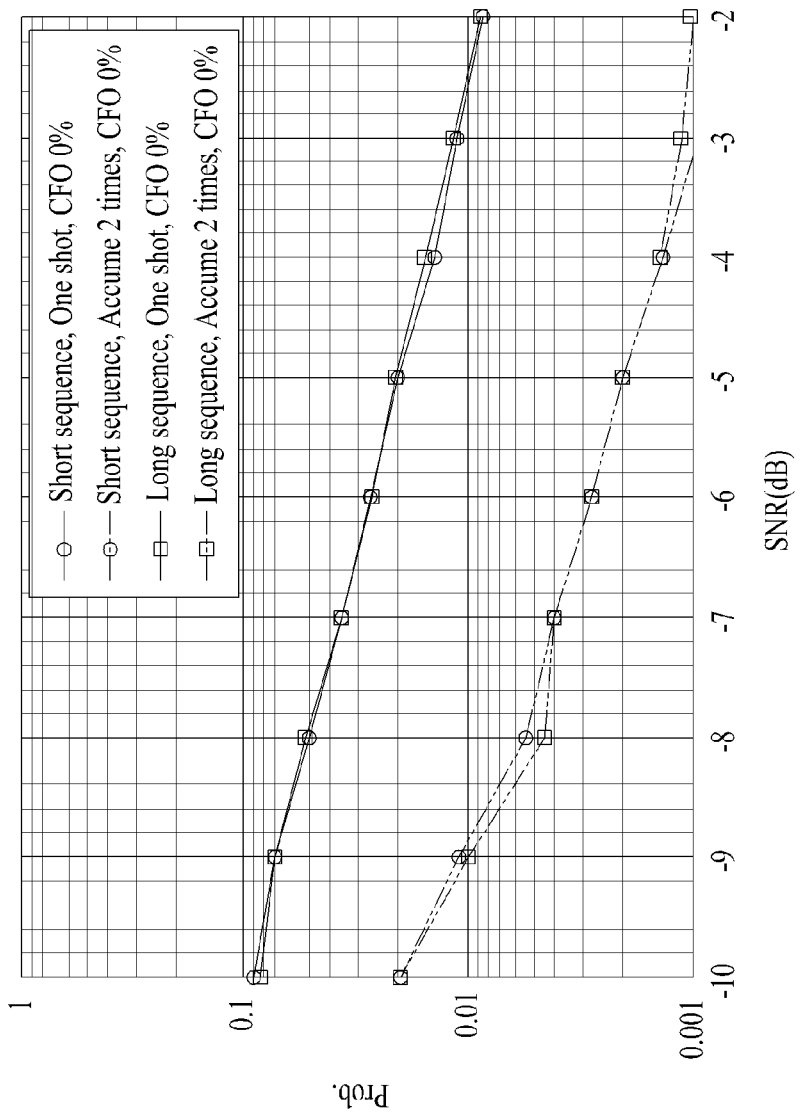

FIGS. 22 and 23 illustrate measurement results according to DMRS sequence generation. A DMRS sequence may be generated based on a long sequence in which the degree of a polynomial is 30 or more or a short sequence in which the degree of a polynomial is 8 or less. It is assumed that 3 bits are used for DMRS hypotheses and a power level of an interference TRP is the same as that of a serving TRP.

Referring to FIGS. 22 and 23, it may be noted that short-sequence based detection performance is similar to long-sequence based detection performance.

Specifically, although it is intended to raise correlation performance of a sequence by introducing a length-7 polynomial to the first m-sequence, this scheme has little difference with an existing scheme using a length-31 polynomial for the first m-sequence. In addition, although a sequence has been generated using an SSBID as an initial value of the first m-sequence, this scheme does not make any different from an existing scheme of fixing an initial value of the first m-sequence and using an SSBID-CellID for the second m-sequence.

Therefore, a length-31 Gold sequence is used as in LTE, and initialization is performed by fixing the initial value of the first m-sequence and using the SSBID-CellID for the second m-sequence, as in a legacy scheme.

(4) DMRS RE Mapping

Figure 24:
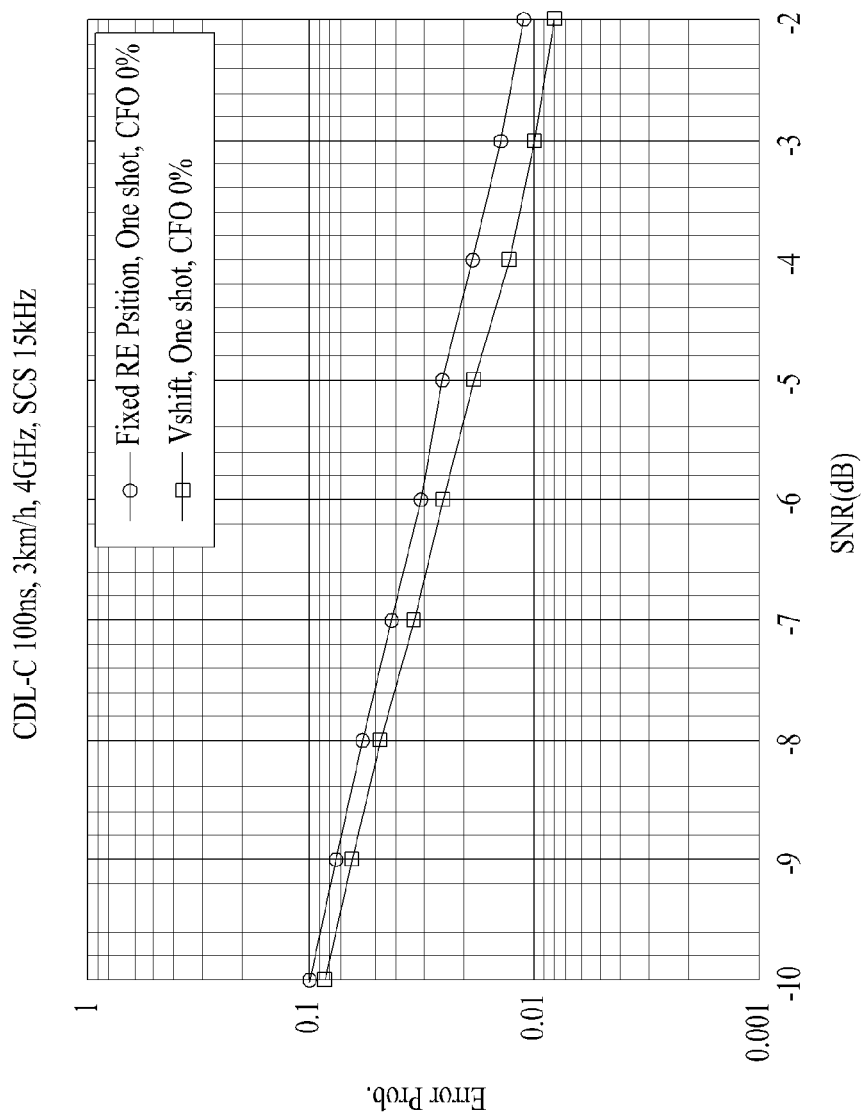

FIG. 24 illustrates a performance measurement result according to an equal interval RE mapping method and an unequal interval RE mapping method. Here, the number of hypotheses for a DMRS sequence is 3 bits, the DMRS sequence is based on a long sequence, a power level of an interference TRP is equal to that of a serving TRP, and only one interference source is present.

As noted from FIG. 24, use of variable RE mapping may cause an effect of interference randomization. Therefore, detection performance of variable RE mapping is better than detection performance of fixed RE mapping.

Figure 25:
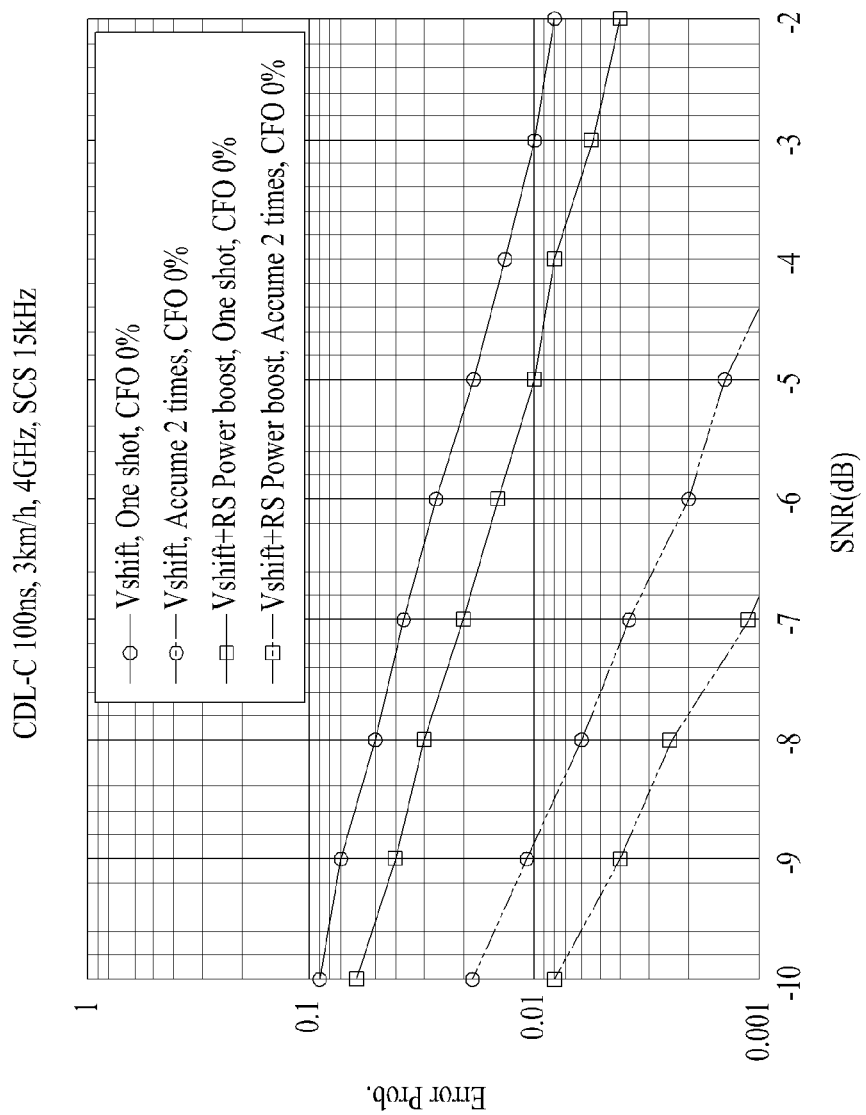

FIG. 25 illustrates a measurement result when RS power boosting is used. Here, it is assumed that RE transmission power for a DMRS is higher than RE transmission power for PBCH data by about 1.76 dB (=10*log (1.334/0.889)). If both variable RE mapping and DMRS power boosting are used, interference of other cells is reduced. As noted from FIG. 25, performance when RS power boosting is applied has gain of 2 or 3 dB as compared with the case in which RS power boosting is not present.

Figure 28:
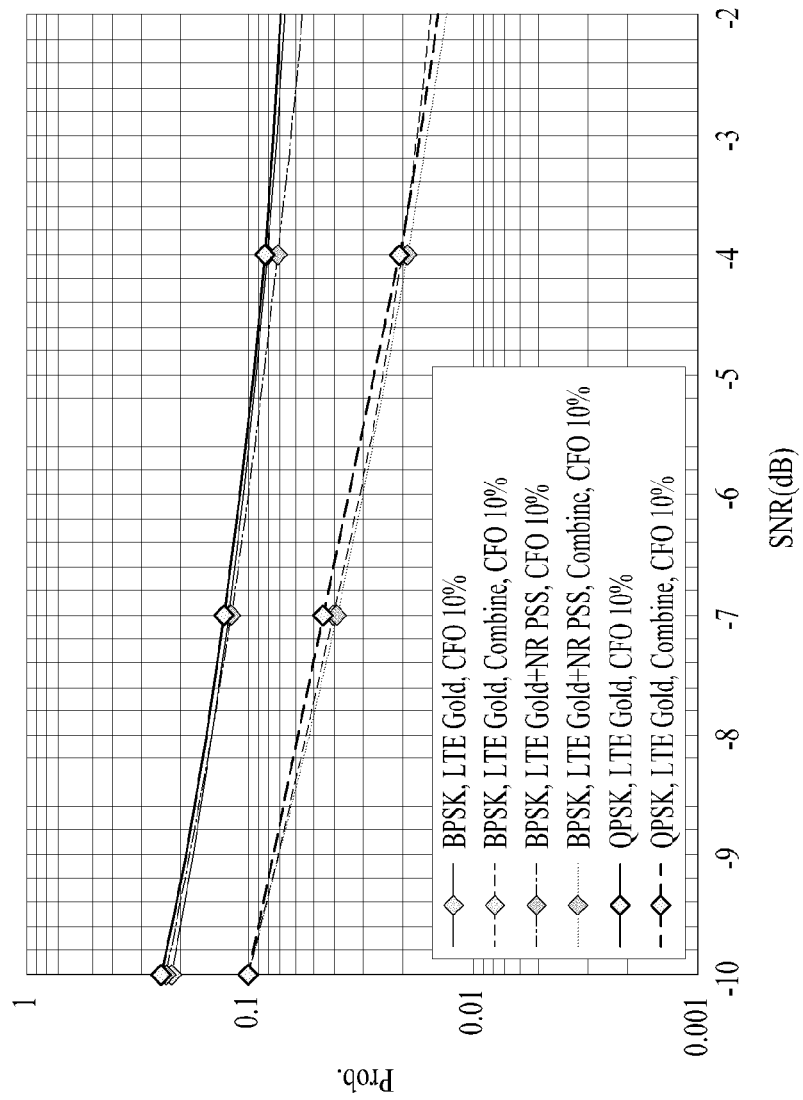
Figure 29:
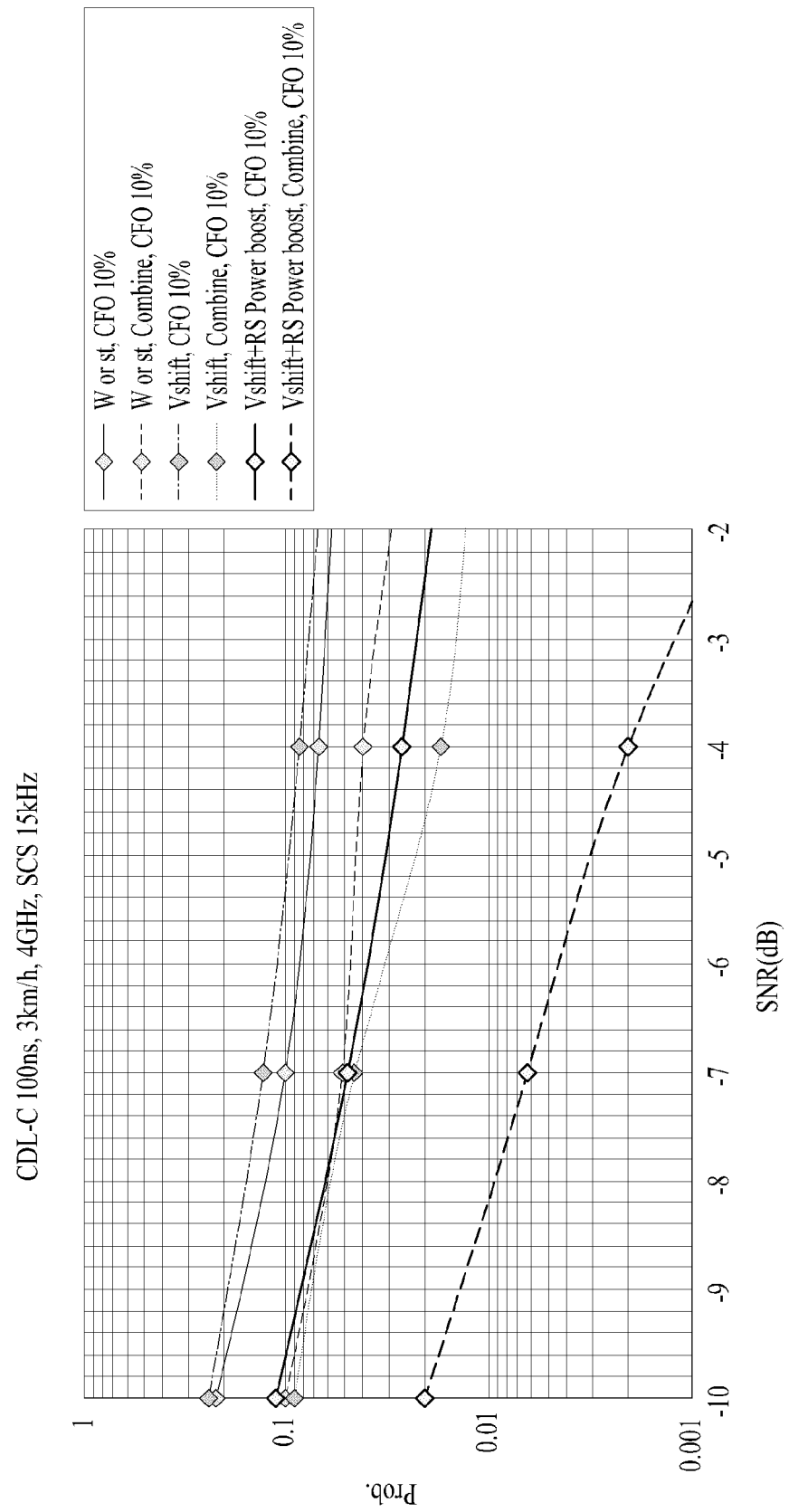

On the other hand, RS power boosting reduces RE transmission power for the PBCH data. Therefore, RS power boosting may affect PBCH performance. FIGS. 28 and 29 illustrate results of measuring PBCH performance in the cases of RS power boosting and no RS power boosting. It is assumed that a periodicity of an SS burst set is 40 ms and encoded bits are transmitted within 80 ms.

Figure 26:
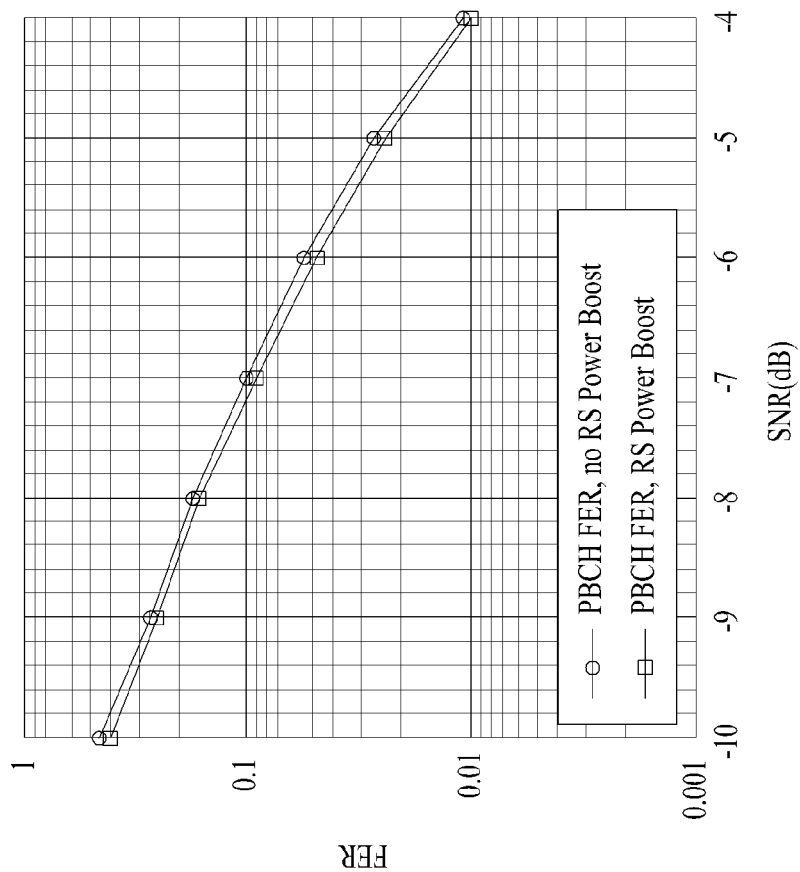
Figure 27:
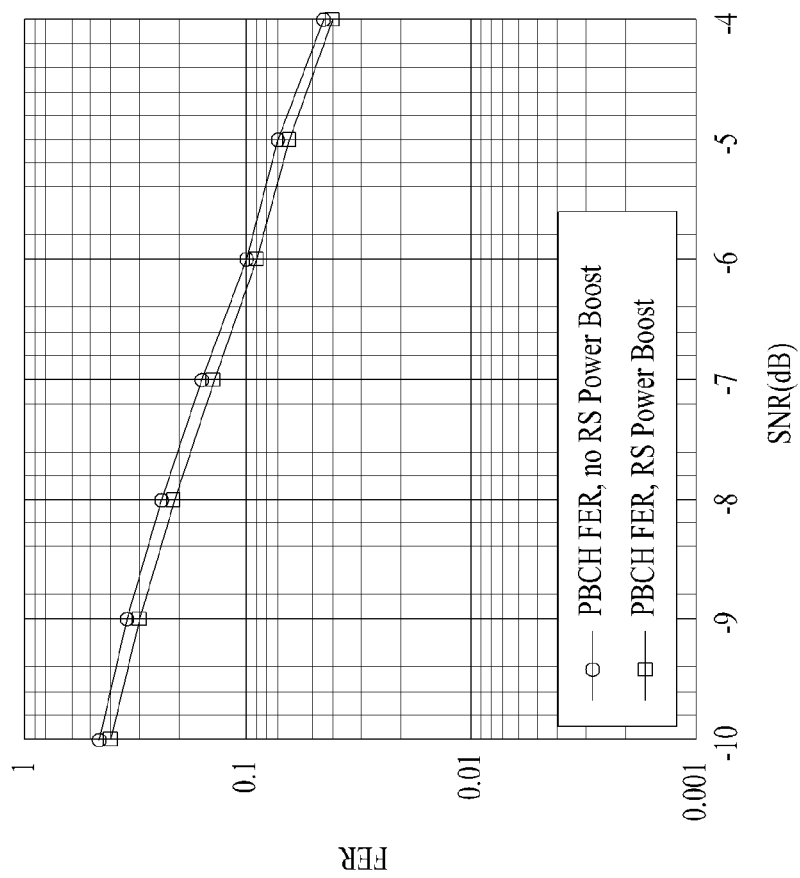

Reduction of RE transmission power for the PBCH data may cause performance loss. However, since channel estimation performance is improved due to increase in RS power, demodulation performance may be improved. Accordingly, as noted from FIGS. 26 and 27, performance is almost the same in both cases. Therefore, an effect of loss of RE transmission power for the PBCH data may be complemented by gain of channel estimation performance.

An experimental observation result of applying Vshift to RS power boosting will now be described with reference to FIG. 29. When Vshift of changing the position of a DMRS RE on the frequency axis according to a cell ID is introduced, if a PBCH DMRS transmitted in a multi-cell environment is received during two periodicities and two PBCHs are combined, detection performance is improved due to ICI randomization and, if Vshift is applied, detection performance is remarkably improved.

[Table 5] below shows assumed values for parameters used for the above performance measurement.

TABLE 5

| Parameter | Value |
|---|---|
| Carrier Frequency | 4 GHz |
| Channel Model | CDL_C (delay scaling values: 100 ns) |
| Subcarrier Spacing | 15 kHz |
| Antenna Configuration | TRP: (1, 1, 2) with Omni-directional antenna element UE: (1, 1, 2) with Omni-directional antenna element |
| Frequency Offset | 0% and 10% of subcarrier spacing |
| Default period | 20 ms |
| Subframe duration | 1 ms |
| OFDM symbols in SF | 14 |
| Number of interfering TRPs | 1 |
| Operating SNR | −6 dB |

10. Half-Frame Index Indication and Signal Design

In addition to the above-described time index indication methods, other time index indication methods may be considered. Particularly, various embodiments for effectively indicating a half-frame index will now be described.

SSBs included in a duration of 5 ms may be transmitted at a periodicity of 5 ms, 10 ms, 20 ms, 40 ms, 80 ms, or 160 ms. The UE performs signal detection in an initial access procedure under the assumption that the SSBs are transmitted at a longer periodicity (e.g., 10 ms or 20 ms) than 5 ms. Particularly, in an NR system, the UE of the initial access procedure performs signal detection under the assumption that SSBs are transmitted at a periodicity of 20 ms.

However, if the gNB transmits an SSB at a periodicity of 5 ms and the UE detects the SSB at a periodicity of 20 ms, the UE should consider that the SSB may be transmitted in a first radio half-frame or in a second radio half-frame. That is, the UE may not accurately assume that the SSB is received in the first half-frame or in the second half-frame. Accordingly, the gNB may consider methods of accurately indicating whether the SSB is transmitted in the first half-frame or in the second half-frame to the UE as follows.

(1) Explicit Indication:
  PBCH content may be changed at a periodicity of 5 ms. In this case, the UE may acquire half-frame time information by decoding a received SSB.

(2) Implicit Indication:
  A sequence of a PBCH DMRS may be changed at a periodicity of 5 ms.

The above methods may be used by a combination thereof and various other modifications may be made to the above-described methods. Various methods for transmitting half-frame time information may be considered according to a UE state in which the UE is in an initial access state or an idle mode or a situation in which the UE should currently receive time information in relation to inter-cell/inter-RAT handover etc.

As one method, the UE of an initial access procedure attempts to detect a signal of an SSB under the assumption that the SSB is transmitted at one fixed position of either a first half-frame or a second half-frame in a time range of 10 ms. That is, the UE acquires time information such as an SFN or an SSB index by performing sequence detection or data decoding on a signal or a channel included in the SSB and acquires half-frame information from the position of a slot and OFDM symbols in a radio frame, which are defined for SSB transmission.

As a detailed example of the above-described method of acquiring the time information, a method of allowing the UE performing initial access to detect only an SSB transmitted in a specific half-frame and not to detect an SSB transmitted in the other half-frame, when SSBs are transmitted at a periodicity of 5 ms, and an operation of the UE will be described.

For this purpose, two types of SSBs are configured. In the present disclosure, for convenience of description, the two types of SSBs are referred to as a first type of SSB and a second type of SSB. A network configures the first type of SSB and configures the second type of SSB which is obtained by shifting the phase, symbol position, sequence type, symbol mapping rule, and/or transmission power of a PSS/SSS/PBCH constituting the first type of SSB.

Next, the gNB transmits the first type of SSBs in the first half-frame and transmits the second type of SSBs in the second half-frame.

The UE performing initial access attempts to perform SS detection and PBCH decoding under the assumption that the first type of SSB has been transmitted from the gNB. Upon succeeding in SS detection and PBCH decoding, the UE assumes that a corresponding point is a slot and OFDM symbol belonging to the first half-frame.

Hereinafter, a method of acquiring timing information of a neighbor cell through an RS according to an embodiment of the present disclosure will be described.

10. SS/PBCH Block (1) Indication of Information about SS/PBCH Block Actually Transmitted in Band Above 6 GHz in Compressed Form.

In a band above 6 GHz, a network transmits information about an actually transmitted SS/PBCH block to the UE using a total of 16 bits including a group-bitmap (8 bits) and a bitmap in a group (8 bits) through remaining minimum system information (RMSI). This design considers balance between signaling overhead and flexibility. Although there are alternatives for transmitting information on the actually transmitted SS/PBCH block using fewer bits than the total 16 bits, the alternatives have less flexibility in representing the information about the actually transmitted. SS/PBCH block. That is, it is necessary for the network to flexibly allocate resources for transmitting the information about the actually transmitted SS/PBCH block based on a UE status and a deployment scenario. In this case, since a group-bitmap scheme having a bitmap within a group may provide flexibility using a bit size smaller than that of other alternatives, the group-bitmap scheme may be regarded as the most suitable method for transmitting the information about the actually transmitted SS/PBCH block.

Here, the RMSI corresponds to system information obtained by the UE by decoding MIB included in a PBCH. The RMSI is also referred to as system information block 1 (SIB1).

(2) SS/PBCH Block Design

Figure 30:
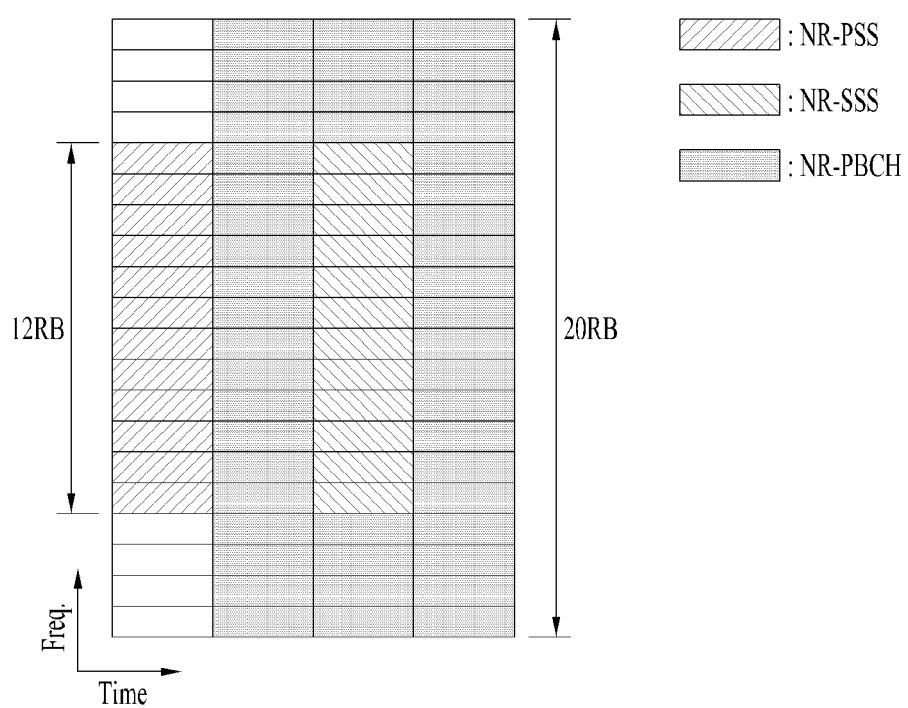
FIGS. 30 and 31 are views illustrating embodiments in which a PSS/SSS/PBCH is multiplexed in a synchronization signal.

The SS/PBCH block may be designed with a bandwidth of 20 RBs so as to have an advantage that the number of SS entries is to be less. A mapping rule that identically maps data and a DMRS in an order of frequency-time may be applied. FIG. 30 illustrates the design of SS/PBCH blocks.

Referring to FIG. 30, since the remaining PRBs to which an SSS is not mapped are used for PBCH transmission in the third OFDM symbol, power boosting for SSS transmission is not applied to the remaining PRBs. Hence, energy per resource element (EPRE) offset between an SSS RE and a PBCH DMRS RE is determined to be 0 dB. As a result, it is not guarantee that a cell-ID is detected at a time. If detection capability of the cell-ID is guaranteed, EPRE offset of 0 dB between the SSS RE and the PBCH DMRS RE may be applied.

In a PBCH according to FIG. 30, the number of REs for PBCH transmission is 576 identical to that in SS/PBCH block design with a bandwidth of 24 PRBs. Although decoding capability of the PBCH according to FIG. 30 is expected to be the same as that of the SS/PBCH block design with a bandwidth of 24 PRBs under the assumption that DMRS density and DMRS mapping of the PBCH are identical to those of the original SS/PBCH design, if the PBCH DMRS is used in the third OFDM symbol, channel estimation capability may not be maintained. Hence, it is difficult to expect that the SS/PBCH block design according to FIG. 30 has the same decoding capability as the SS/PBCH block with a bandwidth of 24 PRBs. Accordingly, in order to enhance PBCH decoding capability, the following PBCH DMRS mapping method may be considered.

DMRS density: 4 REs per RB in each symbol
DMRS mapping
   Equal density mapping for the second and fourth symbols of the SS/PBCH block
   No DMRS mapping for the third symbol of the SS/PBCH block The abovementioned alternative may provide channel estimation capability and PBCH decoding capability better than the SS/PBCH block according to FIG. 30.

(3) Evaluation Result

Figure 31:
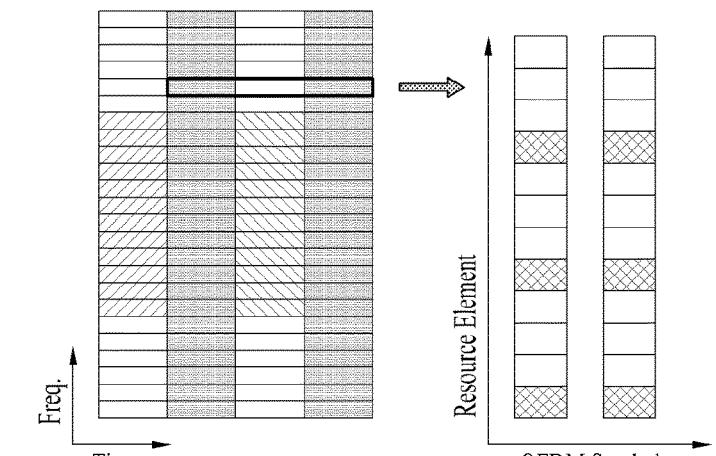
Figure 31:
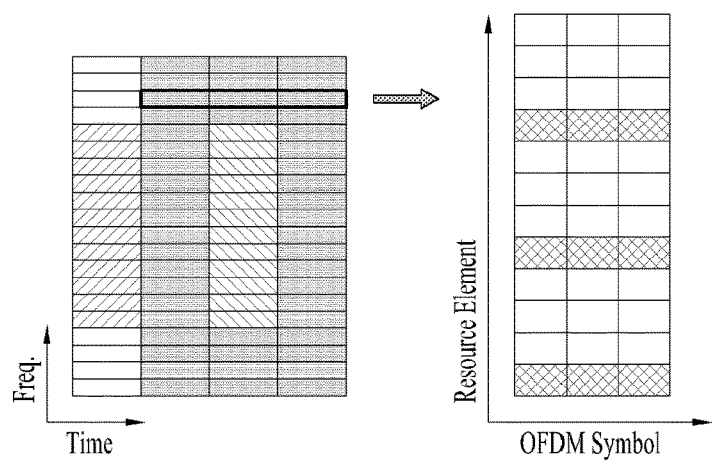
Figure 31:
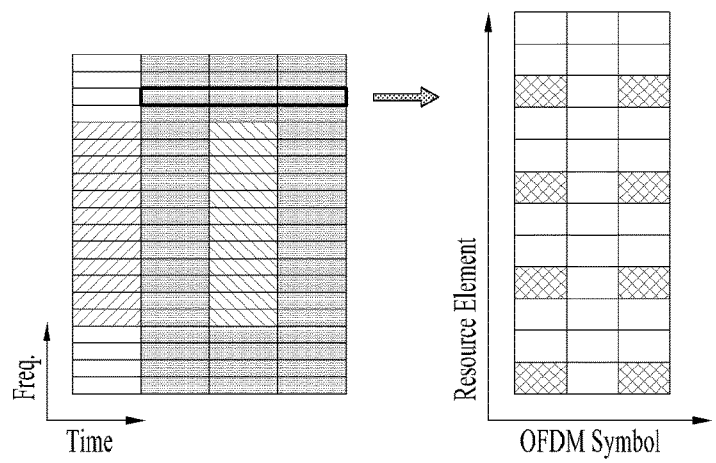
Figure 32:
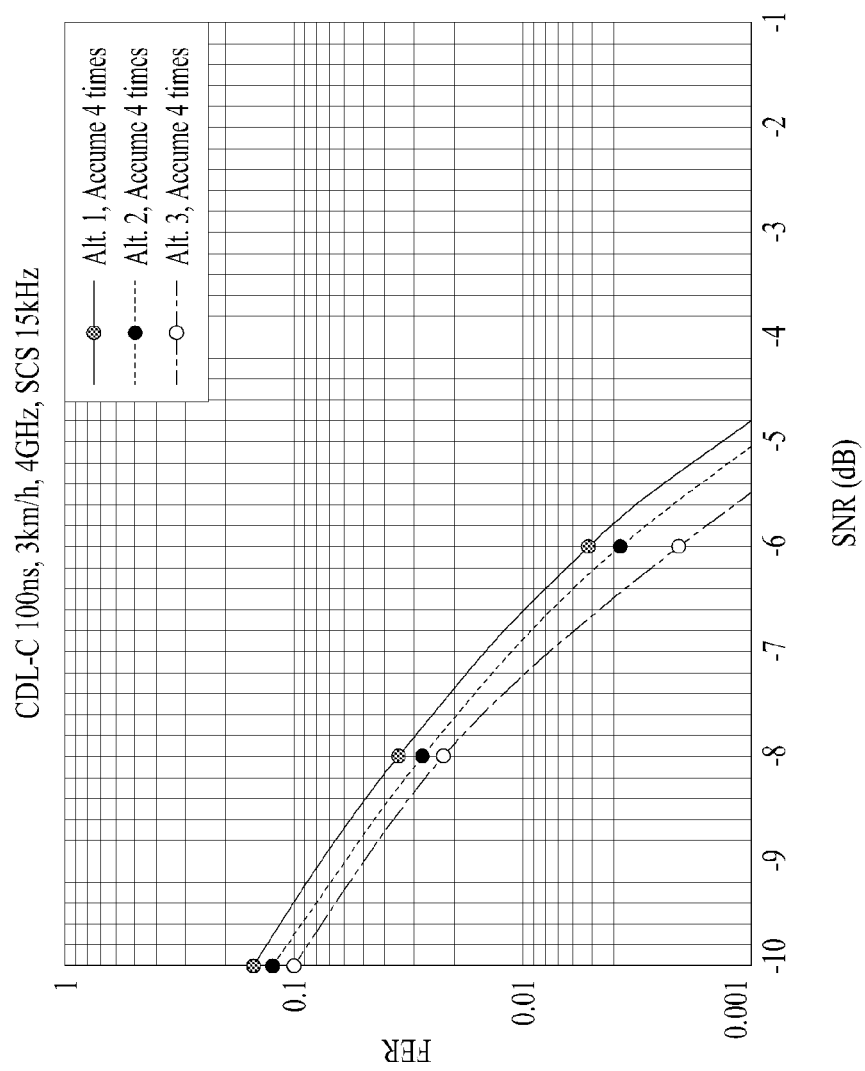
FIGS. 32 and 33 are graphs illustrating simulation results of PBCH decoding performance according to an embodiment of the present disclosure.
Figure 33:
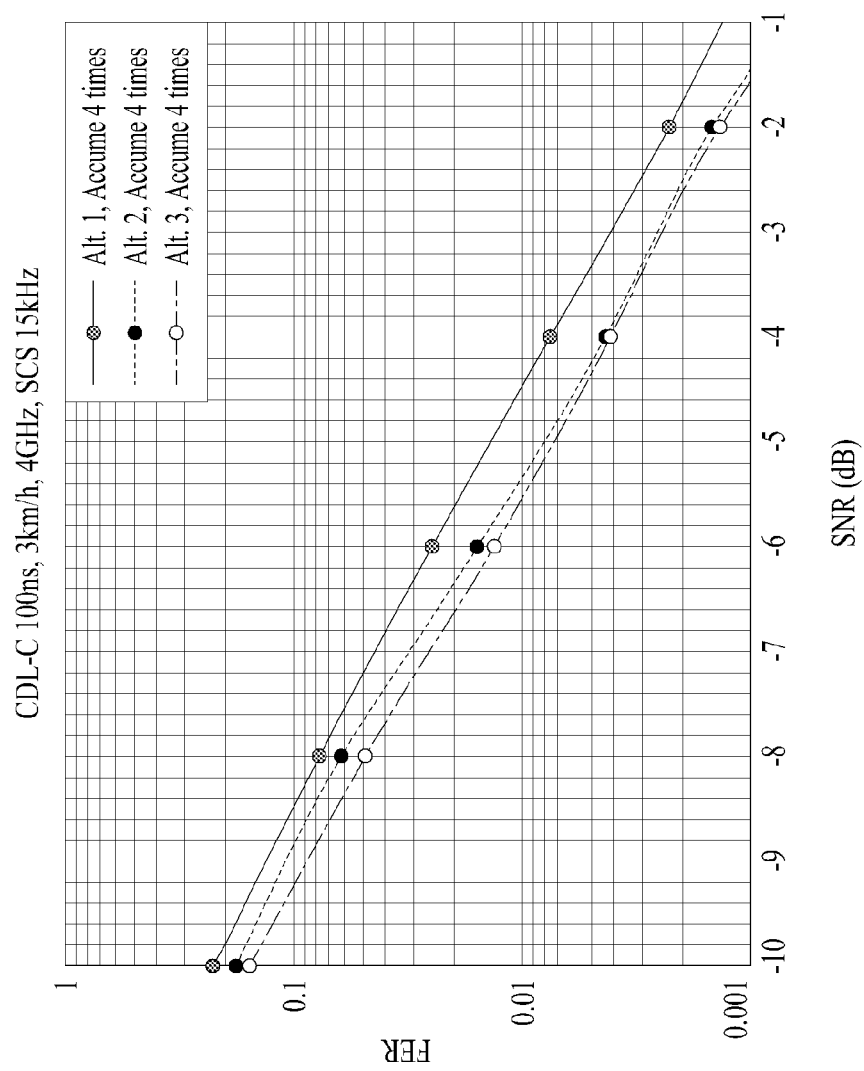

PBCH decoding capabilities of the aforementioned alternatives are compared with reference to FIGS. 31 to 33. In the evaluation of the PBCH decoding capabilities, it is assumed that default periodicity (i.e., 20 ms) of an SS burst set is used and an encoded bit is transmitted within 80 ms. Detailed assumptions on the simulation are shown in [Table 6] below.

TABLE 6

| Parameter | Value |
| --- | --- |
| Carrier Frequency | 4 GHz |
| Channel Model | CDL_C (delay scaling values: 100 ns) |
| Subcarrier Spacing | 15 kHz |
| Antenna Configuration | TRP: (1,1,2) with Omni-directional antenna element |
| | UE: (1,1,2) with Omni-directional antenna element |
| Frequency Offset | 0% of subcarrier spacing |
| Default period | 20 ms |
| Subframe duration | 1 ms |
| OFDM symbols in SF | 14 |
| Number of interfering TRPs | 1 |
| Operating SNR | −6 dB |

Details of the SS/PBCH block design is as follows.

1) Alternative 1 (FIG. 31(a)): Two OFDM symbols using 24 RBs are used to transmit a NR-PBCH. In other words, the NR-PBCH is transmitted in the second and fourth OFDM symbols of the SS/PBCH block using 24 RBs (48 RBs in total).

DMRS density: 3 REs per RB in each symbol
DMRS mapping: Equal density mapping to the second and fourth symbols of the SS/PBCH block
Number of REs of the DMRS: 144

2) Alternative 2 (FIG. 31(b)): The NR-PBCH is transmitted in the second and fourth OFDM symbols of the SS/PBCH block, which are two symbols each having 20

RBs, and the third OFDM symbol of the SS/PBCH block, which is one OFDM symbol having 8 RBs (48 RBs in total).
DMRS density: 3 REs per RB in each symbol
DMRS mapping: Equal density mapping to the second, third, and fourth OFDM symbols of the SS/PBCH block
Number of REs of the DMRS: 144

2) Alternative 3 (FIG. 31(c)): The NR-PBCH is transmitted in the second and fourth OFDM symbols of the SS/PBCH block, which are two symbols each having 20 RBs, and the third OFDM symbol of the SS/PBCH block, which is one OFDM symbol having 8 RBs (48 RBs in total).
DMRS density: 4 REs per RB in each symbol
DMRS mapping: Equal density mapping to the second and fourth OFDM symbols of the SS/PBCH block (no DMRS mapping to the third symbol of the SS/PBCH block).
Number of REs of the DMRS: 160

Referring to FIGS. 32 and 33, it may be noted that Alternative 2 provides worse performance than Alternative 1 or 3. Such loss of decoding capability is because channel estimation capability of the DMRS of the third symbol is degraded. Among the three alternatives, Alternative 3 shows the best DMRS decoding capability. The reason of capability enhancement is that DMRS deployment in Alternative 3 obtains more accurate channel information than DMRS deployment in Alternatives 1 and 2.

11. Timing Information Indication (1) Half-Frame Indication

A 1-bit half-frame indicator is included in a PBCH payload. When a periodicity of a CSI-RS for performing measurement is equal to or greater than 20 ms, the UE assumes that the network is "synchronous" with respect to the CSI-RS for measurement. Since the maximum number of beams is 4 in a band below 3 GHz, the half-frame indicator is implicitly signaled via a PBCH DMRS.

Additionally, a method of checking a frame boundary in a band of 3 to 6 GHz without performing decoding of a PBCH is needed. In order to measure an intra-frequency in the band of 3 to 6 GHz, situations described below may be considered to indicate a frame boundary of a neighbor cell.

1) When the network configures a CSI-RS having a periodicity of 20 ms or more, a serving cell configures a synchronization indicator as "synchronous" and the UE may assume that the network is synchronous.

2) When the network configures a CSI-RS having a periodicity of 10 ms, the serving cell provides the UE with information of "CSI-RS-Config-Mobility" and the UE may obtain information indicating whether a starting position of one candidate CSI-RS scrambling sequence corresponds to odd-numbered 5 ms or even-numbered 5 ms by performing correlation for the CSI-RS after acquiring an SS/PBCH block index through a PBCH DMRS sequence.

3) When the network configures a CSI-RS having a periodicity of 5 ms, the serving cell provides the UE with information of "CSI-RS-Config-Mobility" and the UE may obtain information indicating whether starting positions of two candidate CSI-RS scrambling sequences correspond to odd-numbered 5 ms or even-numbered 5 ms by performing correlation for the CSI-RS after acquiring the SS/PBCH block index through the PBCH DMRS sequence.

4) A scrambling sequence periodicity of the CSI-RS is defined as 5 ms.

5) If the network does not configure a CSI-RS, although the UE obtains an SSB index through the PBCH DMRS sequence, the UE may not distinguish between even-numbered 5 ms and odd-numbered 5 ms.

In order to solve problems that may occur in 4) and 5), the network should always configure "CSI-RS having a periodicity of 10 ms" or "CSI-RS having a periodicity of 5 ms having a scrambling sequence periodicity of 10 ms". When the network is asynchronous the serving cell should provide the UE with information of "CSI-RS-Config-Mobility".

If the network is synchronous, the serving cell should configure the synchronization indicator as "synchronous". In other word, when the CSI-RS is not configured, when a scrambling sequence periodicity of the CSI-RS is 5 ms or lower in the case in which a CSI-RS periodicity is 5 ms or less, or when the CSI-RS periodicity is 20 ms, 40 ms, 80 ms, 160 ms, or 320 ms, the network should operate as "synchronous" and the serving cell configures the synchronization indicator as "synchronous".

A more specific embodiment of the above-described embodiment will now be described.

In the NR system, timing information (i.e., an SFN, a half-frame, or an SS/PBCH block index) is defined by PBCH content. Hence, the UE may obtain the timing information by performing PBCH decoding. Since a frame structure and signal, a slot number, a scrambling sequence, a DMRS sequence, a CSI-RS sequence, a PRACH configuration, etc., are defined within 10 ms, the UE needs to obtain frame boundary information.

Accordingly, in the case of RRM/handover, the UE needs to attempt to perform PBCH decoding in order to acquire half-frame information and/or an SS/PBCH block index for a neighbor cell. However, in the case of RRM/handover, it is not desirable for the UE to perform PBCH decoding for the neighbor cell.

Thus, in a frequency band in which the maximum number of beams is 4, the half-frame indicator is implicitly signaled as a part of a PBCH DMRS. That is, in a frequency band below 3 GHz, the UE may acquire the half-frame information by detecting a PBCH DMRS sequence of the neighbor cell. In a frequency band below 6 GHz, an SS/PBCH block index is implicitly signaled by the PBCH DMRS.

In frequency range 1 (FR1), the UE may acquire the SS/PBCH block index by detecting the PBCH DMRS sequence. However, in a higher frequency range, i.e., in FR2, the UE should still decode a PBCH in order to obtain the time information of the neighbor cell. For example, in the frequency range above 3 GHz, the UE should decode the PBCH in order to obtain the half-frame indicator in a PBCH payload. In FR2, the UE should also perform PBCH decoding in order to acquire the SS/PBCH index of 3 MSBs.

Therefore, in order to solve the aforementioned problems in FR2, it is necessary to configure assumption about accuracy of time synchronization between a serving cell and a target cell.

For example, for a PRACH configuration, in the case of FDD (paired spectrum), the tolerance of a frame boundary between cells is assumed to be +/−5 ms. In the case of RRM measurement, when parameter useServingCellTimingForSync is configured as "true" in TDD (unpaired spectrum) and the same frequency layer, the tolerance of frame boundary alignment is assumed to be at least 2 SSB symbols and one data symbol.

However, when cell switching is performed from FDD to TDD, from TDD to FDD, and from TDD to TDD (in the case of inter-frequency), assumption about the tolerance of the frame boundary between cells needs to be further considered.

In more detail, for FDD which may correspond to an asynchronous network, it is reasonable that the tolerance from FDD to TDD or from TDD to FDD is assumed to be +/−5 ms. Like the case of LTE, it may be assumed that the tolerance from TDD to TDD is +/−2.5 ms.

[Table 7] shows a summary of a method of acquiring time information of a neighbor cell according to a handover/RRM scenario.

In other words, the gNB provides information about an RS of a neighbor cell to the UE. Here, a sequence used to generate the RS may be a pseudo-noise (PN) sequence such as a Gold sequence or an M sequence. The PN sequence may be generated based on an OFDM symbol, a slot number, and a cell ID. The generated sequence is modulated using QPSK and the modulated sequence is mapped to a subcarrier position corresponding to frequency/time allocated for the RS and then is transmitted. The gNB of the neighbor cell generates and transmits a signal based on RS information provided to the UE, i.e., a sequence of the RS.

TABLE 7

| Serving cell | Target cell | Neighbour cell Time Information Acquisition | | The tolerance of frame boundary between cells |
|---|---|---|---|---|
| | | SS/PBCH Block index | Half Frame | |
| FDD | FDD (~3.0 GHz) | PBCH DMRS (LSB 2 bits) | PBCH DMRS & Payload | +/−5 ms |
| | TDD (~2.4 GHz) | PBCH DMRS (LSB 2 bits) | PBCH DMRS & Payload | [+/−5 ms] (Need further discussion) |
| | TDD (2.4 GHz~ 6.0 GHz) | PBCH DMRS (LSB 3 bits) | PBCH Payload only | |
| | TDD (6.0 GHz~ 52.6 GHz) | PBCH DMRS (LSB 3 bits) PBCH Payload (MSB 3 bits) | PBCH Payload only | |
| TDD | FDD (~3.0 GHz) | PBCH DMRS (LSB 2 bits) | PBCH DMRS & Payload | [+/−5 ms] (Need further discussion) |
| | TDD (~2.4 GHz) | PBCH DMRS (LSB 2 bits) | Same with serving cell | [+/−2.5 ms] (Need to discuss) |
| | TDD (2.4 GHz~ 6.0 GHz) | PBCH DMRS (LSB 3 bits) | Same with serving cell | |
| | TDD (6.0 GHz~ 52.6 GHz) | PBCH DMRS (LSB 3 bits) PBCH Payload (MSB 3 bits) | Same with serving cell | |
| | TDD (Same frequency layer) | Same with serving cell | Same with serving cell | MIN(2 SSB symbols, 1 data symbol) when 'useServingCellTimingForSync' is true |

Based on the above-described assumptions, the method of acquiring the timing information of the neighbor cell will be described below.

In NR, since an RS sequence is designed to identify the positions of an OFDM symbol and a slot, the RS sequence may be used to detect the position of the symbol and the position of the slot.

Accordingly, in order to solve the above-described issues, it is considered that a CSI-RS resource is allocated in the vicinity of an actually transmitted SS/PBCH block (ATSS). That is, the CSI-RS resource may be allocated to a region within a predetermined range from a region to which the ATSS is mapped. Since a CSI-RS sequence is initialized by a cell ID, an OFDM symbol number, and a slot number within a frame, a time position (i.e., an OFDM symbol and a slot number) may be obtained by detecting the CSI-RS sequence.

For example, if the gNB configures a CSI-RS resource located around the SS/PBCH block, the UE may detect a frame boundary using a correlation property of the CSI-RS sequence configured at a candidate position within a frame.

That is, in FR1, the UE may assume two hypotheses under which the detected SS/PBCH block is located within the frame.

In a frequency band above 6 GHz, i.e., in FR2, a maximum of 16 hypotheses may be assumed in consideration of the positions of an OFDM symbol and a slot in which the SS/PBCH block may be located within the frame.

The UE derives candidate RS information that the gNB of the neighbor cell may transmit from the RS information of the neighbor cell provided by a serving cell. The UE receives a signal of the neighbor cell and detects an RS at a candidate position at which the RS may be transmitted. Next, the UE compares the detected signal with the candidate RS information derived thereby and selects a candidate RS which is most similar to the detected signal at the corresponding position. Then, the UE may acquire timing information about a timing at which the detected signal is received from information included in the selected RS. That is, the information included in the RS may include the positions of an OFDM symbol and a slot in which the RS is transmitted.

The information included in the RS may also include information about partial bits among SS/PBCH block indexes. The bits may correspond to SS/PBCH block indexes transmitted to a PBCH payload. The information included in the RS may also include information about a half-frame.

1) Method of Acquiring Timing Information of a Neighbor Cell after Receiving a Handover Command In the case of handover, the UE may detect a CSI-RS sequence in order to obtain the timing information. In particular, since a CSI-RS for beam management and tracking serves as an essential function for the UE, the UE always expects that the CSI-RS will be configured by a CSI-MeasConfig information element (IE) in a handover command message.

That is, after receiving a handover command, the UE may perform a sequence detection operation in order to acquire the timing information using the CSI-RS sequence. The timing information may be acquired faster through CSI-RS sequence detection than through PBCH decoding.

Accordingly, for handover, the UE may receive NZP-CSI-RS-ResourceSet constituting CSI-MeasConfig, which is a higher layer parameter, through a higher layer.

As described above, in order to acquire the timing information through the CSI-RS sequence, the following assumptions should be considered.

The CSI-RS for beam management or tracking may be allocated to an OFDM symbol including the SS/PBCH block or allocated in the vicinity of the SS/PBCH block.

The UE may assume that quasi co-location (QCL) conditions for both the SS/PBCH block and the CSI-RS are equal.

The UE may assume that the CSI-RS periodicity and the SS/PBCH block periodicity are equal.

That is, in order to perform handover, the UE may configure the CSI-RS for management or tracking through CSI-MeasConfig, which is a higher layer parameter.

When a spatial reception parameter is applicable, the UE assumes that the CSI-RS and the SS/PBCH block are quasi co-located (QCLed) with respect to Doppler shift, Doppler spread, average delay, or delay spread.

In other words, in order to perform handover, for a target cell in which the number of beams, L, is greater than 4 (L>4), the UE may acquire an OFDM symbol number and a slot number based on reception of the CSI-RS for beam management or tracking.

2) Method of Acquiring the Timing Information of the Neighbor Cell Prior to Reception of the Handover Command or for Neighbor Cell Measurement In RRM, the gNB may configure the CSI-RS resource for measurement. Accordingly, for inter/intra-frequency measurement, the UE may receive a CSI-RS-ResourceConfigMobility configuration through a higher layer. In this case, CSI-RS-ResourceConfigMobility may be a UE-specific parameter.

In order to obtain the timing information, the UE may assume a plurality of hypotheses for detecting the CSI-RS sequence. For example, when the UE desires to acquire only the half-frame information, the UE may assume that the detected SS/PBCH block is positioned in a first half-frame or a second half-frame. In addition, when the UE desires to acquire both the SS/PBCH index and the half-frame information, the UE may assume 16 hypotheses.

3) Method of Acquiring SS/PBCH Block Index and Half-Frame Information Based on RS As a method different from Methods 1) and 2) described above, a new sequence for carrying 3 MSBs of the SS/PBCH block index and/or the half-frame information may be considered. The new sequence may be designed to be similar to the CSI-RS sequence.

A sequence may be UE-specifically configured by a higher layer. For example, a total of 16 different sequences may be introduced for the 3 MSBs of the SS/PBCH block index and the half-frame information. Among the 16 sequences, the first 8 sequences may be used for the 3 MSBs of the SS/PBCH block index for a front half-frame and the remaining 8 sequences may be used for the 3 MSBs of the SS/PBCH block index of a latter half-frame.

The above-described embodiments will now be described in terms of the UE and the gNB with reference to FIGS. 34 to 36.

Figure 34:
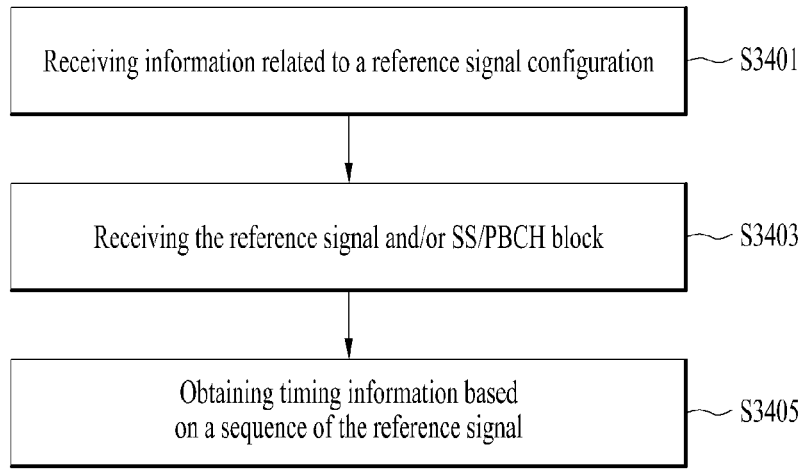
FIGS. 34 to 36 are views illustrating a method of acquiring timing information through a reference signal according to an embodiment of the present disclosure.

FIG. 34 illustrates the operation of the UE. The UE may include a transceiver for receiving an SS/PBCH block and an RS for timing information of a neighbor cell and transmitting/receiving a signal to/from a plurality of cells and a processor connected to the transceiver to control the transceiver to receive a first SS/PBCH block from a serving cell and control the transceiver to receive a second SS/PBCH block and the RS from the neighbor cell.

The processor may acquire timing information of the first SS/PBCH block based on a PBCH included in the first SS/PBCH block and acquire indexes of the second SS/PBCH block and timing information of the RS, for the neighbor cell, based on the second SS/PBCH block and the RS.

The timing information of the first SS/PBCH block may include index information of the first SS/PBCH block. A sequence of a DMRS transmitted in a symbol to which the PBCH is mapped, i.e., a sequence of a PBCH-DMRS, may be generated based on an ID of the serving cell and indexes of the first SS/PBCH block. Timing information of the second SS/PBCH block of the neighbor cell may include index information of the second SS/PBCH block. The sequence of the PBCH-DMRS may be generated based on an ID of the neighbor cell and the indexes of the second SS/PBCH.

The timing information of the RS for the neighbor cell may include information about the position of an OFDM symbol related to the indexes of the second SS/PBCH block and information about the position of a slot of the symbol. The timing information of the RS for the neighbor cell may also include information about the position of an OFDM symbol related to indexes included in a PBCH payload among the indexes of the second SS/PBCH block and information about the position of a slot of the symbol.

The timing information of the RS for the neighbor cell may include index information related to the indexes included in the payload among the indexes of the second SS/PBCH block. The timing information of the RS for the neighbor cell may include half-frame information related to the indexes of the second SS/PBCH block. The timing information of the RS for the neighbor cell may include half-frame information.

The RS for the neighbor cell may be generated using a CSI-RS sequence, a DMRS sequence, and/or a PN sequence.

The operation of the UE will now be described with reference to FIG. 34. The UE receives information related to an RS configuration for obtaining timing information of a neighbor cell from a serving cell (S3401) and receives an SS/PBCH block and an RS from the neighbor cell (S3403).

Then, the UE obtains the timing information of the neighbor cell based on a sequence of the RS. In this case, the timing information that may be obtained from the sequence of the RS may include information related to indexes of the SS/PBCH block received from the neighbor cell and information about a slot, a symbol, and a half-frame of a timing at which the RS is received.

A detailed method in which the UE obtains the timing information of the neighbor cell based on the sequence of the received RS, the RS, and the type of the RS sequence conform to the above-described embodiments (S3405).

The operation of a gNB according to an embodiment of the present disclosure will now be described with reference to FIG. 35. Here, the gNB may be replaced with one or more cells. In the following description, the gNB may correspond to a serving cell or a neighbor cell.

Figure 35:
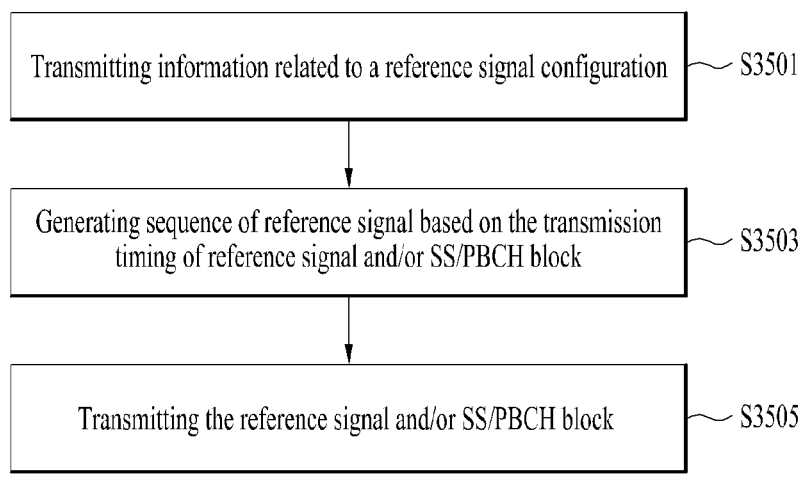
Figure 36:
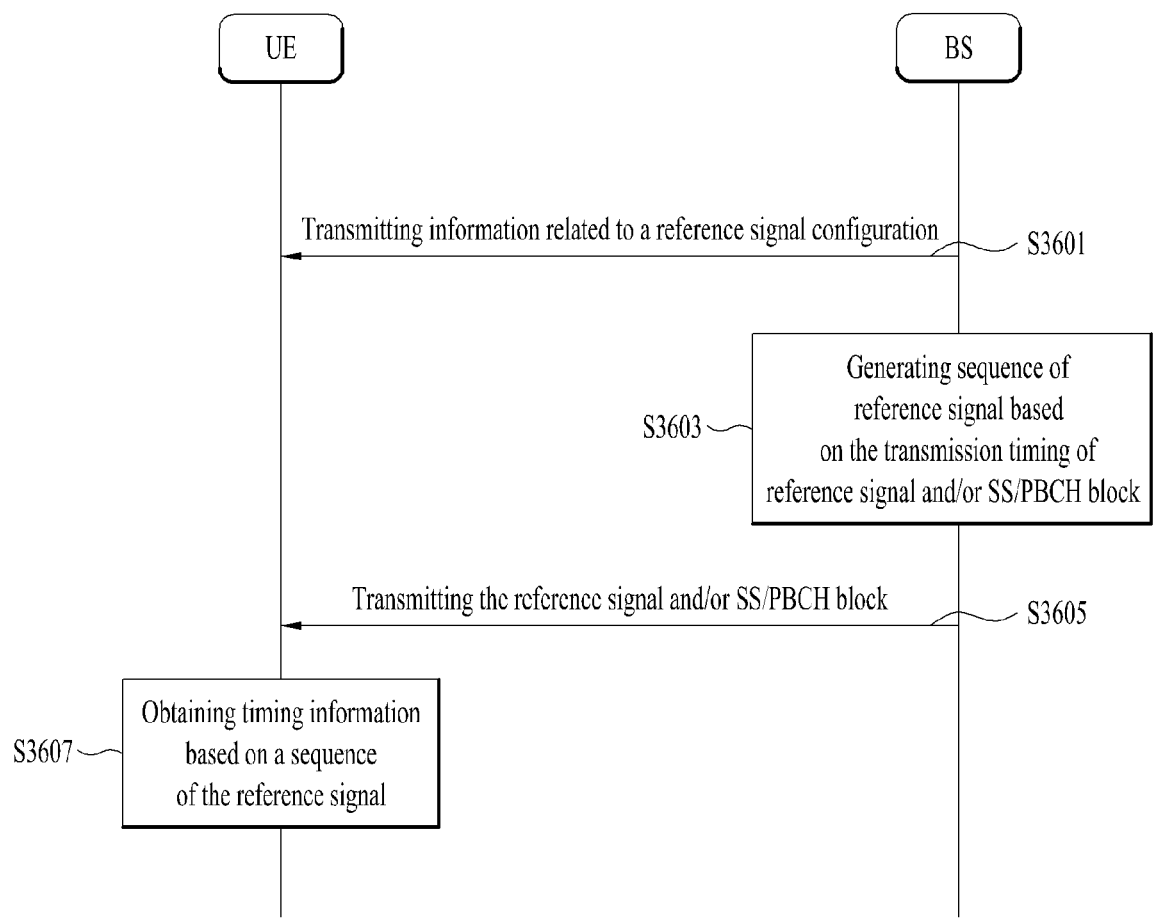

In other words, the gNB, which is a subject of the operation of FIG. 35 may correspond to one gNB or different gNBs corresponding to the serving cell and the neighbor cell, respectively.

The gNB corresponding to the serving cell transmits a configuration related to an RS for acquiring timing information of a neighbor cell to a UE (S3501). Next, the gNB corresponding to the neighbor cell generates a sequence of the RS based on a transmission timing of the RS and/or an SS/PBCH block. In this case, a seed value of the RS sequence may be information about a slot, a symbol, and a half-frame in which the RS is transmitted or information about indexes of the SS/PBCH block transmitted in the vicinity of the RS (S3503).

A detailed method in which the gNB generates the sequence of the RS based on the timing information of the neighbor cell, the RS, and the type of the RS sequence conform to the above-described embodiments.

Next, the gNB corresponding to the neighbor cell transmits the generated RS and the SS/PBCH block of the neighbor cell to the UE (S3505).

The above-described operations of the UE and the gNB will be described again with reference to FIG. 36.

First, the gNB corresponding to a serving cell transmits a configuration related to an RS for obtaining timing information of a neighbor cell to the UE (S3601). Next, the gNB corresponding to the neighbor cell generates a sequence of the RS based on a transmission timing of the RS and/or an SS/PBCH block. A detailed method in which the gNB generates the sequence of the RS based on the timing information of the neighbor cell, the RS, and the type of the RS sequence conform to the above-described embodiments (S3603).

Next, the gNB corresponding to the neighbor cell transmits the generated RS and the SS/PBCH block of the neighbor cell to the UE (S3605).

Upon receiving the RS and the SS/PBCH block from the neighbor cell, the UE obtains the timing information of the neighbor cell based on the sequence of the RS. As described above, the timing that may be obtained from the sequence of the RS may include information related to indexes of the SS/PBCH block received from the neighbor cell and information about a slot, a symbol, and a half-frame of a timing at which the RS is received.

A detailed method in which the UE obtains the timing information of the neighbor cell based on the sequence of the received RS, the RS, and the type of the RS sequence conform to the above-described embodiments (S3607).

(2) Synchronization Information

A method of obtaining an SS/PBCH time index for a neighbor cell is described. Since a DMRS sequence provides performance better than performance of PBCH content decoding, a 3-bit SS/PBCH block index is transmitted by changing the DMRS sequence within a periodicity of 5 ms. That is, in a frequency band below 6 GHz, the SS/PBCH time index for the neighbor cell may be obtained from an NR-PBCH DMRS. On the other hand, in a frequency band above 6 GHz, since 64 SS/PBCH block indexes are represented in a manner of being divided into a PBCH-DMRS and PBCH content, the UE decodes a PBCH of the neighbor cell in order to obtain the SS/PBCH block index of the neighbor cell. However, the above method causes additional complexity due to decoding performed on the NR-PBCH of the neighbor cell. In addition, since decoding performance of a PBCH is inferior to decoding performance using a PBCH-DMRS, there is no reason for the UE to directly decode the PBCH of the neighbor cell in order to obtain the SS/PBCH block index.

Hence, a method for a serving cell to provide a configuration for the SS/PBCH block index for the neighbor cell instead of the method for the UE to decode the PBCH of the neighbor cell. For example, the serving cell may provide a configuration of MSBs (3 bits) of an SS/PBCH block index for a target neighbor cell. Then, the UE may detect LSBs (3 bits) of the SS/PBCH block index of the neighboring cell via a PBCH-DMRS of the neighboring cell. Next, in order to obtain the SS/PBCH block index of the neighbor cell, the UE combines the 3 MSBs obtained via PBCH decoding of the serving cell and the 3 LSBs obtained via the PBCH-DMRS of the neighbor cell, thereby obtaining the SS/PBCH block index for the target neighbor cell.

12. NR-PBCH Content (1) Payload Size and Content

A payload size of a PBCH corresponds to 54 bits both in a band below 6 GHz and in a band above 6 GHz and PBCH content is illustrated in [Table 8] below.

TABLE 8

| Details | Bit size | |
|---|---|---|
| | For B6 GHz | For A6 GHz |
| System Frame Number | 10 | 10 |
| Hal frame indication | 1 | 1 |
| SS/PBCH block time index (MSB) | 0 | 3 |
| PDSCH DMRS position | 1 | 1 |
| Reference numerology | 1 | 1 |
| RE level frequency position of RMSI CORESET (includes frequency offset and RB level indication) | 9 | 7 |
| Frequency resource of RMSI CORESET | 2 | 1 |
| Time resource of RMSI CORESET | 2 | 2 |
| PDCCH monitoring window duration | 1 | 1 |
| PDCCH monitoring window offset | 1 | 1 |
| cellBarred | 1 | 1 |
| intraFreqReselection | 1 | 1 |
| Reserved Bit | 2 | 2 |
| CRC | 24 | 24 |
| Total | 56 | 56 |

(2) Information for Quickly Identifying that RMSI is not Present Through PBCH

In the NR system, an SSB is used not only to provide information for network access but also to perform operation measurement. In particular, in order to measure a wideband CC operation, a plurality of SS/PBCH blocks may be transmitted. However, if RMSI is transmitted at all frequency positions at which the SS/PBCH blocks are transmitted, this may increase signaling overhead. Accordingly, in order to efficiently utilize resources, the RMSI may be regarded as being transmitted at a specific frequency position. In this case, since UEs in an initial access procedure may not recognize whether or not system information is provided at a frequency position currently detected by the UEs, there is ambiguity in obtaining the system information. In order to solve such ambiguity, it is necessary to consider a method of defining a bit field to quickly identify that there is no RMSI corresponding to a PBCH. In addition, another solution in which there is no need to introduce the bit field may be considered. As a solution, there is a method of transmitting an SS/PBCH block for performing measurement at a frequency position which is not defined as a frequency raster. In this case, since the UEs in the initial access procedure are incapable of detecting the SS/PBCH blocks, ambiguity for whether or not RMSI is present is solved.

13. Initial Active DL BWP

The UE attempts to detect a signal within a bandwidth of an SS/PBCH block while performing an initial synchronization procedure including cell ID detection and PBCH decoding. The UE continuously performs a next initial access procedure including a procedure for obtaining system information and an RACH process within an initial active DL/UL bandwidth.

Figure 37:
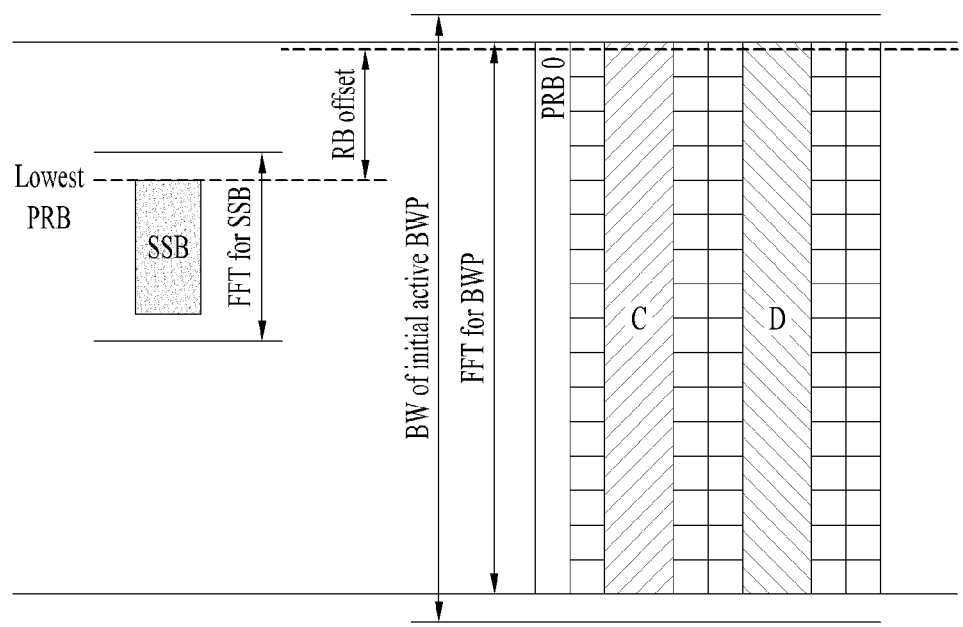
FIGS. 37 to 40 are views illustrating a CORESET configuration method for RMSI and a monitoring window configuration method for a PDCCH corresponding to a CORESET configuration.

An initial active DL BWP is defined based on a frequency position of an RMSI CORESET, a bandwidth of the RMSI CORESET, and numerology of RMSI. A RMSI CORESET configuration and numerology of RMSI may be configured in a PBCH payload. An offset between the SS/PBCH block and the initial active DL BWP is indicated through a PBCH. As illustrated in FIG. 37, since the offset is indicated by a random offset between the SS/PBCH block and a channel RB in a frequency range below 6 GHz and in a frequency range above 6 GHz, the offset value should be defined for both a frequency range below 6 GHz and a frequency range above 6 GHz. After obtaining information about the initial active DL BWP and the CORESET, the UE may perform a procedure for obtaining system information (i.e., RMSI) based on the information about the initial active BWP and the CORESET.

Figure 38:
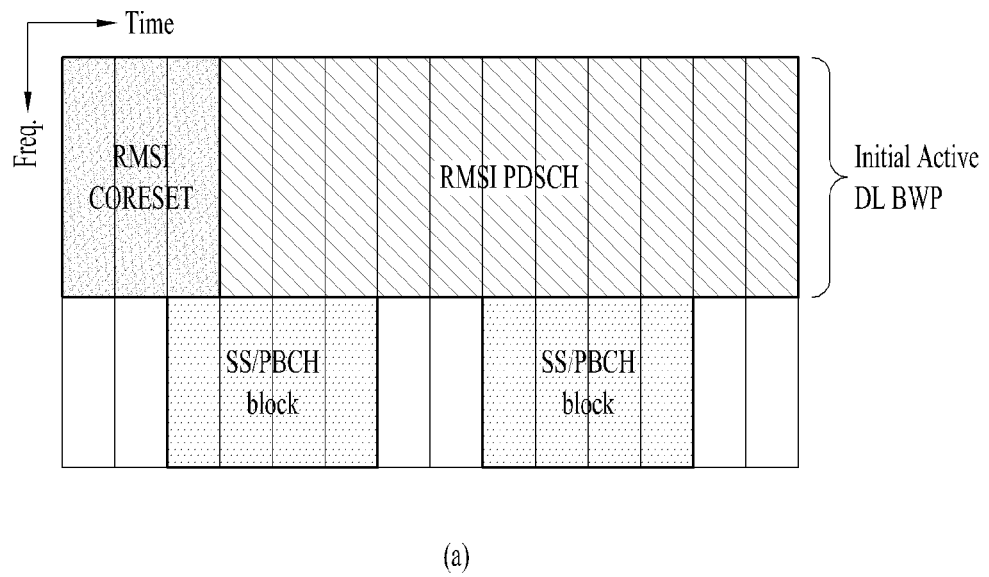
Figure 38:
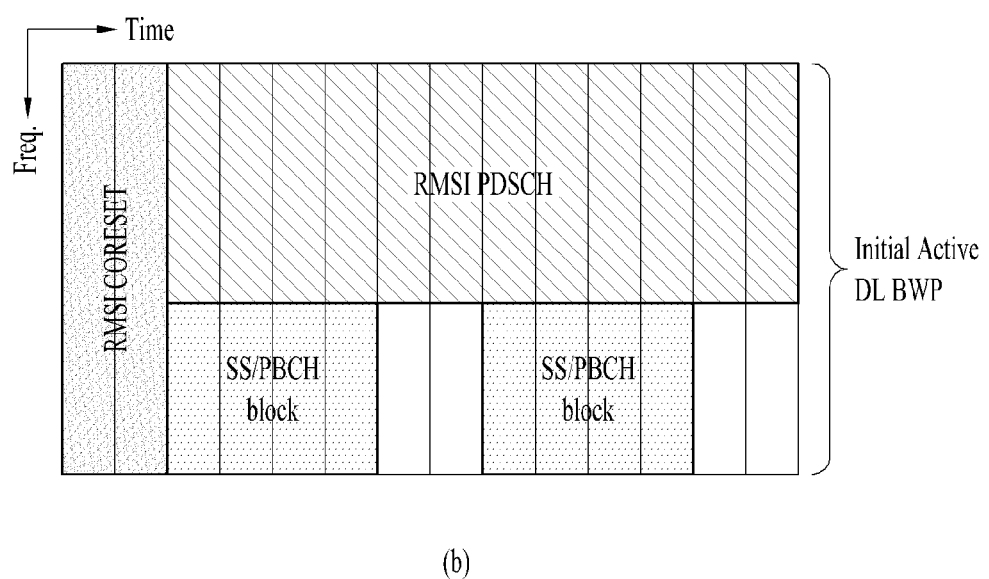

NR supports FDM transmission of a QCLed SS/PBCH block and RMSI. It is necessary to clearly indicate a bandwidth in which the SS/PBCH block and the initial active DL BWP are multiplexed. When a resource is allocated to a PDSCH on which RMSI corresponding to a PDCCH CORESET is carried, the UE assumes that an SSB is not transmitted on the allocated resource. That is, as illustrated in FIG. 38, when 3 OFDM symbols are used for the RMSI CORESET, the SS/PBCH block and the RMSI CORESET/PDSCH should be FDMed. On the contrary, when a maximum of two OFDM symbols is allocated to the RMSI CORESET, the SS/PBCH block and the RMSI CORESET may be TDMed and the SS/PBCH block and the RMSI PDSCH may be FDMed within the initial active DL BWP.

During an initial access procedure, the UE needs to periodically receive the SS/PBCH block to perform measurement, time/frequency tracking, RACH power control, and the like. However, if the SS/PBCH block is positioned at the outside of a UE minimum bandwidth (BW), a certain UE having no capability of performing a wideband operation should perform frequency retuning in order to periodically receive the SS/PBCH block. The frequency retuning may increase standby time of the initial access procedure due to RF recombination in terms of a UE operation. Accordingly, in NR, even when the SS/PBCH block and the RMSI CORESET are FDMed, the SS/PBCH block and the RMSI CORESET may be limitedly FDMed within a UE minimum RX BW.

14. RMSI CORESET Configuration (1) Bit Size for RMSI CORESET Configuration

An RMSI configuration of an NR-PBCH payload may include a BW for an RMSI CORESET (represented in a PRB unit), OFDM symbols, a frequency position, and a monitoring window. To this end, the PBCH payload uses 56 bits in total including a 24-bit CRC. In this case, among 32 bits except 24 bits of the CRC, 8 bits may be used for the RMSI CORESET configuration. If 4 bits for indicating a frequency offset correspond to a part for indicating the frequency position, a total of 12 bits is allocated for the RMSI CORESET configuration. For a frequency band below 6 GHz, 3 bits are additionally used for the RMSI CORESET configuration.

(2) Required BW and OFDM Symbol

In order to determine how many frequency/time resources, i.e., how many PRBs and OFDM symbols, are required for the RMSI CORESET configuration, it is necessary to consider aggregation levels supported by NR. For example, when NR supports three aggregation levels including aggregation levels 4, 6, and 8, at least 3 PRB sizes such as 23, 32, and 48 RBs are required. The number of PRBs within a channel BW is defined based on subcarrier spacing. For example, when the channel BW is 10 MHz, the number of PRBs in a subcarrier spacing of 15 kHz is 52 and the number of PRBs in a subcarrier spacing of 30 kHz is 24. In this case, one or two OFDM symbols may be required to provide a required aggregation level. Hence, two tables (i.e., Tables 6 and 7) indicating the number of PRBs and the number of OFDM symbols are proposed.

[Table 9] illustrates the number of PRBs for a single RMSI CORESET and [Table 10] illustrates the number of OFDM symbols for a single RMSI CORESET.

TABLE 9

| Code word | Configured subcarrier spacing for RMSI | | | |
|---|---|---|---|---|
| | 15 kHz | 30 kHz | 60 kHz | 120 kHz |
| 00 | 25 (5 MHz) | 24 (10 MHz) | 66 (50 MHz) | 32 (50 MHz) |
| 01 | 52 (10 MHz) | 38 (15 MHz) | 132 (100 MHz) | 66 (100 MHz) |
| 10 | 79 (15 MHz) | 51 (20 MHz) | — | — |
| 11 | 106 (20 MHz) | 106 (40 MHz) | — | — |

TABLE 10

| Code word | Below 6 GHz |
|---|---|
| 00 | 1 (when one OFDM symbol is used for PDCCH within a slot) |
| 01 | 1 (when two OFDM symbols are used for PDCCH within a slot) |
| 10 | 2 |
| 11 | 3 |

In [Table 9], the number of PRBs is defined based on a subcarrier spacing indicated by a PBCH payload. Since the number of RMSI CORESET BWs varies with a frequency range, a different bit size for a BW configuration may be considered. For example, 2 bits are used for a frequency band below 6 GHz and 1 bit may be used for a frequency band above 6 GHz. Based on this, a UE minimum BW for the RMSI CORESET BW may be determined. For example, the UE minimum BW may correspond to 20/40 MHz in a frequency band below 6 GHz and the UE minimum BW may consider up to 100 MHz in a frequency band above 6 GHz. However, a part of configurations of [Table 6] may be excluded from the frequency band above 6 GHz. For example, 100 MHz BW may be excluded from the frequency band above 6 GHz.

Figure 39:
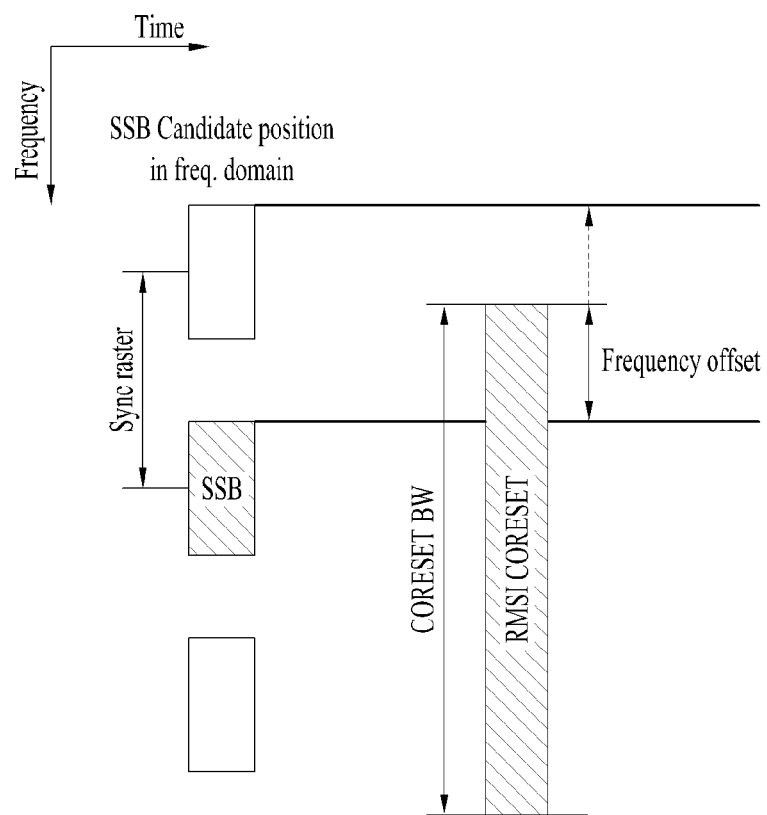

In [Table 10], the number of OFDM symbols is defined. An RMSI CORESET may use a maximum of 3 OFDM symbols for a PDCCH within a slot. In particular, a maximum of 2 RMSI CORESETs may be configured within the slot. If one OFDM symbol is allocated to the RMSI CORESET, up to two OFDM symbols may be used for a PDCCH within the slot. Otherwise, one RMSI CORESET may be used within the slot (3) Frequency Position Indication A frequency position of an RMSI CORESET may be indicated by a relative RE offset between the frequency position of the RMSI CORESET and a frequency position of an SS/PBCH block. The RE offset is defined by a subcarrier spacing of the SS/PBCH block. FIG. 39 illustrates an embodiment of indicating the frequency position of the RMSI CORESET.

Referring to FIG. 39, when the lowest PRB of an RMSI CORESET is present between candidate positions of two consecutive SS/PBCH blocks for SS/PBCH block transmission, a network may select a candidate SS/PBCH block position having a higher frequency position. A cell in which an SSB is defined, i.e., an SS/PBCH block having RMSI, is transmitted at the candidate SS/PBCH block position having a higher frequency position and the RMSI CORESET is indicated based on the lowest PRB index of the SS/PBCH blocks. If it is assumed that the RMSI CORESET is indicated based on the SS/PBCH block having a higher frequency position among the candidate positions of the two consecutive SS/PBCH blocks for SS/PBCH block transmission, to maximum range of a frequency position offset between the RMSI CORESET and the SS/PBCH block is defined by a synchronization raster.

When the RMSI CORESET is indicated based on the SS/PBCH block having a higher frequency position among the candidate positions of the two consecutive SS/PBCH blocks, this means that the SS/PBCH block corresponds to an SS/PBCH block closest to the center of the RMSI CORESET. Specifically, referring to FIG. 39, since an offset value is defined by an offset value between the lowest PRB of the RMSI CORESET and the lowest PRB of the SS/PBCH block, a PRB of an upper part becomes a PRB having a lower index in FIG. 19. That is, the lowest PRB of the RMSI CORESET corresponds to a PRB positioned at the top of the RMSI CORESET in FIG. 39. Hence, SS/PBCH blocks positioned below and above the lowest PRB of the RMSI CORESET correspond to an SS/PBCH block positioned at the top and an SS/PBCH block positioned at the middle among SS/PBCH blocks illustrated in FIG. 39.

That is, in FIG. 39, a frequency value of an upper part is low and a frequency value of a lower part is high. Hence, candidate SS/PBCH blocks, which may become a reference of an offset value, are the SS/PBCH block positioned at the top and the SS/PBCH block positioned at the middle. In this case, a relative RB value difference between the lowest PRB (positioned at the top in FIG. 39) of the middle SS/PBCH block having a higher frequency position and the lowest PRB of the RMSI CORESET is defined as an offset.

Accordingly, referring to FIG. 39, since the SS/PBCH block positioned at the middle is closest to the center of the RMSI CORESET among the SS/PBCH block positioned at the top and the SS/PBCH block positioned at the middle, when an SS/PBCH block having a higher frequency position is determined as a reference SS/PBCH block of an offset value, this means that the SS/PBCH block may correspond to an SS/PBCH block closest to the center of the RMSI CORESET.

In addition, a synchronization raster is defined by a minimum channel BW, an SS/PBCH block BW, and a channel raster. For example, when the minimum channel BW is wide, the synchronization raster is widened. Hence, the wider synchronization raster has an advantage of reducing the number of SS entries. However, when the synchronization raster is wide, a bit size needed to indicate a frequency position between an RMSI CORESET and an SS/PBCH block increases. Hence, it is necessary to determine an appropriate range of the synchronization raster in consideration of the above description.

[Table 11] to [Table 16] below show an example of a bit size needed to indicate a frequency offset according to the minimum channel BW and subcarrier spacing.

TABLE 11

SCS of SS/PBCH block: 15 kHz, Channel raster: 10 kHz

| # of RB within min CH BW (RB) | Sync raster (kHz) | # of SS entry within 40 MHz BW | # of REs between sync raster (REs) | Indication bit |
|---|---|---|---|---|
| 25 | 900 | 45 | 74 | 7 |
| 52 | 5700 | 8 | 394 | 9 |

TABLE 12

SCS of SS/PBCH block: 15 kHz, Channel raster: 15 kHz

| # of RB within min CH BW (RB) | Sync raster (kHz) | # of SS entry - 100 MHz BW | # of REs between sync raster (REs) | Indication bit |
|---|---|---|---|---|
| 25 | 915 | 110 | 61 | 6 |
| 52 | 5775 | 18 | 385 | 9 |

TABLE 13

SCS of SS/PBCH block: 30 kHz, Channel raster: 100 kHz

| # of RB within min CH BW (RB) | Sync raster (kHz) | # of SS entry within 40 MHz BW | # of REs between sync raster (REs) | Indication bit |
|---|---|---|---|---|
| 24 | 1500 | 27 | 50 | 6 |

TABLE 14

SCS of SS/PBCH block: 30 kHz, Channel raster: 15 kHz

| # of RB within min CH BW (RB) | Sync raster (kHz) | # of SS entry - 100 MHz BW | # of REs between sync raster (REs) | Indication bit |
|---|---|---|---|---|
| 24 | 1455 | 69 | 49 | 6 |
| 38 | 6495 | 16 | 217 | 8 |
| 51 | 11175 | 9 | 373 | 9 |
| 106 | 30975 | 4 | 1033 | 11 |

TABLE 15

| SCS of SS/PBCH block: 120 kHz, Channel raster: 60 kHz | | | | |
|---|---|---|---|---|
| # of RB within min CH BW (RB) | Sync raster (kHz) | # of SS entry - 500 MHz BW | # of REs between sync raster (REs) | Indication bit |
| 32 | 17340 | 29 | 145 | 8 |
| 66 | 66300 | 8 | 553 | 10 |

TABLE 16

| SCS of SS/PBCH block: 240 kHz, Channel raster: 60 kHz | | | | |
|---|---|---|---|---|
| # of RB within min CH BW (RB) | Sync raster (kHz) | # of SS entry - 500 MHz BW | # of REs between sync raster (REs) | Indication bit |
| 33 | 37500 | 14 | 157 | 8 |

According to [Table 12], when the minimum channel BW is 10 MHz, 52 PRBs are assumed for a subcarrier spacing of 15 kHz. Hence, the synchronization raster may be 5775 kHz and is represented as 385 REs in the subcarrier spacing of 15 kHz. In this case, a maximum of 9 bits is required to indicate an RE level frequency offset.

According to [Table 14], when the minimum channel BW is 40 MHz, 106 PRBs are assumed for a subcarrier spacing of 30 kHz. The synchronization raster may be 30975 kHz and is represented as 1033 REs in the subcarrier spacing of 30 kHz. In this case, a maximum of 11 bits is required to indicate the RE level frequency offset. As shown in [Table 15], when the minimum channel BW is 50 MHz, the synchronization raster may be 17340 kHz for a subcarrier spacing of 120 kHz and is represented as 145 REs. Therefore, a maximum of 8 bits is required to indicate the RE level frequency offset.

However, if a required bit size is too big to be allowed in a PBCH MIB, NR may reduce the size of the synchronization raster or limit the range of indicating a frequency offset. For example, in the case of the subcarrier spacing of 30 kHz, since a maximum of 11 bits is required to indicate the frequency offset, reduction in the size of the synchronization raster may be considered.

Referring back to [Table 14], when 51 PRBs are assumed for the subcarrier spacing of 30 kHz, the synchronization raster may be 11175 kHz and is represented as 373 REs in the subcarrier spacing of 30 kHz. Then, a maximum of 9 bits is required to indicate the RE level frequency offset. According to the above-described method, although the number of SS entries increases to 9 form 4, this is not an important issue. In the case of the subcarrier spacing of 120 kHz, the range of indicating the frequency offset may be limited. If the maximum frequency range of a frequency position indication between an RMSI CORESET and an SS/PBCH block is restricted to 128 REs, up to 7 bits are required to indicate the RE level frequency offset.

(4) RMSI PDCCH Monitoring Configuration

Figure 40:
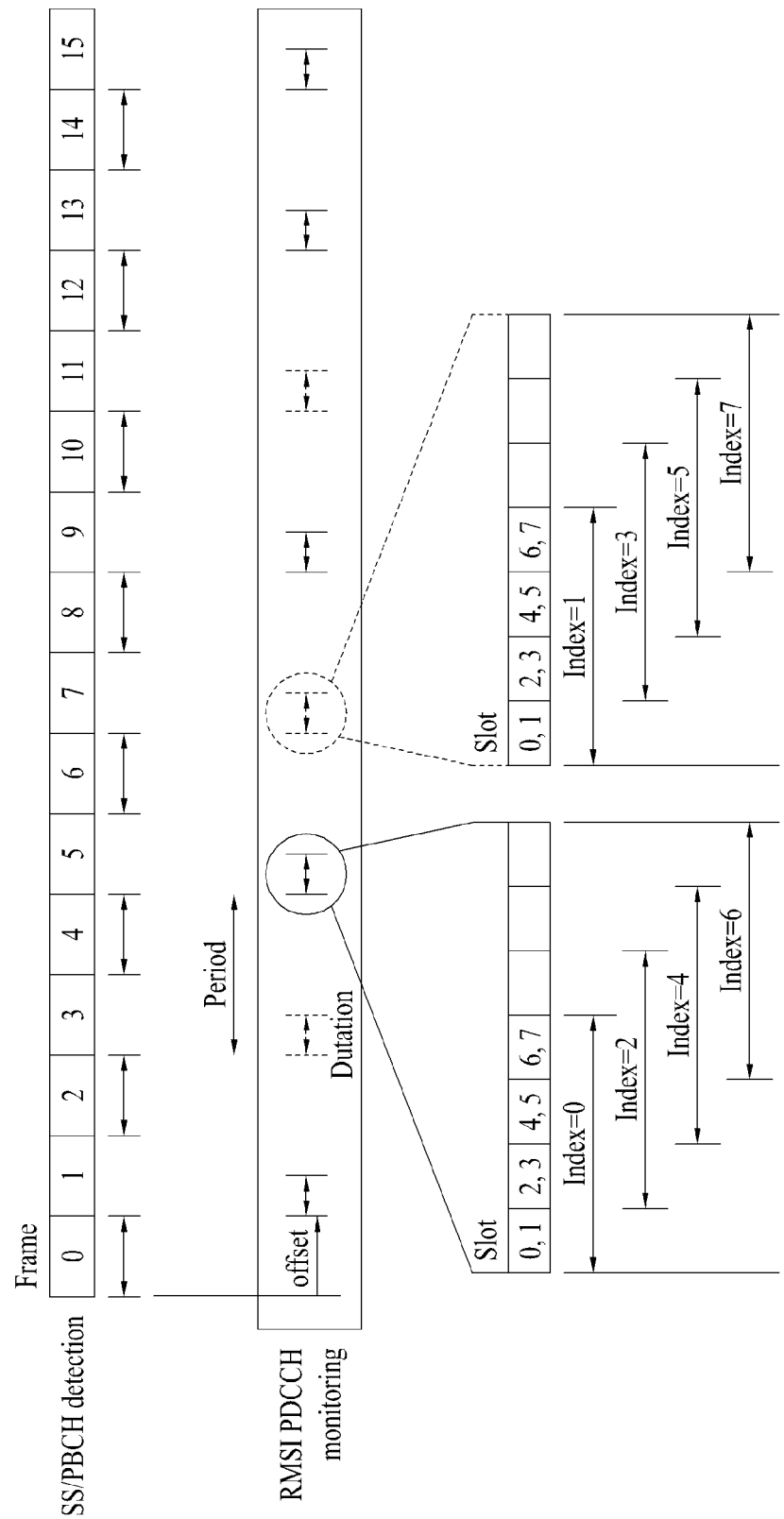

An RMSI PDCCH monitoring window related to an SS/PBCH block is periodically repeated. FIG. 40 illustrates an embodiment for an offset, a duration, and a period of the RMSI PDCCH monitoring window.

A monitoring period for an RMSI PDCCH may be defined to be equal to or longer than a default period for detecting an SS/PBCH block. In an initial access procedure, the UE detects the SS/PBCH block every 20 ms. That is, the default detection period of the SS/PBCH is 20 ms.

Accordingly, if it is assumed that an RMSI CORESET transmits an SS/PBCH block corresponding to the RMSI CORESET, the UE may monitor the RMSI CORESET with a period identical to the detection period of the SS/PBCH block, i.e., 20 ms.

When an RMSI TTI is determined as 160 ms, the UE may receive a PDSCH including the same RMSI several times within the RMSI TTI. For example, when the RMSI TTI is determined as 160 ms, since the default detection period of the SS/PBCH block is 20 ms, the same RMSI may be repeatedly received 8 times.

If a period of RMSI transmission is shortened, coverage of RMSI may be expanded. However, in this case, a network will reserve a DL-dedicated transmission duration for delivering broadcast system information and the DL-dedicated transmission duration may limit flexibility of resource utilization in a TDD system. For example, according to TS 38.213 v 1.3.0, when the number of SS/PBCH blocks is 8, an RMSI subcarrier spacing is 15 kHz, O is 5, the number of search space sets per slot is 1, and M is 2, a UL configuration is not feasible in 10 ms. Moreover, time resources for the UL configuration may be reduced in a frequency range above 6 GHz.

Although the number of SS/PBCH blocks may be limited in order to solve the above problem, too many restrictions may be imposed on the NR system. Meanwhile, a method of modifying parameters in Tables 13-9 to 13-13 of TS 38.213. In other word, since many problems occur, the value of M may be set to ½ or 1. In addition, a set of values of O corresponds to {0, 2, 5, 7} in a frequency range below 6 GHz and corresponds to {0, 2.5, 5, 7.5} in a frequency range above 6 GHz. However, when an offset value greater than 5 ms is configured, a time resource of 10 ms may not be sufficient for the UL configuration. Hence, a configuration of the values of O is changed to {0, 2, 10, 12} in the frequency range below 6 GHz and is changed to {0, 2.5, 10, 12.5} in the frequency range above 6 GHz.

On the other hand, when the UE monitors a PDCCH based on a shorter period, battery consumption of the UE may increase. Hence, a longer period such as 40 ms needs to be considered.

However, in order to provide a plurality of transmission occasions for multiple RMSI transmission having a plurality of beam directions, a shorter period such as 20 ms may be required. In this case, as illustrated in FIG. 40, when a gNB alternately transmits an RMSI CORESET for an even-numbered index beam and an RMSI CORESET for an odd-numbered index beam every 20 ms, the UE may monitor an RMSI CORESET corresponding to a specific SS/PBCH block index with a period of 40 ms for a specific SS.

A duration of RMSI PDCCH monitoring may be determined based on the number of actually transmitted SS/PBCH blocks. For example, when multiple SS/PBCH blocks are transmitted, a longer monitoring duration may be required for multiple RMSI transmission having a different direction. In this case, the UE may assume that the RMSI monitoring duration is longer. However, even when the number of the actually transmitted SS/PBCH blocks is small, if the UE fixedly assumes that the RMSI monitoring duration is longer, this is not efficient in terms of battery consumption of the UE.

Hence, it is necessary for the gNB to configure the RMSI PDCCH monitoring duration. For example, the RMSI PDCCH monitoring duration may be configured as 2 slots or 4 slots. In this case, the RMSI PDCCH monitoring window may be overlapped between SS/PBCH blocks. In this case, the UE may detect a PDCCH capable of being QCLed between different SS/PBCH blocks. In order to avoid ambiguity between an SS/PBCH block index and RMSI, a scrambling sequence of a PDCCH for the RMSI or DMRS sequences may be initialized by the SS/PBCH block index.

An offset configurable for RMSI PDCCH monitoring may provide flexibility of resource utilization to the network. For example, when the network has a wide spectrum, the gNB may transmit an SS/PBCH block and RMSI within the same duration. When the network has flexibility capable of individually transmitting the SS/PBCH blocks and the RMSI, the gNB may transmit the RMSI based on a time interval different from a time interval at which the SS/PBCH block is transmitted. Meanwhile, when a semi-static DL/UL allocation period is considered, 0 ms and 10 ms are appropriate as an offset value.

Figure 41:
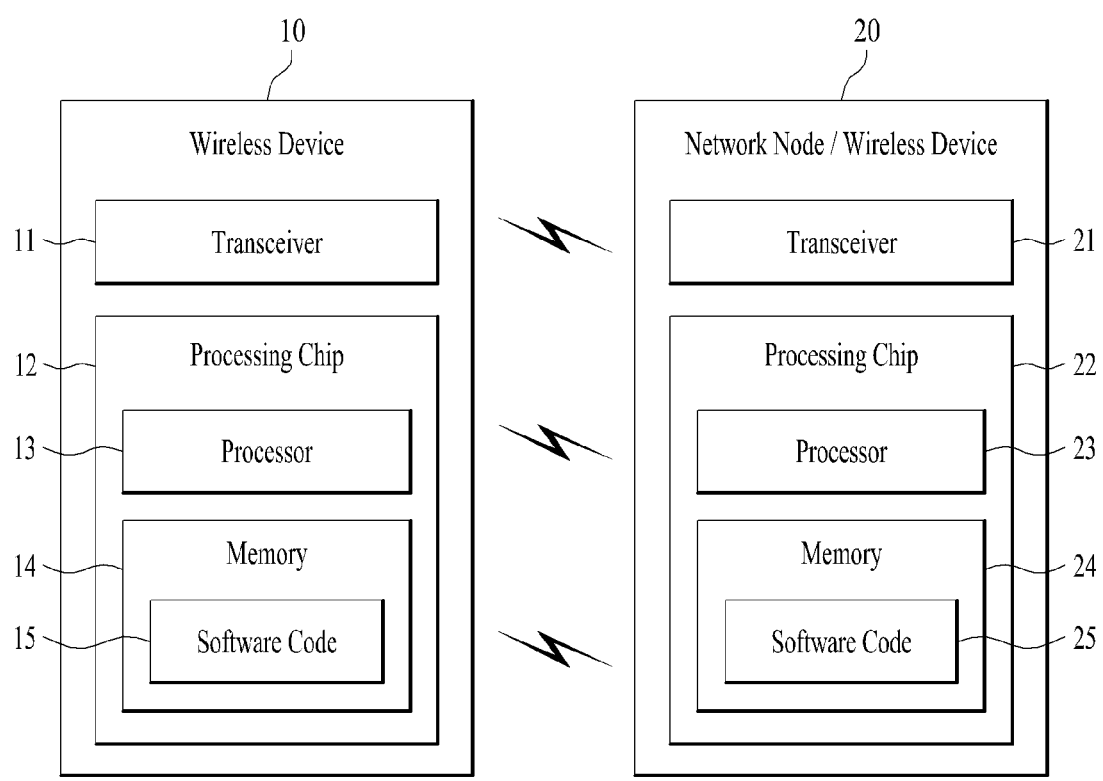
FIG. 41 is a block diagram illustrating components of a wireless communication apparatus for implementing the present disclosure.

FIG. 41 is a block diagram illustrating an example of communication between a wireless device 10 and a network node 20. Here, the network node 20 may be replaced with the wireless device of FIG. 41 or a UE.

In this specification, the wireless device 10 or the network node 20 includes a transceiver 11 or 21, respectively, for communicating with one or more other wireless devices, network nodes, and/or other elements of the network. The transceivers 11 and 21 may include one or more transmitters, one or more receivers, and/or one or more communication interfaces.

In addition, the transceivers 11 and 21 may include one or more antennas. The antennas function to transmit signals processed by the transceivers 11 and 21 to the outside under control of processing chips 12 and 22 or to receive wireless signals from the outside and transmit the signals to the processing chips 12 and 22, according to an embodiment of the present disclosure. The antennas are also referred to as antenna ports. Each antenna may correspond to one physical antenna or may be configured by a combination of more than one physical antenna element. The signal transmitted from each antenna may not be further divided by the wireless device 10 or the network node 20. A reference signal (RS) transmitted for the corresponding antenna defines the antenna from the perspective of the wireless device 10 or the network node 20 and enables the wireless device 10 or the network node 20 to perform channel estimation for the antenna regardless of whether the channel is a single wireless channel from one physical antenna or a composite channel from a plurality of physical antenna elements including the antenna. That is, an antenna is defined such that a channel for delivering a symbol on the antenna may be derived from the channel through which another symbol on the same antenna is transmitted. A transceiver supporting a multi-input multi-output (MIMO) function to transmit and receive data using a plurality of antennas may be connected to two or more antennas.

In the present disclosure, the transceivers 11 and 21 may support reception beamforming and transmission beamforming. For example, in the present disclosure, the transceivers 11 and 21 may be configured to perform the functions illustrated in FIGS. 8 to 10.

In addition, the wireless device 10 or the network node 20 includes the processing chip 12 or 22, respectively. The processing chip 12 or 22 may include at least one processor, such as a processor 13 or 23, respectively, and at least one memory device, such as a memory 14 or 24, respectively.

The processing chips 12 and 22 may control at least one of the methods and/or processes described in this specification. In other words, the processing chips 12 and 22 may be configured to implement at least one of the embodiments described in this specification.

The processors 13 and 23 include at least one processor for performing the function of the wireless device 10 or the network node 20 described in this specification.

For example, one or more processors may control the one or more transceivers 11 and 21 of FIG. 41 to transmit and receive information.

The processors 13 and 23 included in the processing chips 12 and 22 perform predetermined coding and modulation on signals and/or data to be transmitted to the outside of the wireless device 10 or the network node 20 and then transmit the signals and/or data to the transceivers 11 and 21. For example, the processors 13 and 23 convert a data sequence to be transmitted into K layers through demultiplexing, channel coding, scrambling, and modulation processes. The coded data sequence is also referred to as a codeword and is equivalent to a transport block, which is a data block provided by the MAC layer. One transport block (TB) is coded into one codeword and each code word is transmitted to a reception device in the form of one or more layers. To perform frequency up-conversion, the transceivers 11 and 21 may include an oscillator. The transceivers 11 and 21 may include $N_t$ transmit antennas (where $N_t$ is a positive integer greater than or equal to 1).

In addition, the processing chips 12 and 22 include the memories 14 and 24, respectively, configured to store data, programmable software code, and/or other information for implementing the embodiments described in this specification.

In other words, in the embodiments according to the present disclosure, when the memories 14 and 24 are executed by at least one processor, such as the processors 13 and 23, the memories allow the processors 13 and 23 to execute some or all of the processes controlled by the processors 13 and 23 of FIG. 41 or store software codes 15 and 25 including instructions for implementing the embodiments described in this specification based on FIGS. 1 to 40.

Specifically, the processing chip 12 of the wireless device 10 according to an embodiment of the present disclosure controls the transceiver to receive information related to an RS configuration for acquiring timing information of a neighbor cell from a serving cell and controls the transceiver to receive an SS/PBCH block from the serving cell and the SS/PBCH block and an RS from the neighbor cell.

In addition, the processing chip 12 acquires the timing information of the neighbor cell based on a sequence of the RS. In this case, the timing information capable of being acquired from the sequence of the RS may include information related to an index of the SS/PBCH block received from the neighboring cell and information related to a slot, a symbol, and a half-frame of a timing at which the RS is received.

A detailed method in which the processing chip 12 obtains the timing information of the neighbor cell based on the sequence of the received RS, the RS, and the type of the RS sequence conform to the above-described embodiments.

The processing chip 22 of the network node 20 according to an embodiment of the present disclosure may imply the processing chip 22 that controls one or more cells. That is, a cell that the processing chip 22 controls may be the serving cell or the neighbor cell.

In other words, although the processing chip 22 may control the serving cell or the neighbor cell, the processing chip 22 may also control both the serving cell and the neighbor cell.

The processing chip 22 corresponding to the serving cell controls the transceiver to transmit a configuration related to the RS for obtaining the timing information of the neighbor cell to the UE. Next, the processing chip 22 corresponding to the neighbor cell generates the sequence of the RS based on the transmission timing of the RS and/or the SS/PBCH block. In this case, a seed value of the RS sequence may be information about a slot, a symbol, and a half-frame in which the RS is transmitted or information about an index of the SS/PBCH block transmitted in the vicinity of the RS A detailed method in which the processing chip 22 generates the sequence of the RS based on the timing information of the neighbor cell, the RS, and the type of the RS sequence conform to the above-described embodiments.

Next, the processing chip 22 corresponding to the neighbor cell transmits the generated RS and the SS/PBCH block of the neighbor cell to the UE (S3505).

The embodiments of the present disclosure described above are combinations of elements and features of the present disclosure. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present disclosure or included as a new claim by a subsequent amendment after the application is filed.

A specific operation described as performed by a BS may be performed by an upper node of the BS. Namely, it is apparent that, in a network comprised of a plurality of network nodes including a BS, various operations performed for communication with a UE may be performed by the BS, or network nodes other than the BS. The term 'BS' may be replaced with the term 'fixed station', 'Node B', 'evolved Node B (eNode B or eNB)', 'Access Point (AP)', etc.

The embodiments of the present disclosure may be achieved by various means, for example, hardware, firmware, software, or a combination thereof. In a hardware configuration, an embodiment of the present disclosure may be achieved by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, an embodiment of the present disclosure may be implemented in the form of a module, a procedure, a function, etc. Software code may be stored in a memory unit and executed by a processor. The memory unit is located at the interior or exterior of the processor and may transmit and receive data to and from the processor via various known means.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

While the method of transmitting and receiving an RS and apparatus therefor are described based on the 5G new RAT system, the method and apparatus are applicable to various wireless communication systems as well as the 5G new RAT system.

The invention claimed is:

1. A method for receiving a channel state information-reference signal (CSI-RS) by a user equipment (UE) in a wireless communication system, the method comprising:
   receiving, from a serving cell, first information related to a CSI-RS configuration;
   receiving, from the serving cell, second information related to at least one synchronization signal/physical broadcast channel (SS/PBCH) block which can be transmitted among a plurality of SS/PBCH blocks;
   receiving, from a neighbor cell, the CSI-RS based on the first information;
   receiving, from the neighbor cell, a SS/PBCH block associated with the CSI-RS among the at least one SS/PBCH block; and
   acquiring third information related to an index of the SS/PBCH block based on a sequence of the CSI-RS,
   wherein the CSI-RS is received in the same Orthogonal Frequency Division Multiplexing (OFDM) symbol including the SS/PBCH block,
   wherein the CSI-RS is received in subcarriers different from subcarriers in which the SS/PBCH block is received, and
   wherein a periodicity of the CSI-RS is the same with a periodicity of the SS/PBCH block.

2. The method of claim 1, wherein the third information includes 3 most significant bits for the index of the SS/PBCH block.

3. The method of claim 1, further comprising performing handover from the serving cell to the neighbor cell based on the third information.

4. The method of claim 1, further comprising performing measurement for the neighbor cell based on the third information.

5. A communication apparatus for receiving a channel state information-reference signal (CSI-RS) in a wireless communication system, the communication apparatus comprising:
   a memory; and
   a processor connected to the memory,
   wherein the processor is configured to:
   receive, by the processor from a serving cell, first information related to a CSI-RS configuration;
   receive, by the processor from the serving cell, second information related to at least one synchronization signal/physical broadcast channel (SS/PBCH) block which can be transmitted among a plurality of SS/PBCH blocks;
   receive, by the processor from a neighbor cell, the CSI-RS based on the first information;
   receive, by the processor from the neighbor cell, a SS/PBCH block associated with the CSI-RS among the at least one SS/PBCH block; and
   acquire, by the processor, third information related to an index of the SS/PBCH block based on a sequence of the CSI-RS, wherein the CSI-RS is received, by the processor, in the same Orthogonal Frequency Division Multiplexing (OFDM) symbol including the SS/PBCH block, wherein the CSI-RS is received, by the processor, in subcarriers different from subcarriers in which the SS/PBCH block is received, and wherein a periodicity of the CSI-RS is the same with a periodicity of the SS/PBCH block.

\* \* \* \* \*